Aug. 22, 1933.     F. LJUNGSTROM     1,923,102
SELF PROPELLED VEHICLE
Filed Dec. 5, 1929     21 Sheets-Sheet 1
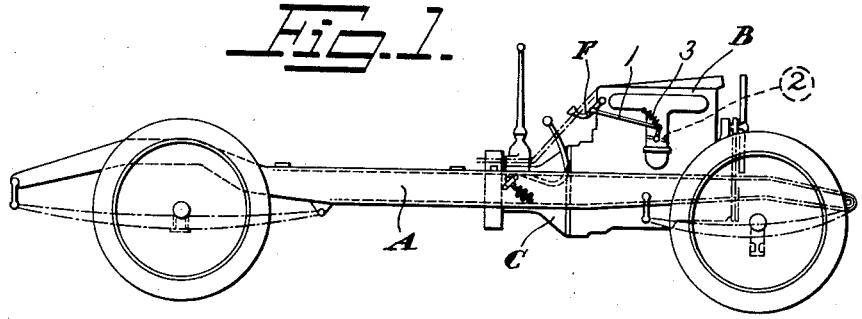
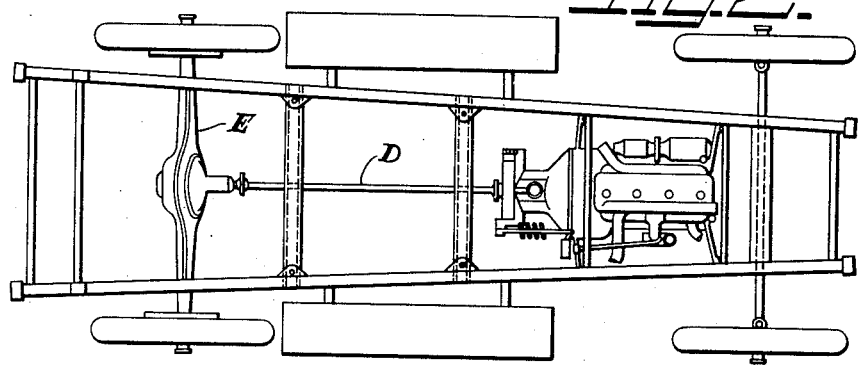
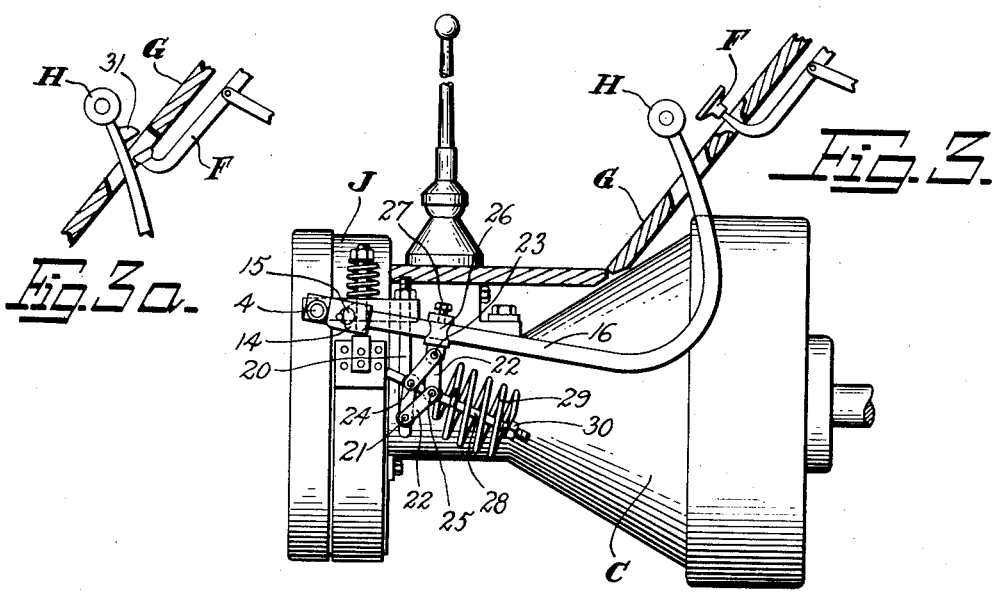
INVENTOR
Fredrik Ljungström
BY
ATTORNEY

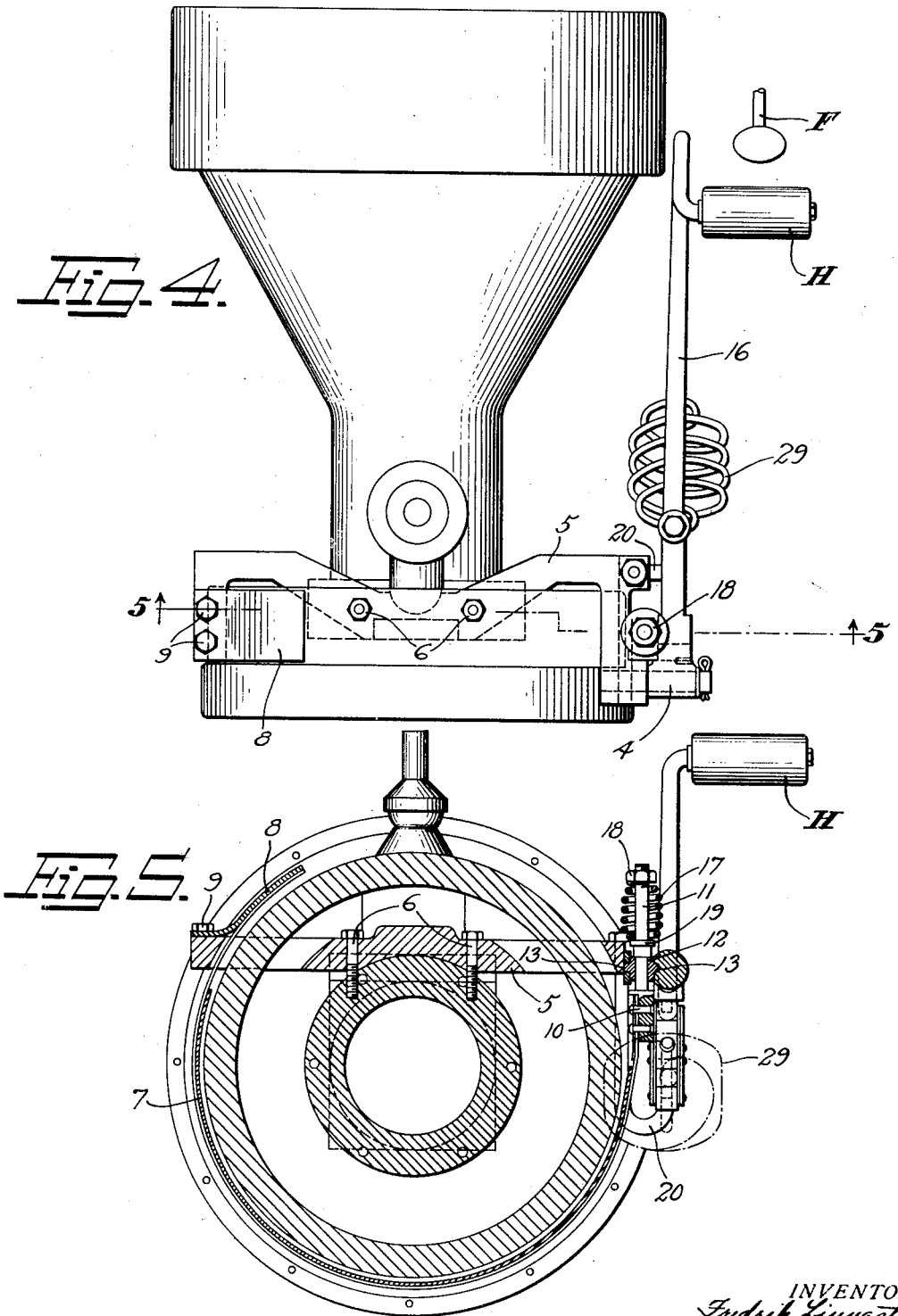

Aug. 22, 1933.  F. LJUNGSTROM  1,923,102
SELF PROPELLED VEHICLE
Filed Dec. 5, 1929   21 Sheets-Sheet 3
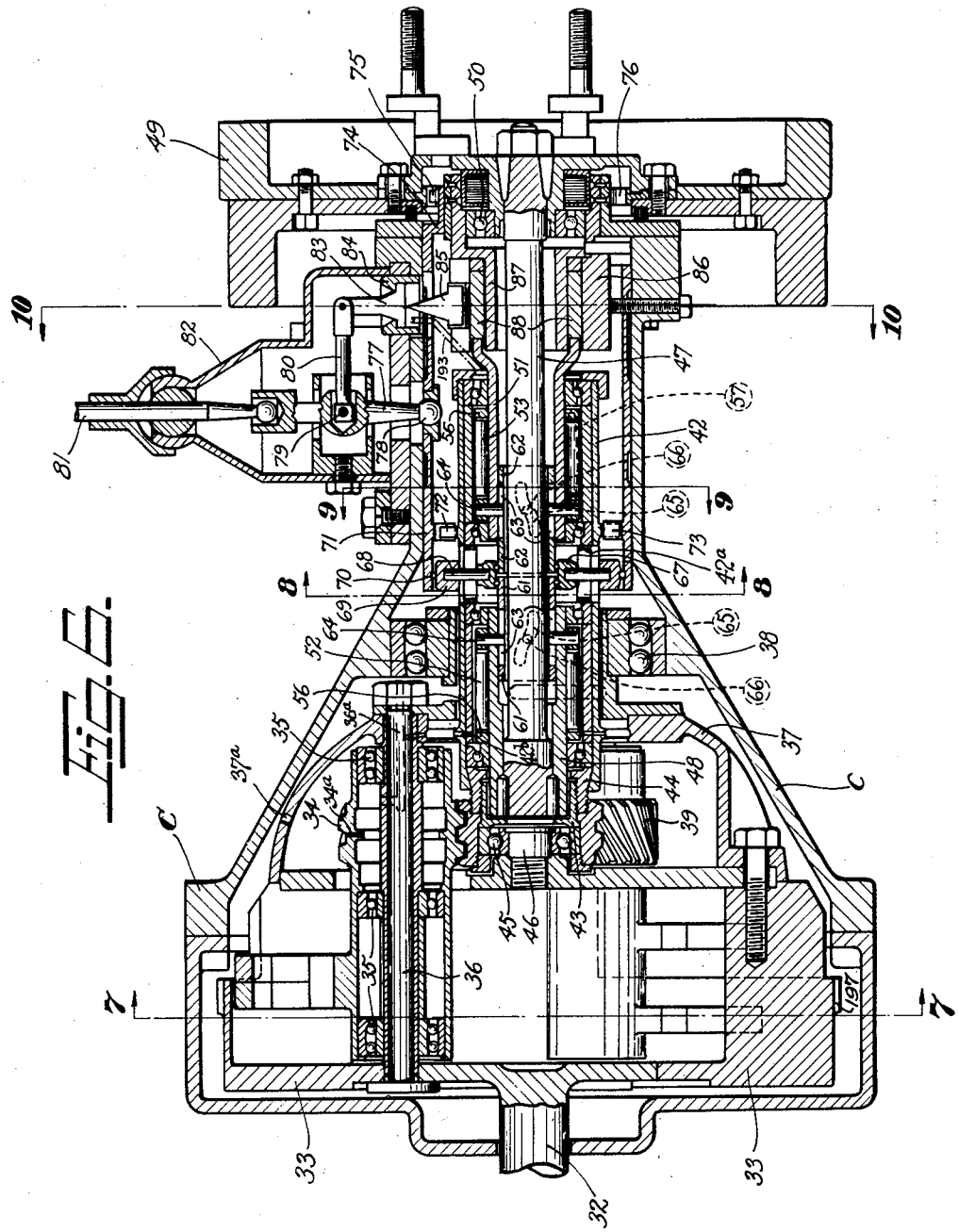

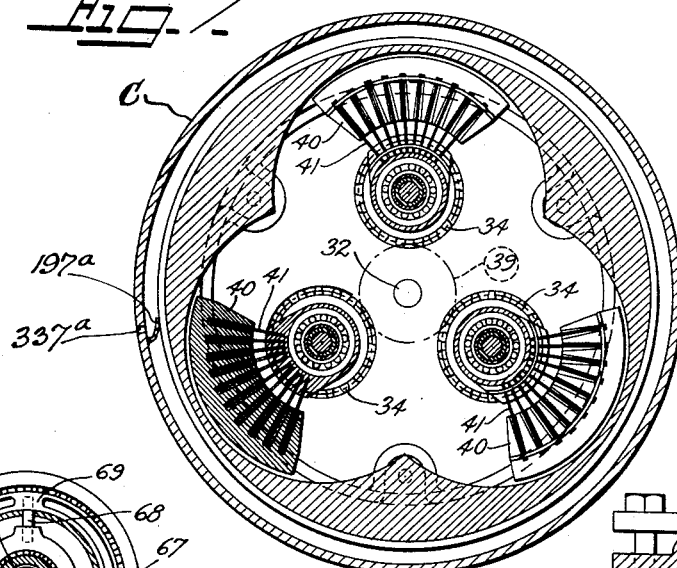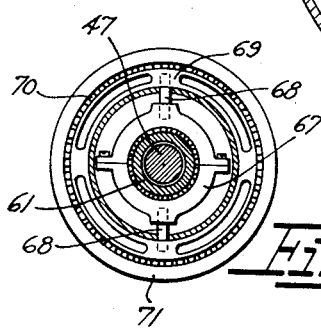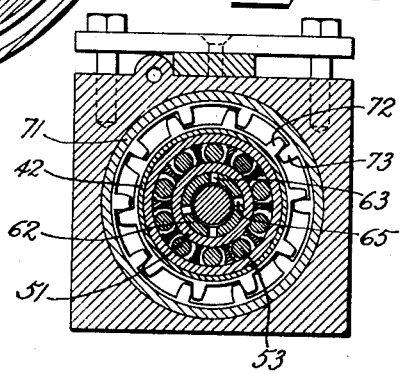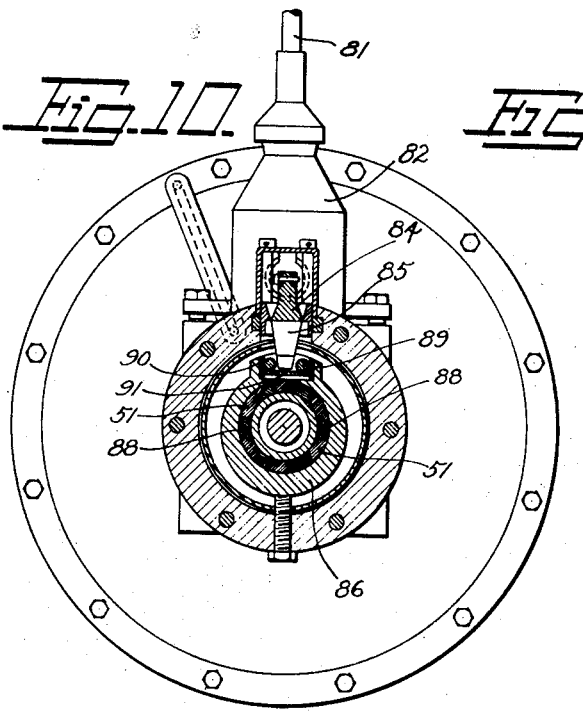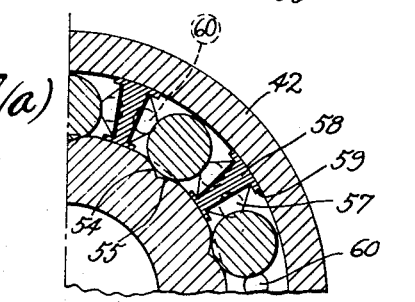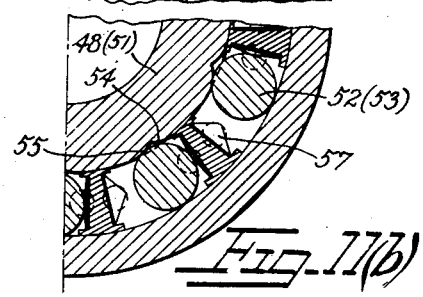

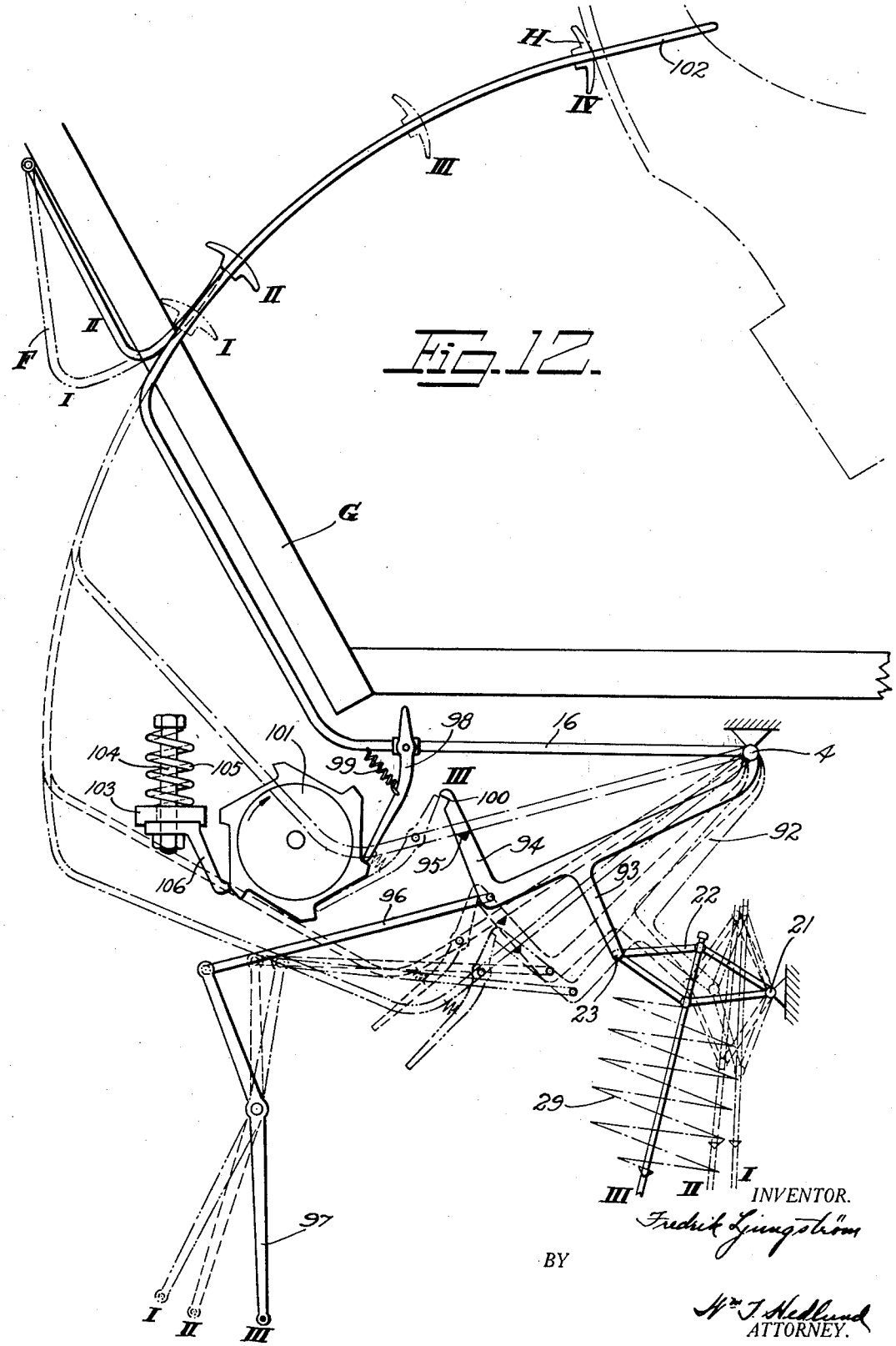

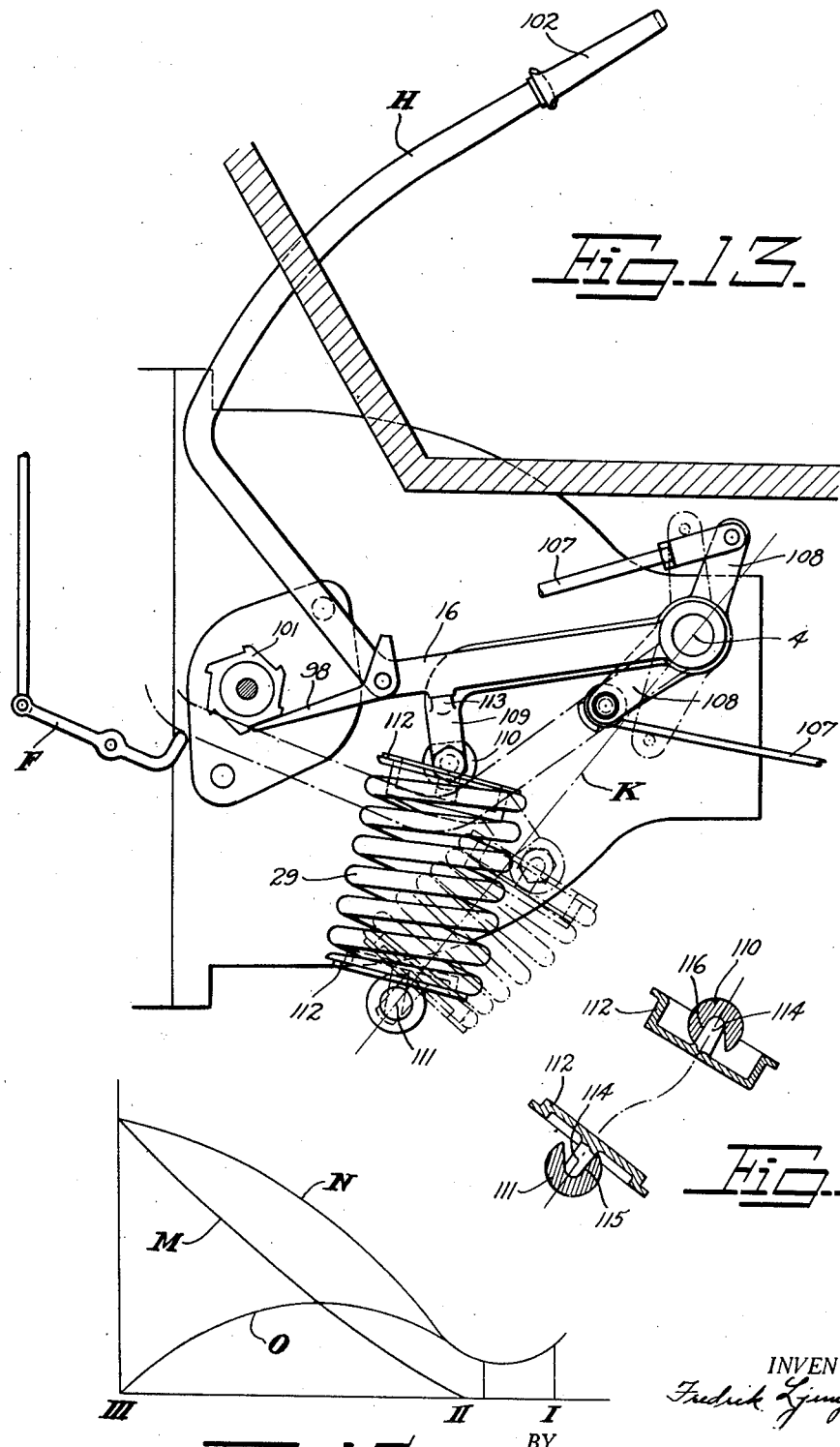

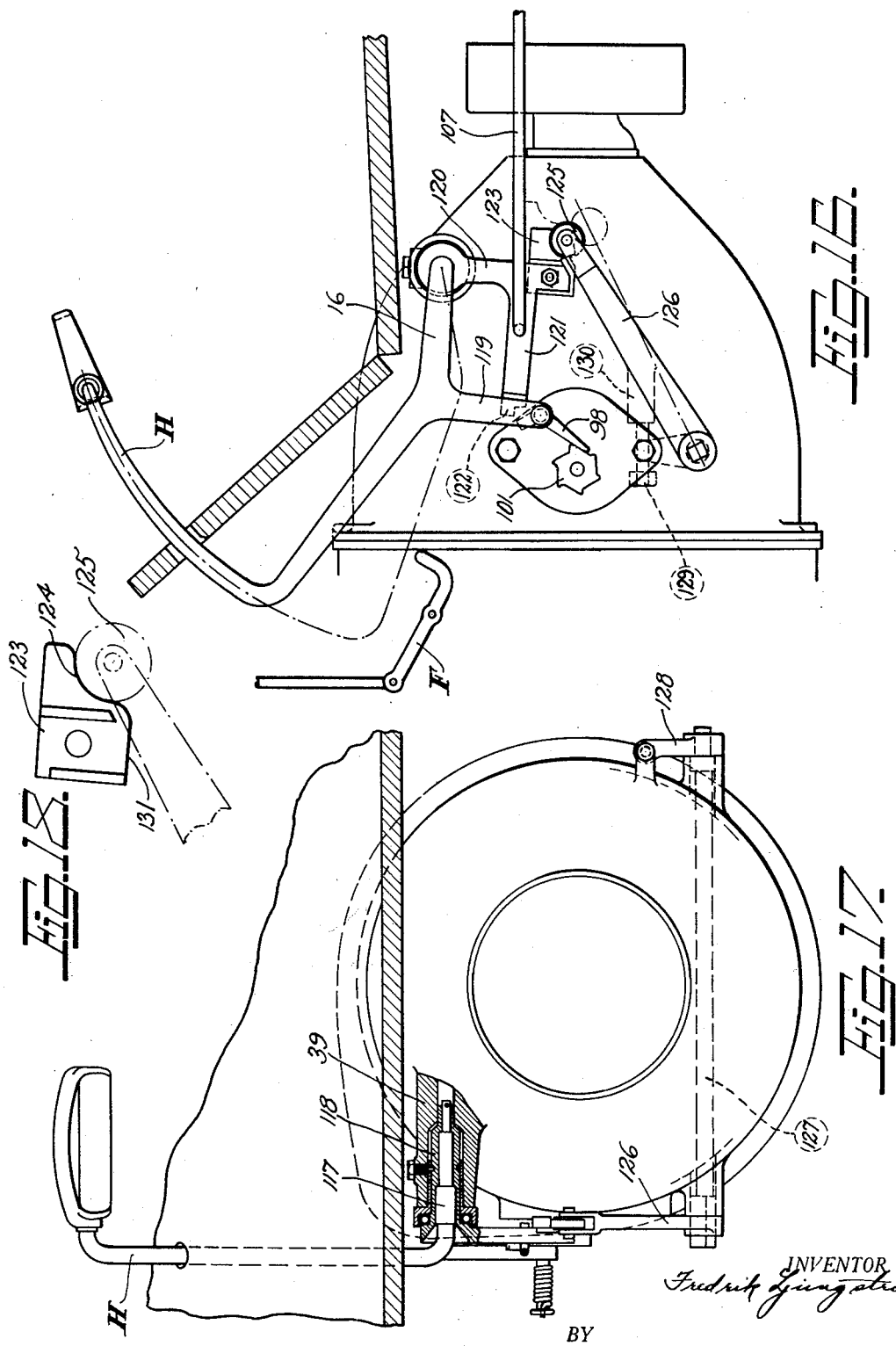

Aug. 22, 1933.    F. LJUNGSTROM    1,923,102
SELF PROPELLED VEHICLE
Filed Dec. 5, 1929    21 Sheets-Sheet 8
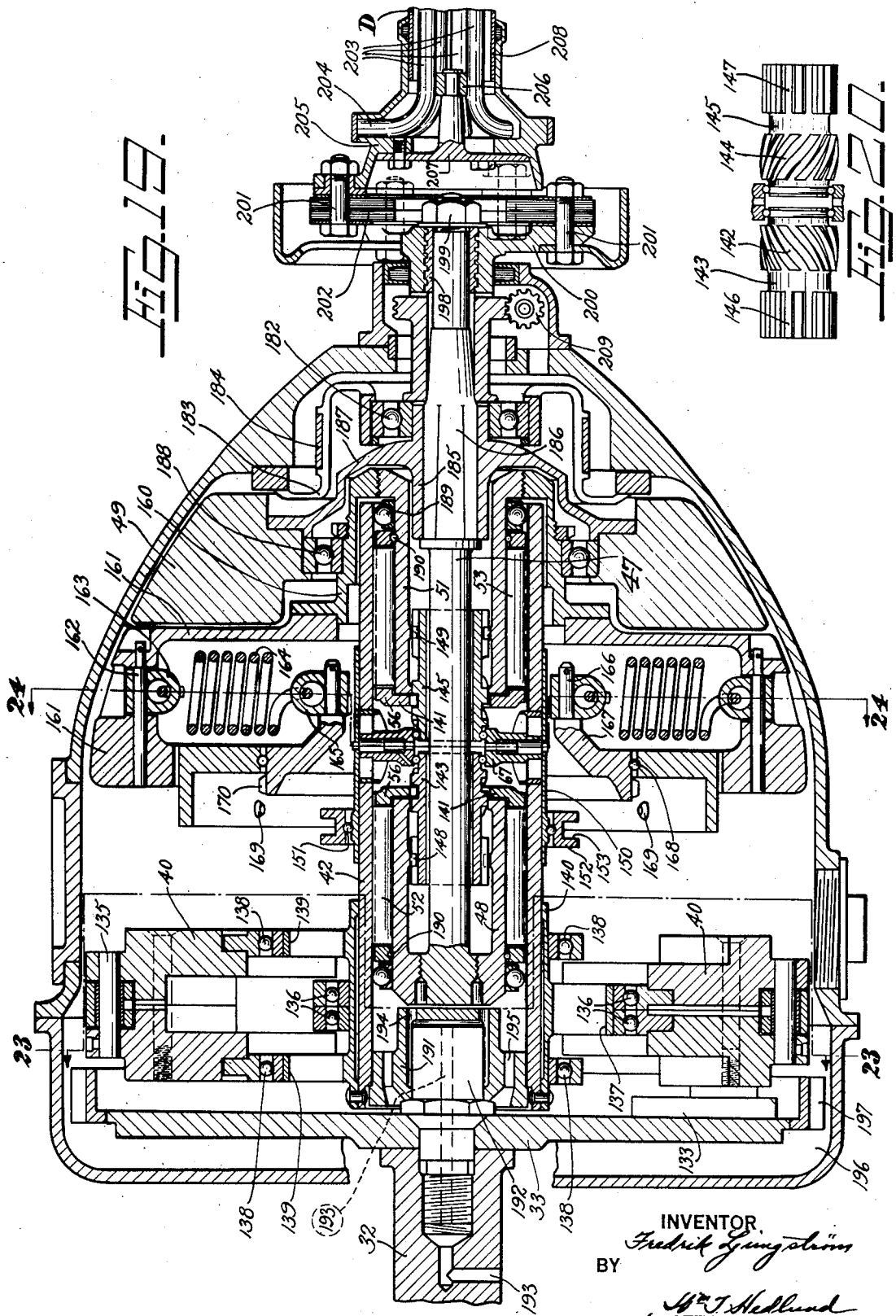

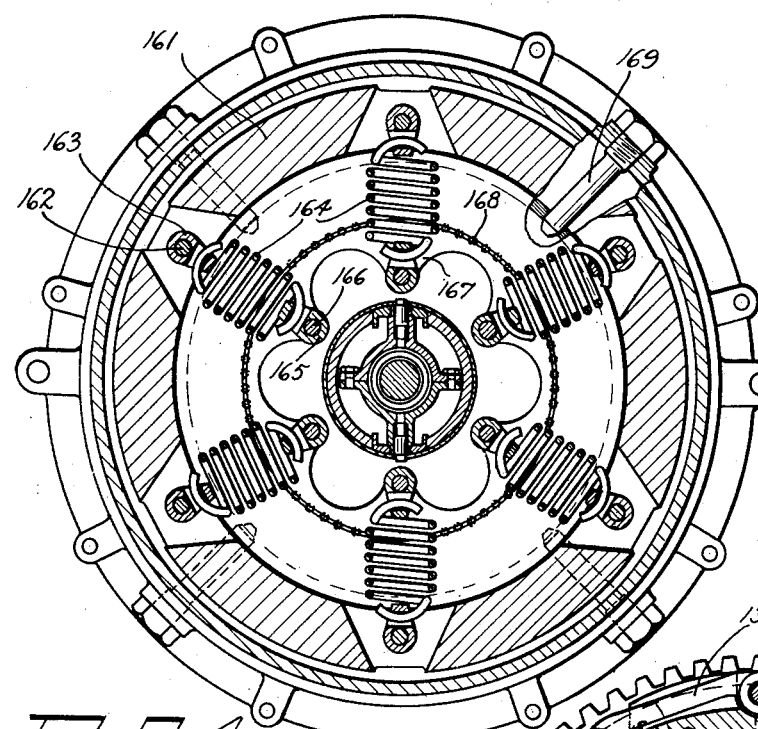
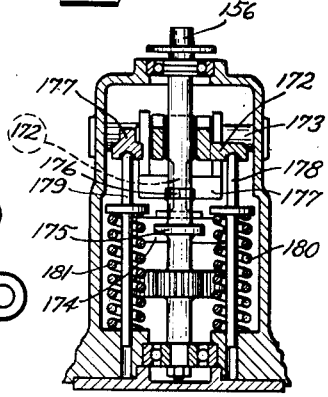
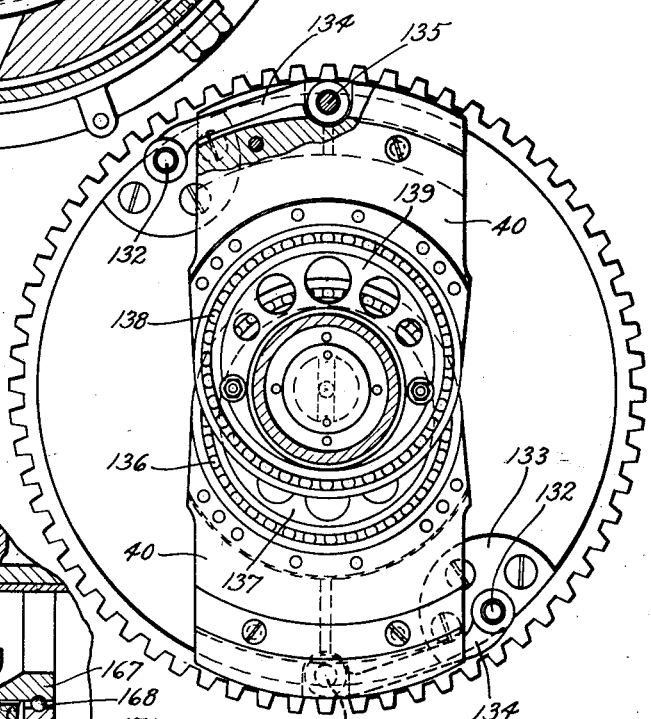
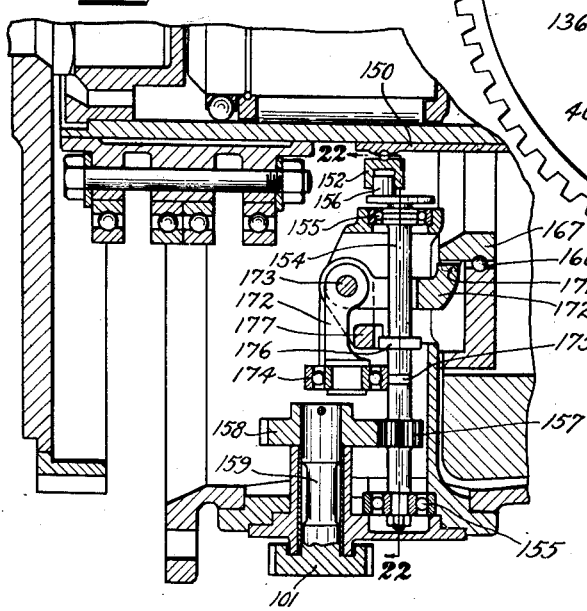

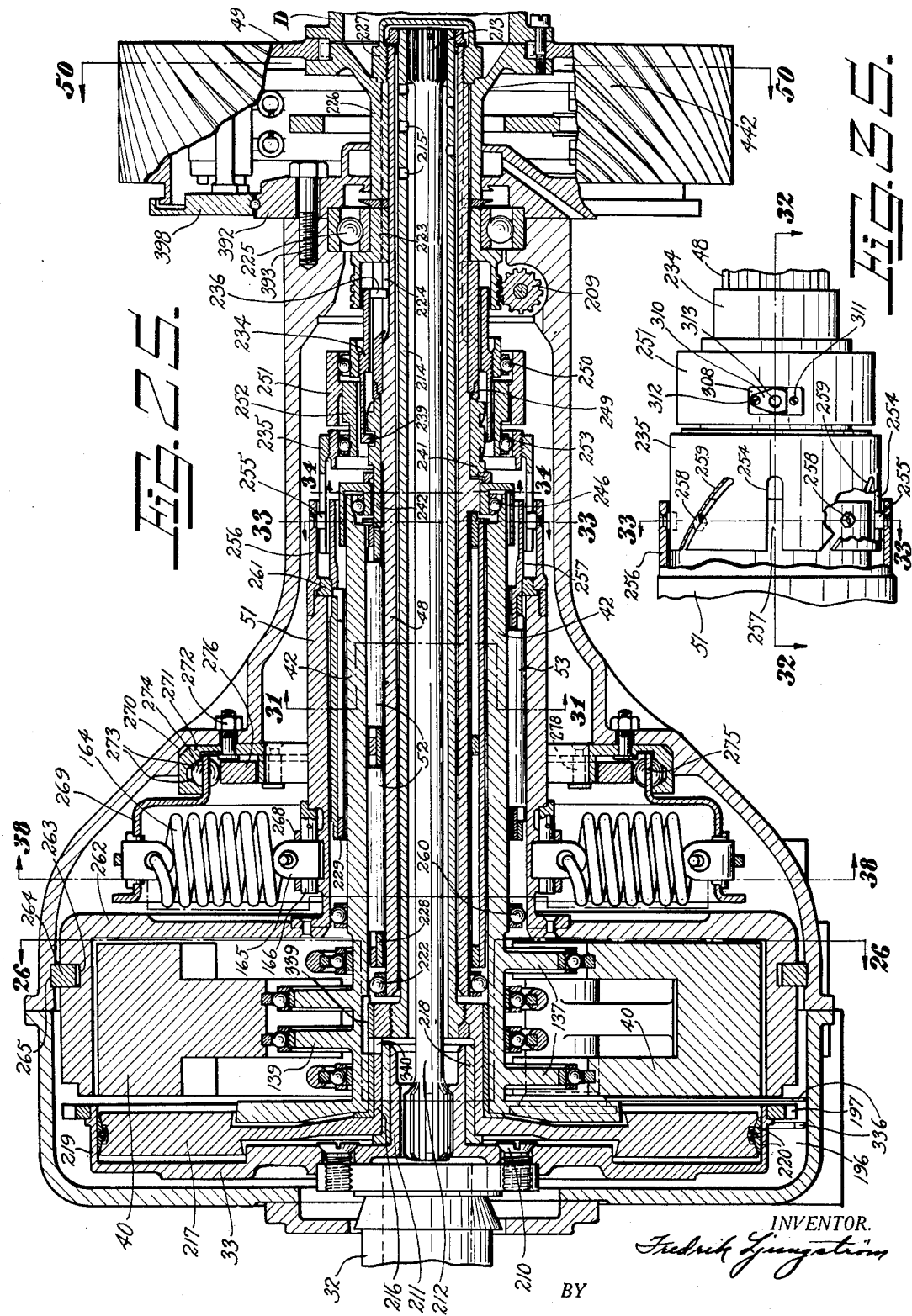

Aug. 22, 1933.   F. LJUNGSTROM   1,923,102
SELF PROPELLED VEHICLE
Filed Dec. 5, 1929   21 Sheets-Sheet 11
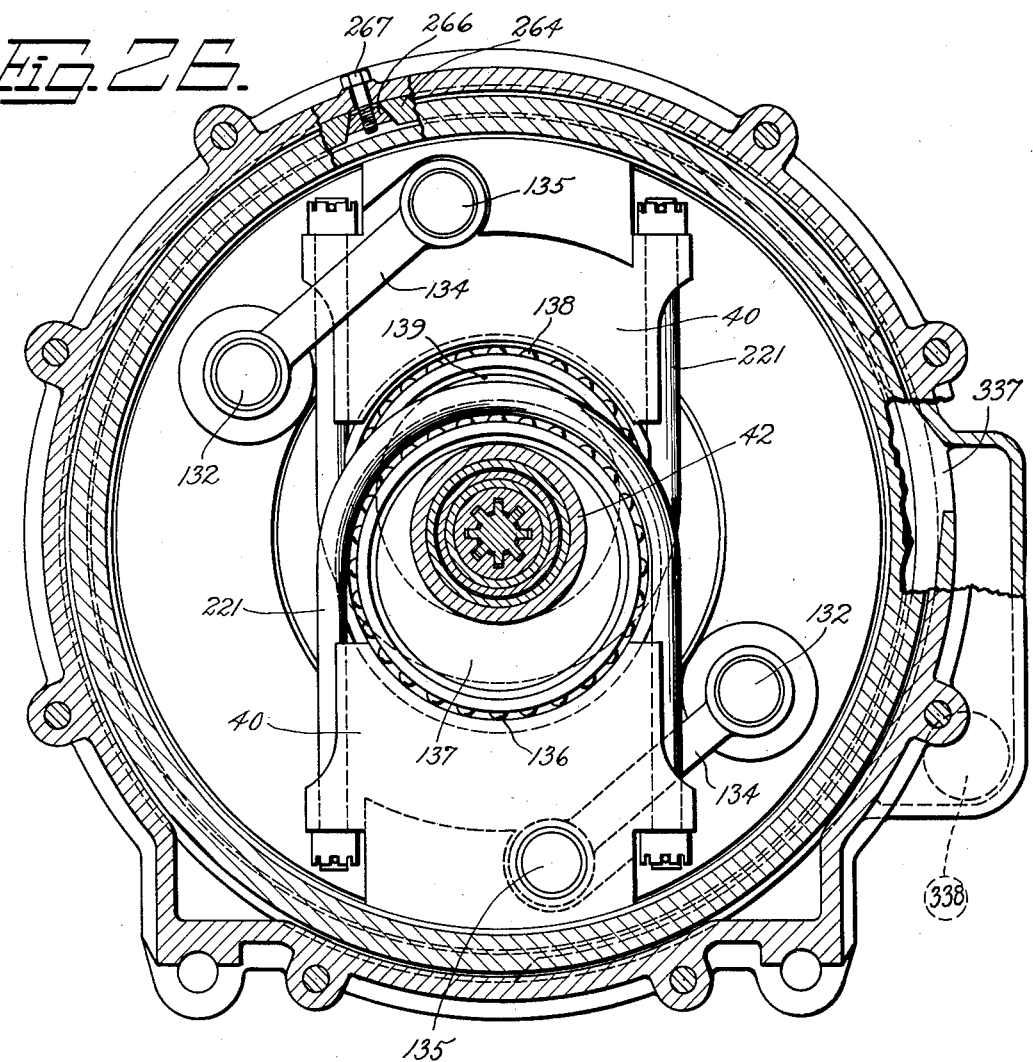
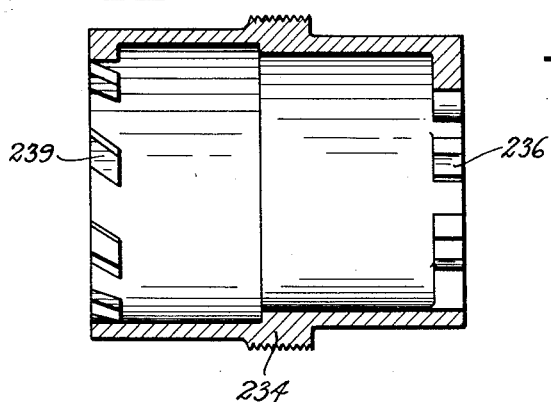
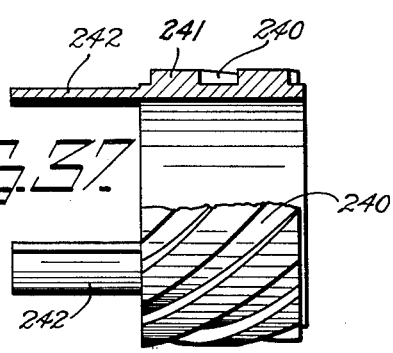
INVENTOR.
Fredrik Ljungstrom
BY
his ATTORNEY.

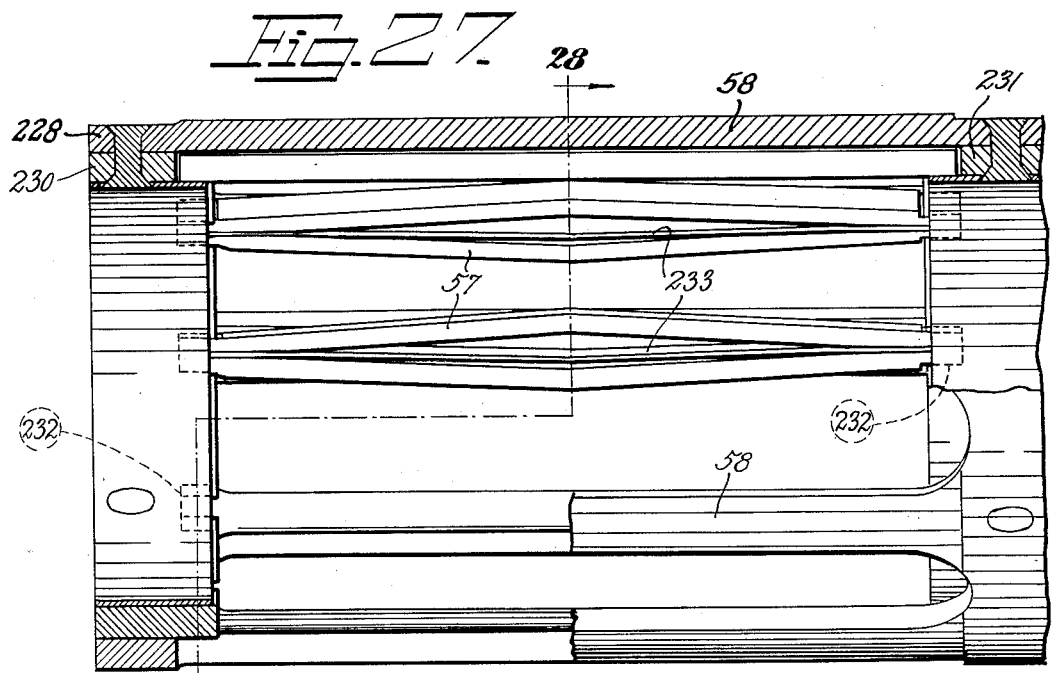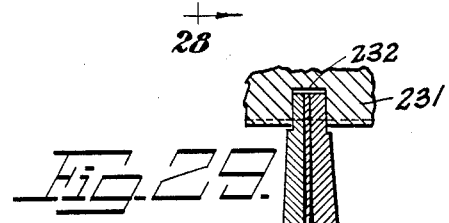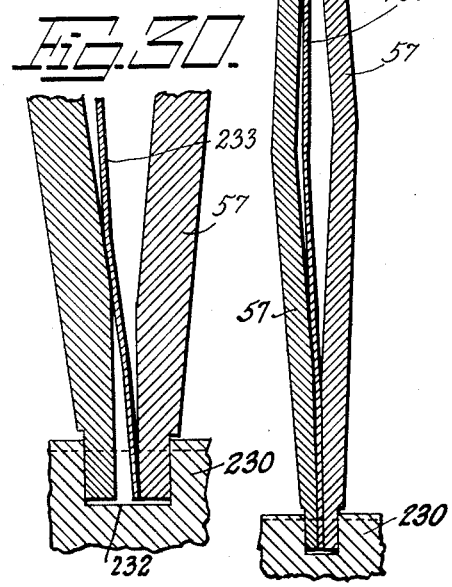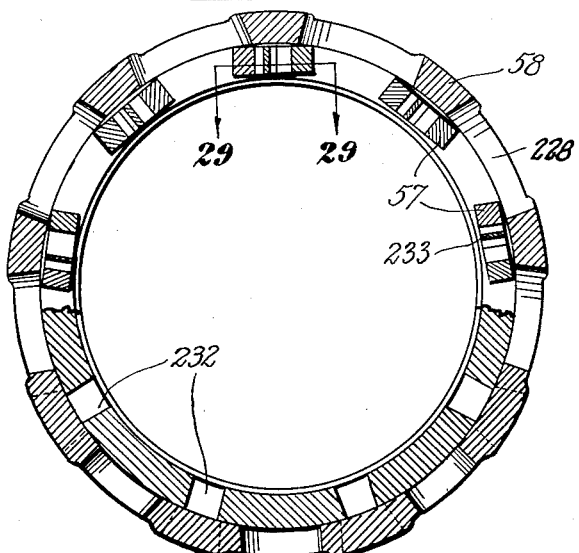

Aug. 22, 1933.    F. LJUNGSTROM    1,923,102
SELF PROPELLED VEHICLE
Filed Dec. 5, 1929    21 Sheets-Sheet 14
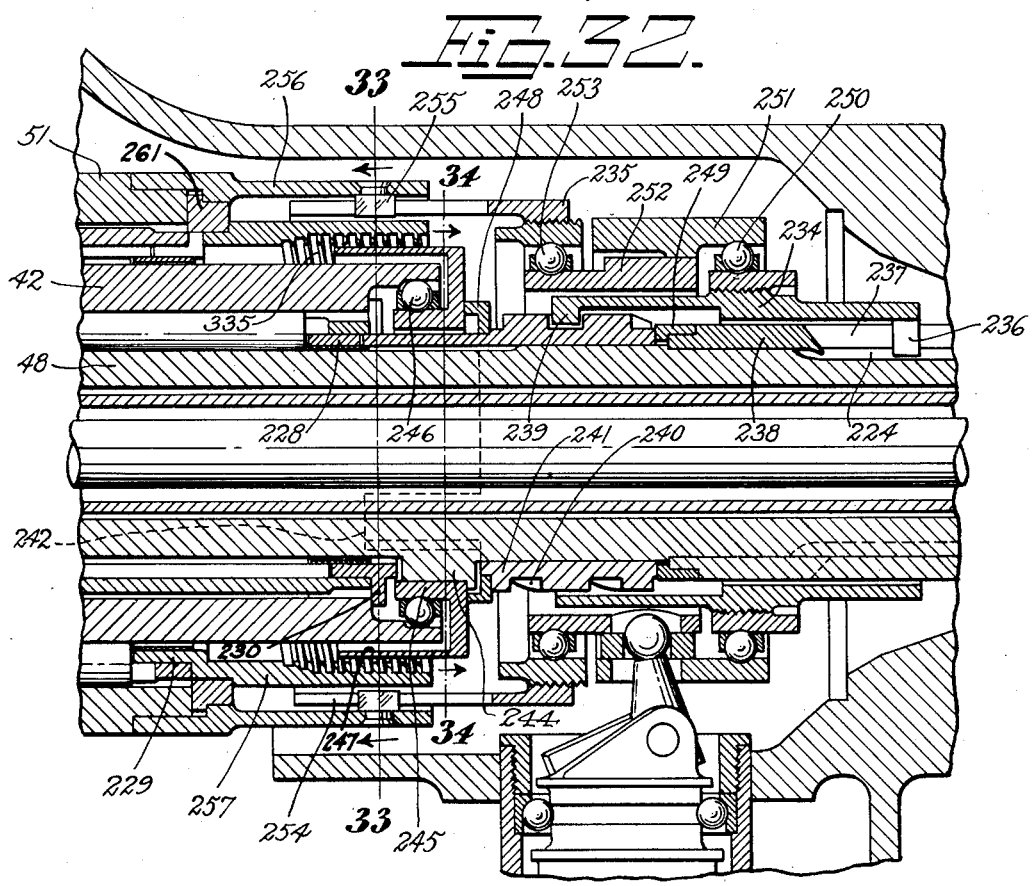
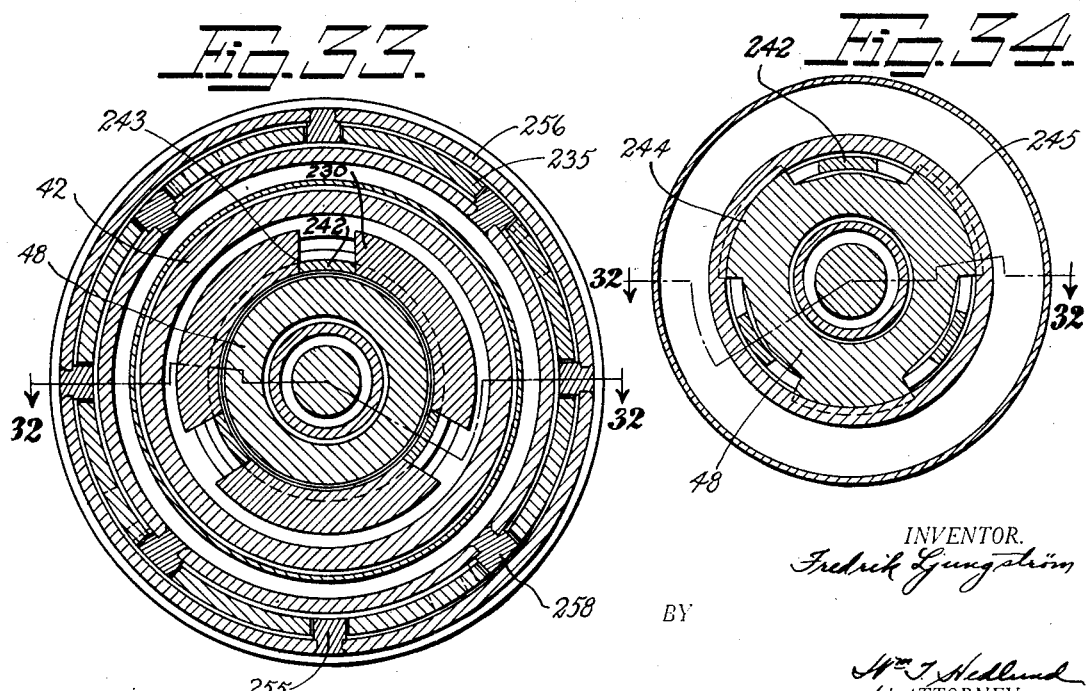
INVENTOR.
Fredrik Ljungstrom
BY
his ATTORNEY.

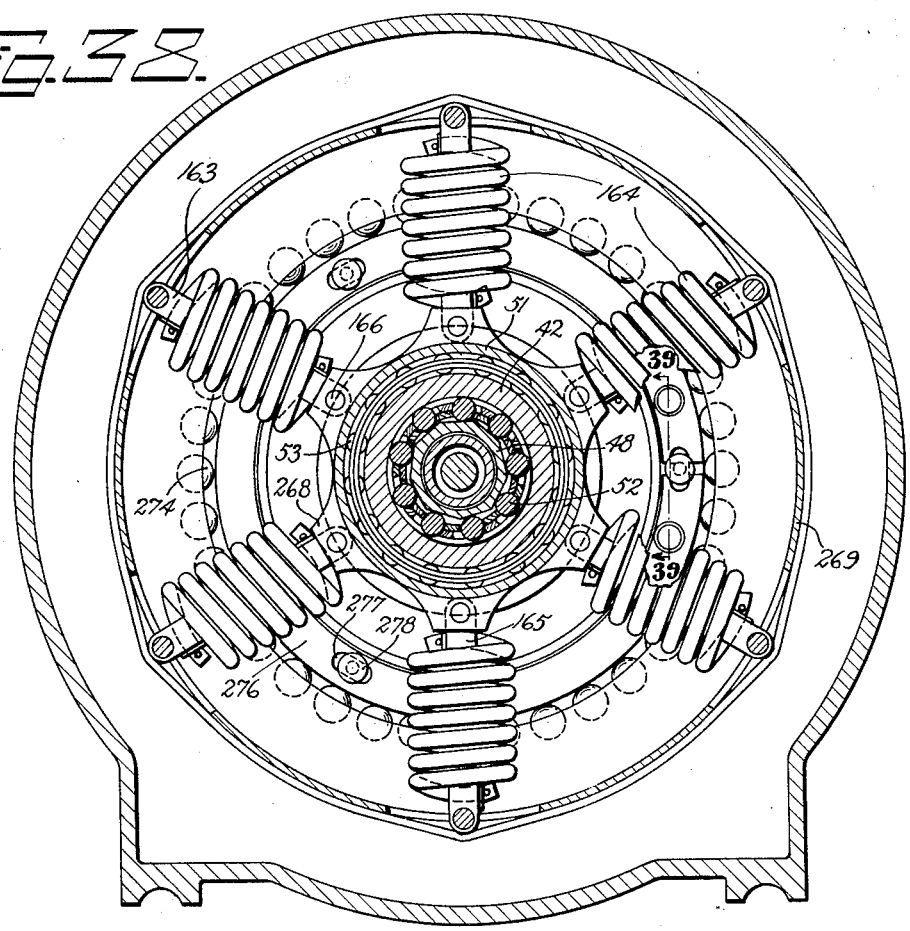
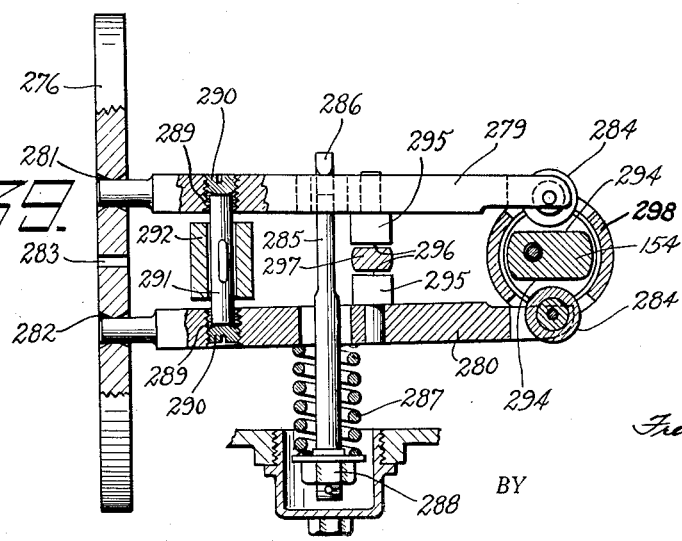

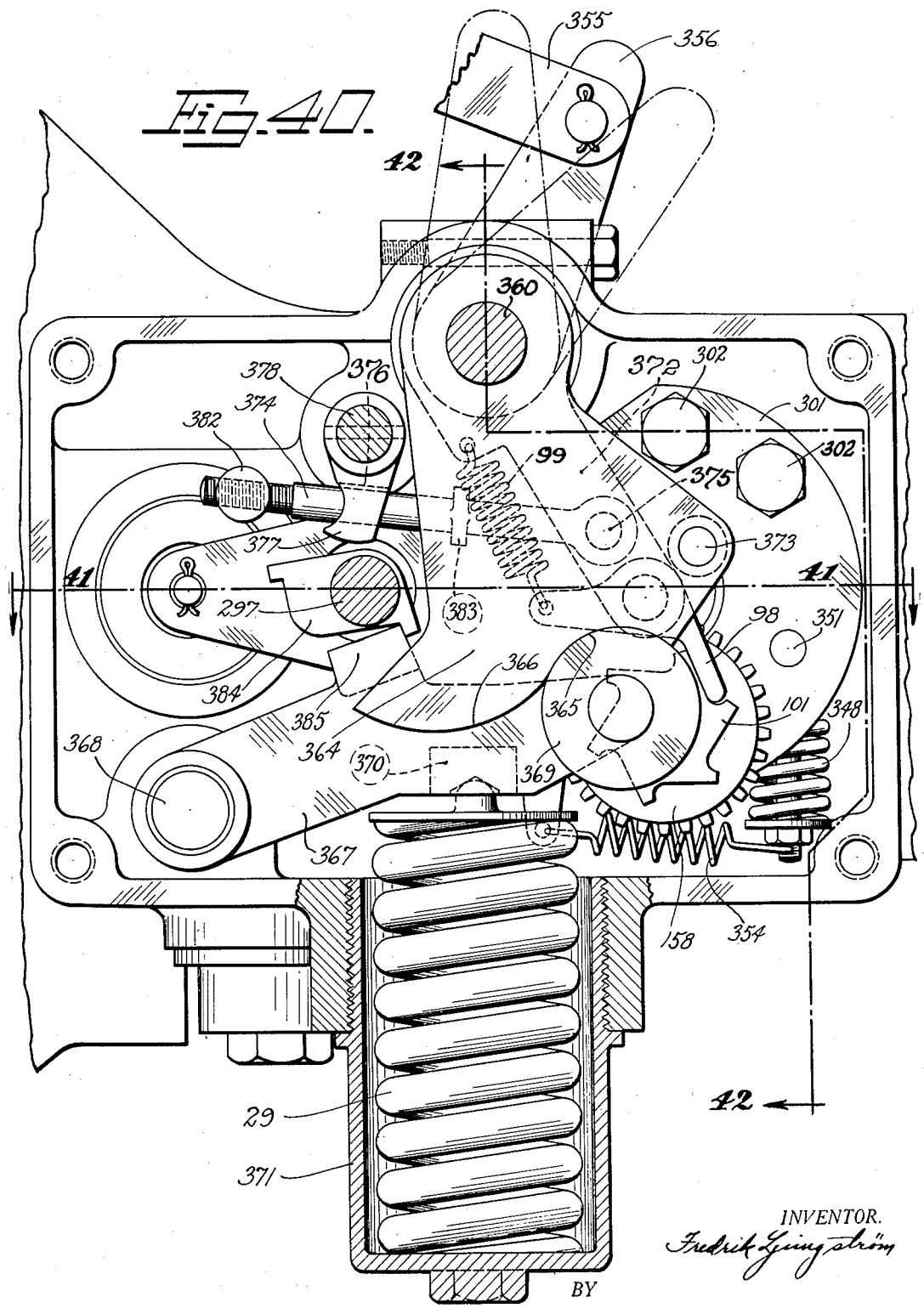

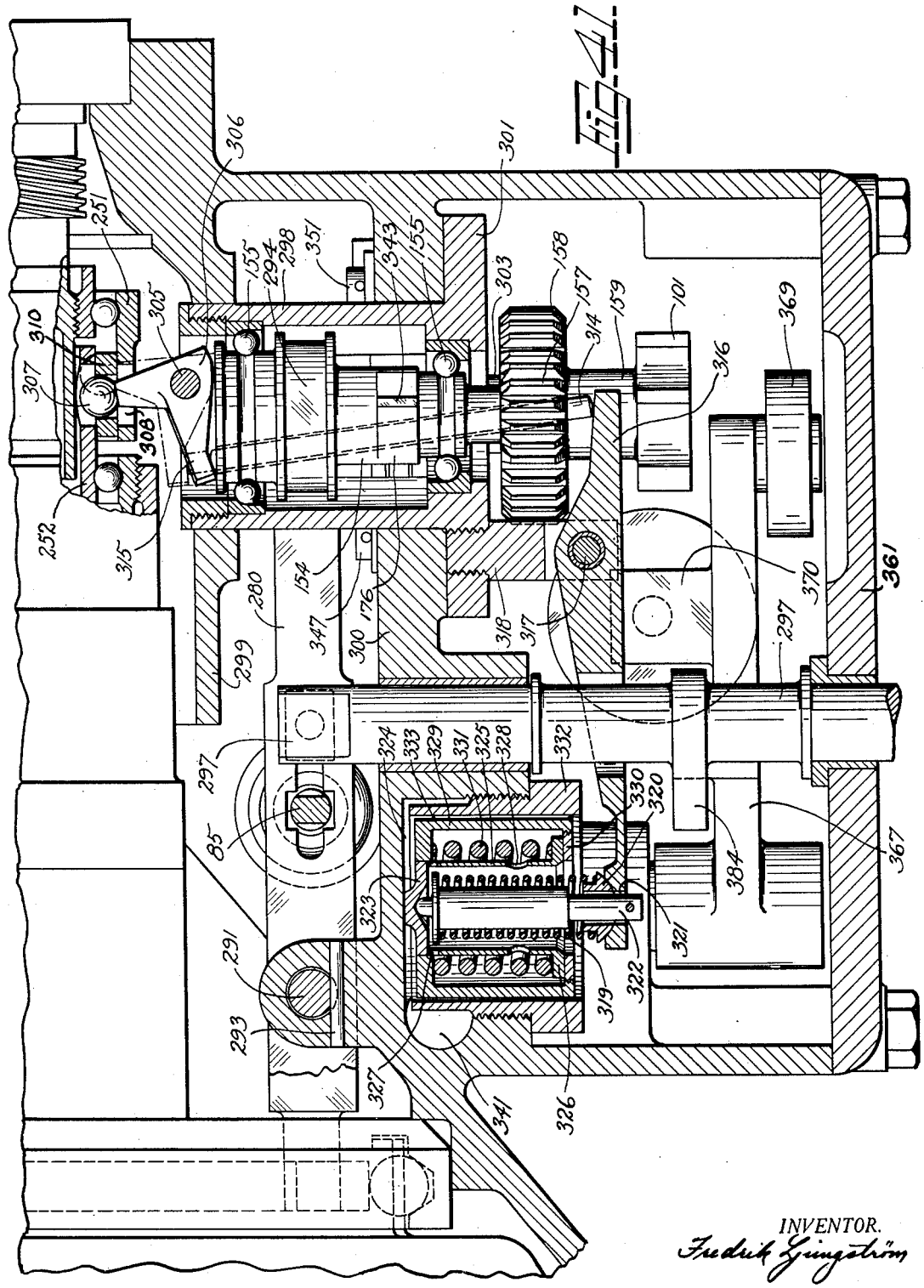

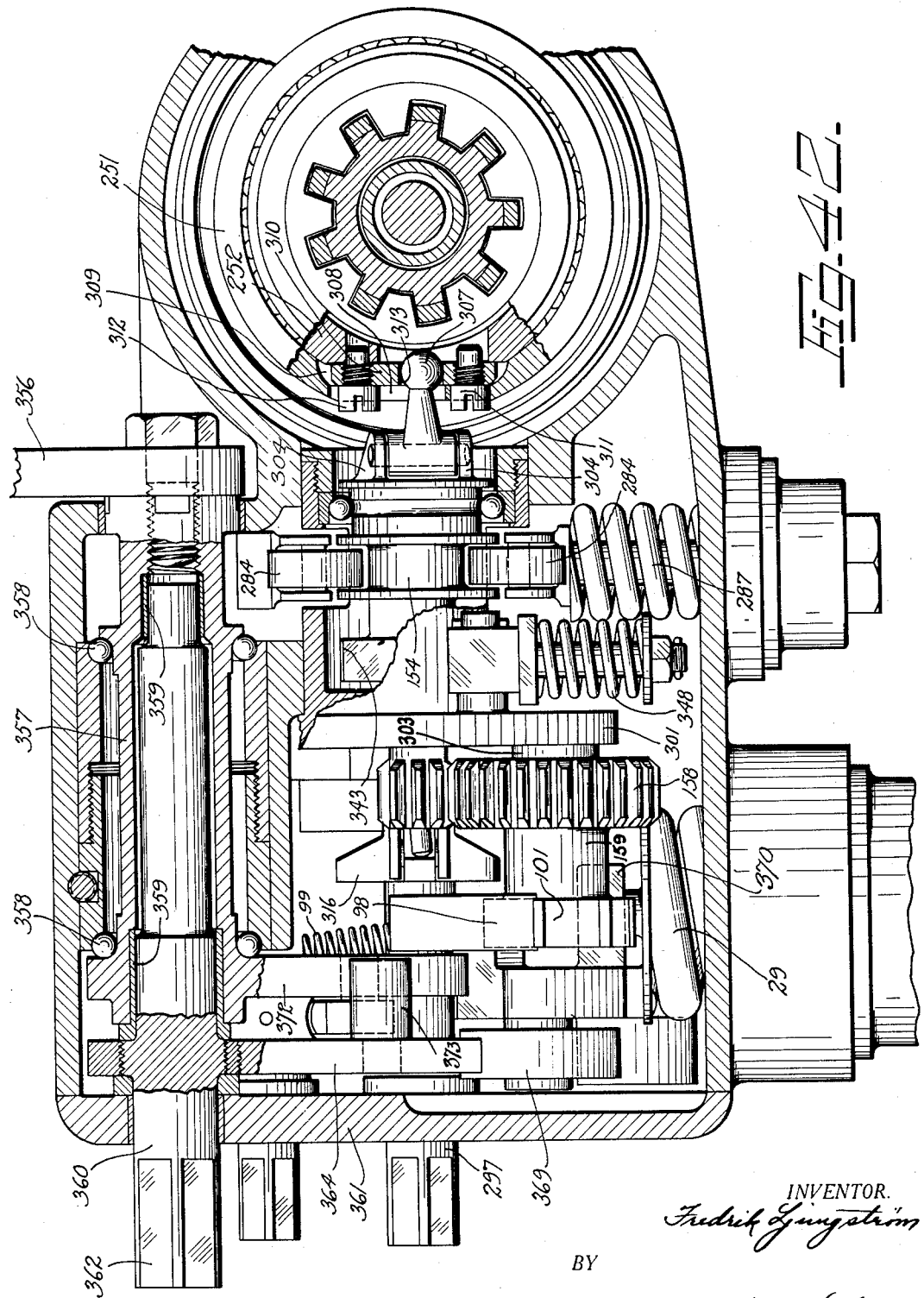

Aug. 22, 1933.     F. LJUNGSTROM     1,923,102
SELF PROPELLED VEHICLE
Filed Dec. 5, 1929     21 Sheets-Sheet 19
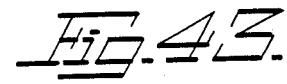
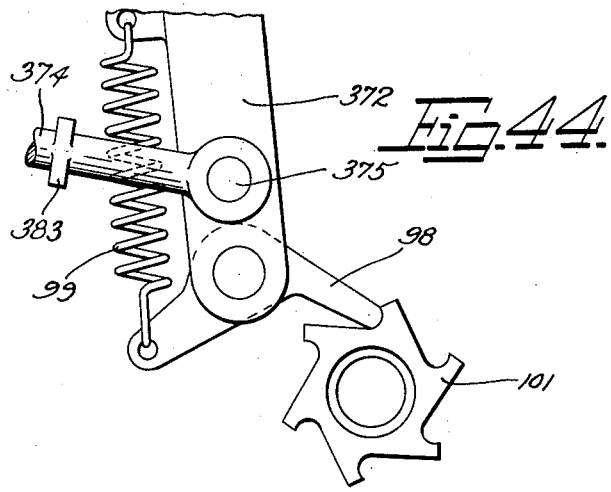
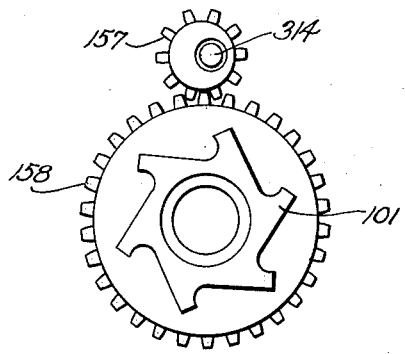
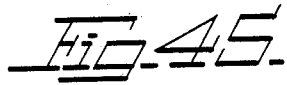
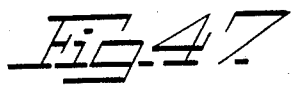
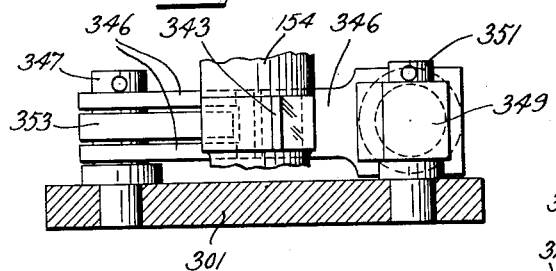
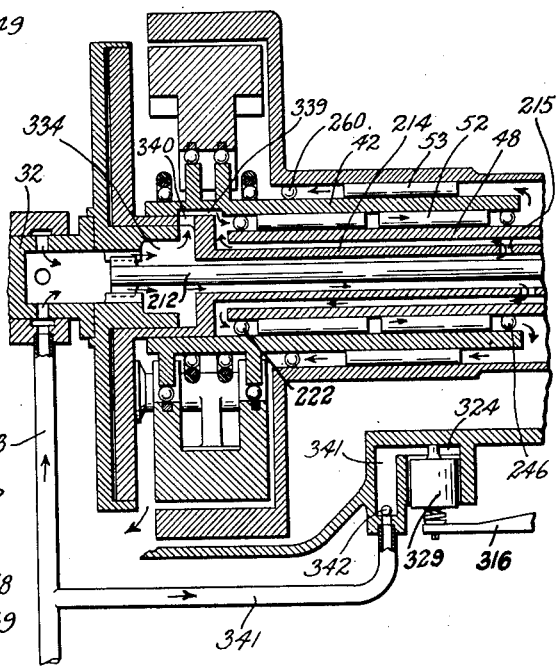
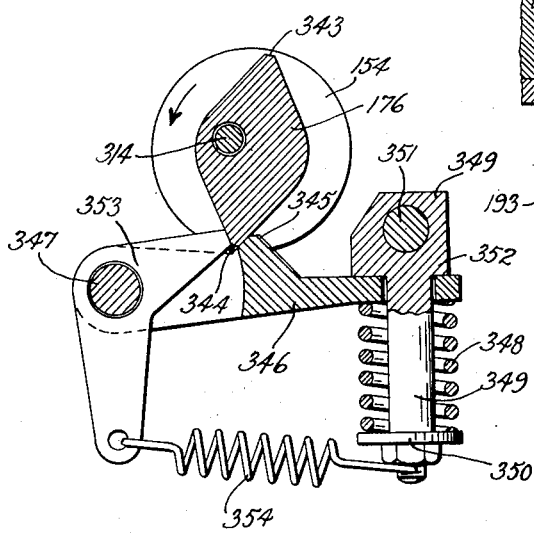
INVENTOR
Fredrik Ljungstrom
BY
Wm. F. Hedlund
his ATTORNEY

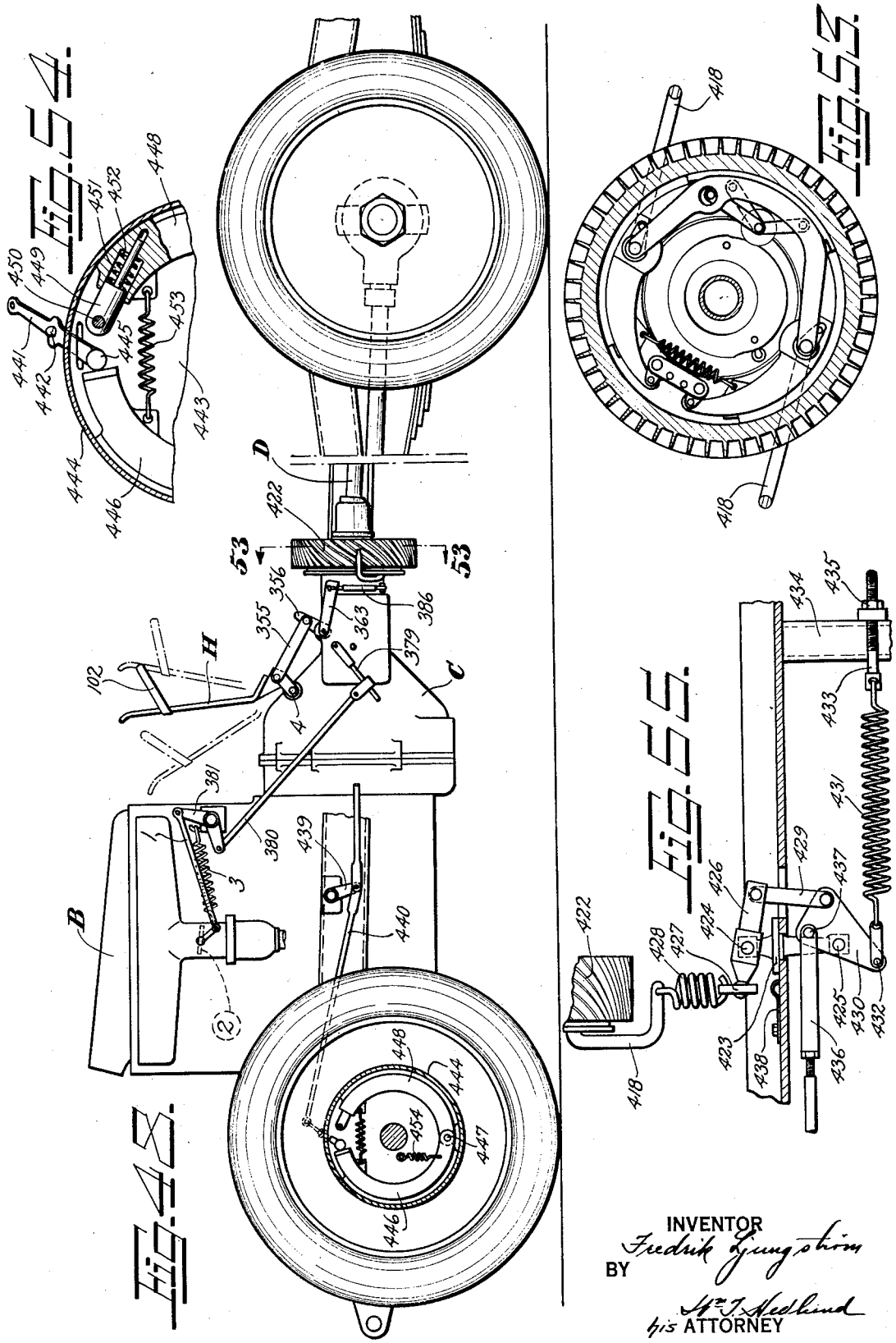

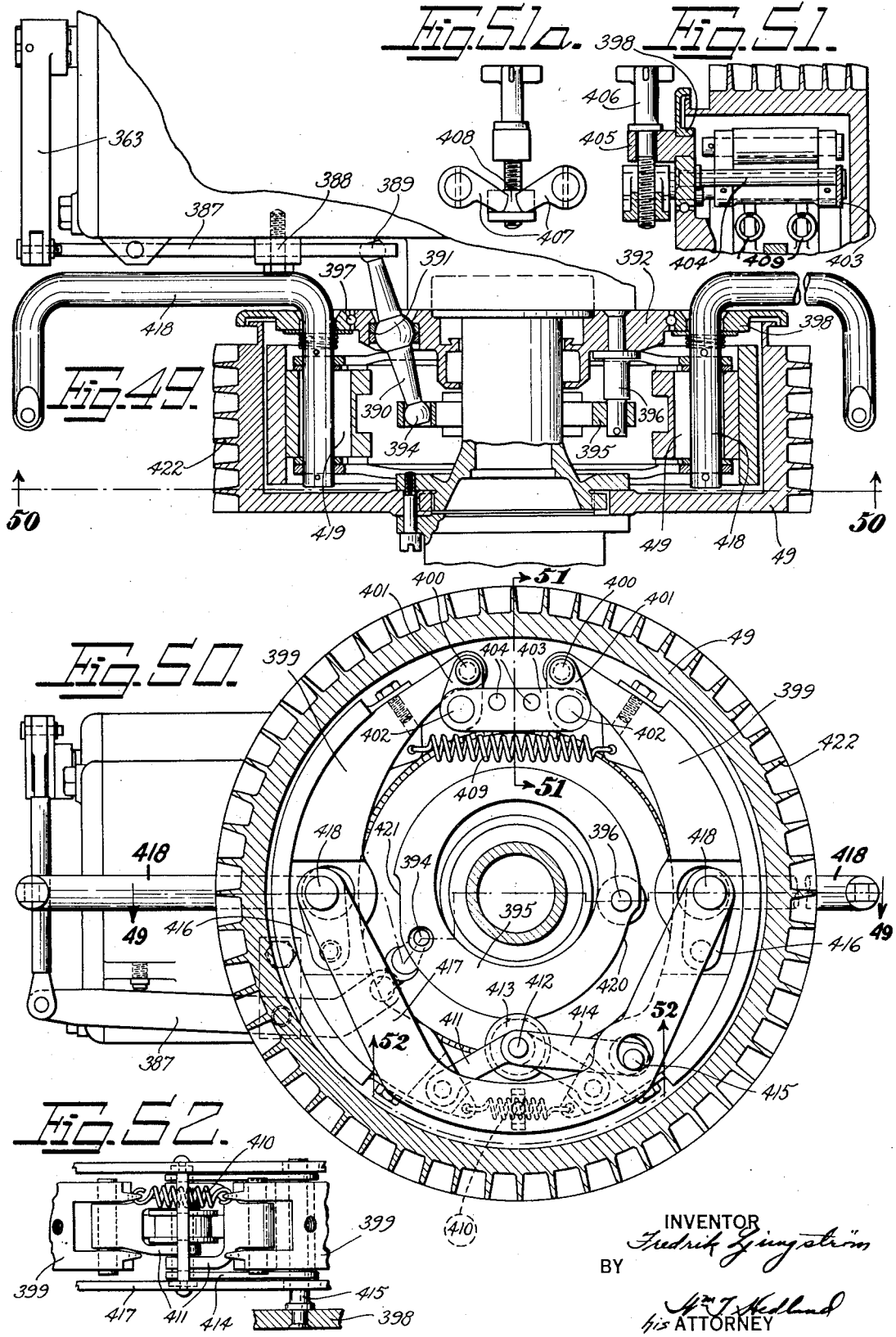

Patented Aug. 22, 1933

1,923,102

UNITED STATES PATENT OFFICE 1,923,102

SELF-PROPELLED VEHICLE

Fredrik Ljungstrom, Lidingo, Sweden, assignor, by mesne assignments, to Ped, Incorporated, a Corporation of Delaware Application December 5, 1929, Serial No. 411,709, and in Sweden October 14, 1925

90 Claims. (Cl. 180—70)

This application is a continuing application with respect to my copending application Serial No. 197,430, filed June 8, 1927, and consequently of my copending application Serial No. 139,420, filed October 4, 1926, of which the former application is a division, and for which a corresponding application for patent was filed in Sweden on October 14, 1925, and, further, is a continuing application with respect to my copending application Serial No. 330,740, filed January 7, 1929, and consequently with respect to my copending application Serial No. 218,293, filed September 8, 1927, of which application Serial No. 330,740 is a division, and for which corresponding applications for Letters Patent were filed in Sweden on March 1, 1927, and July 21, 1927. This application is to be considered as relating back to each and all of these copending applications, respectively, so far as herein continued, and to the dates and rights incident thereto, respectively.

The present invention relates primarily to self-propelled vehicles, though it will become obvious that it is not limited to such application.

More particularly the invention relates to operating control of vehicles such as automobiles which are propelled by an internal combustion engine or like type of prime mover having no starting torque and capable of producing but a small fraction of its rated power when run at very low speed.

The power characteristics of such engines are fundamentally unsuited to the propulsion of automobiles, which require a relatively heavy starting torque and frequently, due to grades and heavy traction conditions, require a maximum propelling power at low vehicle speeds.

In order, therefore, to successfully use internal combustion engines for driving automobiles, some form of power transmitting mechanism must be employed which permits the speed ratio between the engine and the driven or propelling element of the vehicle to be varied in order to meet the load conditions imposed on the engine at any given time. It is also necessary to provide means whereby the engine may operate while the driven element is at rest, in order to permit the engine to be started under no-load conditions, and, as a further operating consideration, to permit the vehicle to be stopped at will without in each case stopping the engine.

The form of transmission mechanism now substantially universally employed in automobiles propelled by internal combustion engines comprises a plurality of change speed gears, shiftable by the vehicle operator to provide the most suitable speed ratio obtainable. The usual number of speed ratios provided is three in forward direction and one in reverse. In addition to the change speed gear, means for breaking the driving connection or relation between the engine and the driven element of the vehicle must be provided in order to permit shifting of gears, and this means is ordinarily in the form of a friction clutch interposed between the engine and the transmission gear. Present standard practice provides a normally engaged clutch arranged to be released by depression of a clutch operating pedal, while shifting of gears is accomplished by movement of a hand-operated lever. Thus two separate controls, which must be independently operated, are necessary to the proper control of the power transmitting mechanism, and these controls must moreover be actuated in definitely timed sequence if proper operation is to be secured.

In addition to the above, the vehicle brakes must be controlled, and also the means for varying the power and speed developed by the engine. This brings to four the number of controls necessary to govern the factors affecting drive and these four controls require skillful, related manipulation if proper control of an automobile is to be secured. Such manipulation, moreover, must be accomplished with the attention of the operator largely taken up with the matter of steering, which, under present traffic conditions, requires close attention.

In one aspect, the invention has, therefore, the general object of providing a materially simplified control for internal combustion engine driven automobiles, requiring relatively little skill in operation to obtain safe and proper operation of the vehicle under all conditions. This object is attained by the provision of a variable-speed power transmission permitting the engine to operate with the driven element at rest while maintaining a driving relation between the engine and the driven element, in combination with means for controlling both the vehicle braking means and one or more additional factors, such for example as the means for varying the power of the engine or the means for reversing the direction of drive of the vehicle, by a single manually operable member or by members the positions of which are so related that they are manipulable in effect as a single member.

The more specific objects of this phase of the invention include the provision of, in each case in combination in an engine driven vehicle having a variable-speed transmission providing the operating characteristic just described, braking means tending to act at all times to arrest movement of the driven element of the vehicle; means including a manually operable pedal for releasing such braking means and for maintaining it in released position against its tendency to act; means for controlling the braking means and the engine throttle actuating means in sequence by a common manually operable member; means for actuating transmission reversing mechanism and for controlling braking means by operation of a single member; means for actuating transmission reversing mechanism and controlling both braking means and engine throttle actuating means by a single member; means for causing decrease in the brake applying force as the braking means is released; a manually operable member movable in the same direction to actuate a transmission reversing mechanism to effect change of the direction of drive from either forward or reverse direction to the opposite direction; a single manually operable member both for actuating a transmission reversing mechanism and for releasing braking means against a brake applying force, said member being free from said force during movement effecting reverse; a manually operable member for effecting reversal of the transmission and for controlling the braking of the driven element, said member being so arranged that full application of the brakes is assured before reversal can be effected; and means for insuring quick reversal of the transmission.

Further and more detailed objects of this phase of the invention will appear more fully as this specification proceeds.

In another aspect, the invention has for a major object the provision of a control arrangement such that the advantages of an automatically freewheeling or overrunning transmission may be utilized with maximum safety. By automatically free-wheeling or overrunning transmission I mean a form of mechanism which automatically permits the driven element to rotate freely with respect to the engine if, due to any cause, its tendency is to rotate at a speed greater than that of the engine. Such form of transmission permits an automobile to "coast" freely without subjecting it to the drag of the engine. While such drag may at times be utilized as a braking means, the driving of the engine by the vehicle through a non-freewheeling transmission results in loss in fuel economy, since when so driven it consumes more fuel than if permitted to slow down to idling speed immediately upon closure of the throttle to idling position. This is particularly noticeable in dense traffic, where deceleration is frequent, and in driving over hilly territory where down grades are frequently encountered.

Since with an automatically freewheeling or overrunning transmission the brakes must be relied upon entirely to effect deceleration, the brake control should be arranged so that the danger of its being mishandled under any operating condition is reduced to the minimum, in order to provide the requisite safety. This I accomplish first by providing braking means normally tending to act to stop the vehicle and requiring some conscious effort on the part of the operator to maintain the braking means in released position, and secondly, by combining the control of such braking means with the control of the engine throttle in such manner that a continuation of the movement made by the operator to close the throttle will cause the brakes of the vehicle to be applied. With this arrangement it becomes virtually impossible for the operator to become so confused as to fail to cause application of the brakes when necessary, since the instinctive lifting of the foot to close the throttle, if continued, acts to cause application of the brakes.

A further object of this phase of the invention is to safely secure the advantages of an automatically freewheeling transmission by the provision therewith of novel braking mechanism, capable of continuous braking action under heavy braking load without loss of efficiency due to overheating or wear.

Still further objects of the invention, in its different phases, together with the advantages to be derived from its use, will be more specifically dealt with in the following description of the several forms of apparatus for carrying the invention into effect which are illustrated in the accompanying drawings forming a part of this specification.

In the drawings:

Fig. 1 is a diagrammatic side elevation of the chassis of an automobile to which the invention is applied;

Fig. 2 is a plan view of the structure shown in Fig. 1;

Fig. 3 is a side elevation, on an enlarged scale, of the transmission and control mechanism shown in Fig. 1;

Fig. 3a is an elevation showing a modification of part of the structure shown in Fig. 3;

Fig. 4 is a plan view of Fig. 3;

Fig. 5 is a section taken on the line 5—5 of Fig. 4;

Fig. 6 is a vertical, central longitudinal section on a still further enlarged scale of the transmission shown in Fig. 3;

Figs. 7 to 10 are transverse sections taken on the respectively numbered section lines of Fig. 6;

Fig. 11a is a quarter section on an enlarged scale taken transversely through the clutch mechanism and illustrating the mechanism in one position of adjustment;

Fig. 11b is a view similar to Fig. 11a showing the clutch mechanism in another position of adjustment.

Fig. 12 is a diagrammatic elevation illustrating another form of control arrangement;

Fig. 13 is an elevation showing still another form of control arrangement;

Fig. 14 is a diagrammatic vertical section illustrating a part of the structure of Fig. 13;

Fig. 15 is a diagram illustrating variations in certain of the control forces acting in the system shown in Fig. 13;

Fig. 16 is an elevation showing still another form of control system;

Fig. 17 is an end elevation of Fig. 16 looking from the right, part of the structure being broken away to illustrate details in section;

Fig. 18 is an enlarged detail of part of the structure of Fig. 16;

Fig. 19 is a vertical, central longitudinal section of a second form of transmission;

Fig. 20 is a side elevation of parts of the structure shown in Fig. 19;

Fig. 21 is a horizontal, longitudinal central section showing part of the mechanism of the form of transmission illustrated in Fig. 19;

Fig. 22 is a section taken on the line 22—22 of Fig. 21;

Figs. 23 and 24 are transverse sections taken on the respectively numbered section lines of Fig. 19, parts of each of these sections being broken away for clearness;

Fig. 25 is a central longitudinal section drawn to scale of still another form of transmission which has been used on an automobile with a motor capable of developing about 50 h.p.

Fig. 26 is a transverse section taken on the line 26—26 of Fig. 25;

Fig. 27 is a side elevation partly in section and on an enlarged scale of part of a roller cage;

Fig. 28 is a section taken on the line 28—28 of Fig. 27;

Fig. 29 is a section taken on the line 29—29 of Fig. 28;

Fig. 30 is a section similar to Fig. 29 and on an enlarged scale illustrating in exaggerated form the clearance obtaining in parts of the structure;

Fig. 32 is a longitudinal section on an enlarged scale of a part of the clutch shifting mechanism, this section being taken generally normal to the plane of Fig. 25 along the lines 32—32 of Figs. 33, 34 and 35;

Figs. 33 and 34 are transverse sections taken along the respectively numbered section lines of Figs. 25 and 32;

Fig. 35 is an elevation of the clutch-shifting mechanism shown in Fig. 32, parts being broken away for the sake of clarity;

Fig. 36 is a longitudinal section of one of the clutch-shifting elements;

Fig. 37 is a side elevation partly in section of another clutch-shifting element;

Fig. 38 is a transverse section taken on the line 38—38 of Fig. 25;

Fig. 39 is a section taken on the line 39—39 of Fig. 38;

Fig. 40 is an elevation on an enlarged scale of the transmission control mechanism as seen in Fig. 48, with the housing cover plate removed;

Fig. 41 is a section on an enlarged scale on the line 41—41 of Fig. 40, certain parts being omitted for clearness;

Fig. 42 is a section on an enlarged scale taken on the line 42—42 of Fig. 40, and with certain parts broken away;

Figs. 43 to 46 are enlarged views illustrating parts of the mechanism shown in Figs. 40 to 42;

Fig. 47 is a diagrammatic sectional representation of the transmission illustrating the lubricating system thereof;

Fig. 48 is a diagrammatic side elevation of a chassis equipped with the transmission shown in Fig. 25 and illustrating the control system, parts of the vehicle being broken away for clearness;

Fig. 49 is a horizontal section on an enlarged scale taken on the line 49—49 of Fig. 50;

Fig. 50 is a vertical section on an enlarged scale taken on the line 50—50 of Fig. 49, and showing the brake mechanism in released position;

Fig. 51 is a section taken on the line 51—51 of Fig. 50;

Fig. 51a is a detail of Fig. 51 looking from the left thereof;

Fig. 52 is a section of Fig. 50 taken on the line 52—52, parts being omitted for clearness;

Fig. 53 is a view similar to Fig. 50, but showing the brake mechanism in engaged position;

Fig. 54 is a section on an enlarged scale of a part of the front wheel brake shown in Fig. 48; and Fig. 55 is a plan view, partly in section, and on an enlarged scale, of a portion of the brake mechanism broken away in Fig. 48.

Figure 31A:
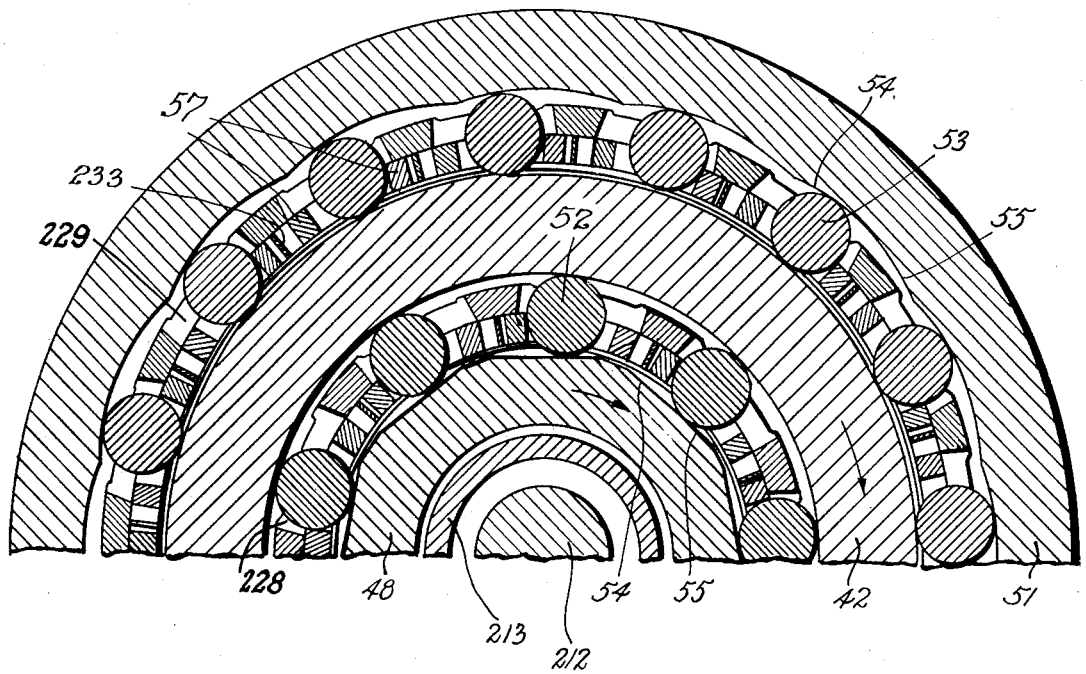
Fig. 31a is a transverse half section on an enlarged scale taken on the line 31—31 of Fig. 25 and showing the roller clutches in one position of adjustment.

Referring now to Figs. 1 and 2, A represents the frame of the automobile in which is mounted the power plant comprising an internal combustion engine B and transmission C, said power plant being connected to the rear wheels for driving purposes through the propeller shaft D and axle E.

The term power plant will be used herein to designate a power delivering mechanism including both a prime mover and a transmission, as distinguished from a prime mover alone.

A pivotally-mounted throttle or accelerator pedal F extending upwardly through the floor boards G is connected by means of link 1 to the engine throttle valve 2 of the usual butterfly type, said throttle being biased toward closed position by the spring 3.

While for purposes of illustrating the invention I have shown the several embodiments thereof as incorporated in an automobile propelled by the usual form of engine using a vaporized hydrocarbon for fuel, it will be understood that equivalent forms of engines may be used in which the fuel supply is controlled by means other than the specific form of throttle shown. The term throttle, as herein employed, is therefore to be understood as embracing broadly all forms of devices for controlling the power developed by a prime mover by altering the quantity, quality or timing of the fuel supply. Further, closed position of the throttle is to be considered as including a throttle position permitting only sufficient fuel to be supplied to allow idle running of the prime mover under no-load conditions.

Just below the pedal F the brake control pedal H extends upwardly through the floor board. As shown more clearly in Figs. 3 to 5, pedal H is pivotally mounted on pin 4 to one arm of a supporting plate 5 secured to the top of the transmission C by means of studs 6.

The driven element of the transmission carries a fly-wheel forming a brake drum J around which is positioned the flexible brake band 7, one end of which is secured to a fixed plate 8 anchored by means of studs 9 to a second arm of plate 5. The free end of brake band 7 is riveted as at 10 to the lower end of a vertically positioned rod 11, around which is slidably mounted the collar 12 carried by trunnions 13 in a carrier block 14 attached by means of pin 15 to the side of the lower arm 16 of pedal H just forward of the pivot pin 4.

Above collar 12 a spring 17 is retained around rod 11 between an adjusting nut 18 and a retaining collar 19. A U-shaped supporting rod 20, depending from the plate 5, supports at its lower end the lower pivot 21 of a linkage comprising links 22 pivotally connected at points 21, 23, 24 and 25. At the upper pivot 23 the linkage is secured to an anchoring member 26, member 26 being slidably mounted on the arm 16 and secured in adjusted position by means of a set screw 27. A rod 28 is secured to the pivot 24, while the pivot 25 has secured thereto one end of a spring 29 surrounding rod 28. The opposite end of spring 29 abuts against an adjusting nut 30.

In Fig. 3a, a modified form of pedal arrangement is shown, the free end of the accelerator pedal F being closely adjacent to the free end of the pedal H. Pedal H is provided near its free end with a projection or boss 31 spaced from the free end of pedal F when the two pedals are in their normal positions of rest and adapted to contact the free end of pedal F when pedal H is depressed beyond a predetermined distance from its position of rest.

The operation of the above described apparatus is as follows: The brake formed by drum J and band 7 is normally applied by the force of spring 29 acting between the adjusting nut 30 and the linkage pivot 25. Since the expansion of this spring tends to force the pivots 24 and 25 toward each other to lift the pivot 23 away from the fixed pivot 21, this action lifts the arm 16 of pedal H and with it collar 12, which in turn acts to transmit the upwardly directed force through spring 17 to the rod 11 attached to the free end of the brake band.

As will be seen from Fig. 3, in which the mechanism is shown in brake-applied position, the form of the linkage is such that when it is in this position the major portion of the force exerted by spring 29 is converted into lifting force applied to the pedal arm 16, so that maximum braking force is exerted when the brakes are applied.

The brakes are released by manual depression of pedal H, the resultant lowering of arm 16 causing the linkage to compress spring 29 and also causing depression of collar 12, which permits rod 11 to move downwardly. In this connection it is to be noted that spring 17 is a relatively heavy spring having a very small amount of expansion, so that a slight lowering of collar 12 is sufficient to take care of this expansion and leave the brake rod 11 free to move downwardly to release the brake. The function of spring 17 is to provide a resilient connection between the pedal arm 16 and the brake band 7 to prevent undue shock in case the brake is inadvertently applied too suddenly. In actual practice the nut 18 is so adjusted that the spring 17 is only compressed about one-eighth of an inch when the brake is in fully applied position, so that only this small movement of collar 12 in a downward direction is required before the compressive stress on spring 17 is relieved and rod 11 in turn relieved of all brake-applying force.

As pedal H is depressed to release the brake, the linkage will act to compress spring 29 and it will be seen that due to the change in position of the links, a progressively greater proportion of the force exerted by spring 29 will be counteracted by tension in the rod 28. In other words, as the brake is released, the links 22 approach positions parallel to rod 28, and the component, transverse to the axis of rod 28, of the force exerted by spring 29 progressively decreases, so that the resistance to the depression of pedal H also progressively decreases as the pedal is depressed from the position shown in Fig. 3.

The above described arrangement results in a braking control just the reverse of usual practice, there being a force tending to apply the brake at all times and the brake being released instead of applied by manual effort on the part of the operator. Furthermore, in contrast to usual practice, the brake is released by depression of the brake pedal instead of being applied by such depression. Inasmuch as the force due to the brake-applying means must be counteracted by manually applied force at all times when the vehicle is in motion, the brake-applying force must be substantially neutralized when the brake is released in order to relieve the operator from fatigue and the above described linkage is employed to effect this result as well as to cause the application of a progressively greater braking force when the brake is applied.

As shown in Fig. 3, the normal position of pedal H with the brake applied is adjacent to and above the operating end of the accelerator pedal F, this arrangement permitting both pedals to be operated by movement on the part of the operator of one foot without removing the foot from the brake pedal. It will be clear that as pedal H is depressed from the position shown, it will first act to release the brake and after the brake is released, continued depression of the pedal will permit the foot of the operator to come in contact with the accelerator pedal. Depression of the latter, as will be clear from Fig. 1, will cause the engine throttle to be opened.

As the operator's foot is lifted, pedals F and H will rise, and the engine throttle will be closed by the action of the usual throttle spring 3 before pedal H reaches the position where the application of the brakes is commenced. Braking is then accomplished by permitting further upward movement of pedal H under the influence of spring 29.

In Fig. 3a a modification of the pedal arrangement is shown whereby the same braking and throttle control is accomplished by means of a single pedal. In this instance, pedal F is adapted to be depressed to open the throttle by the contact of boss 31 on pedal H, there being sufficient clearance between pedal F, when the throttle is closed, and boss 31, so that pedal H must be depressed to an extent causing release of the brakes before pedal F is actuated.

The combination of the brake and throttle controls in the above interacting manner produces a simplification in the control of the automobile which is theoretically of advantage, but which if utilized with the ordinary form of transmission mechanism presents practical difficulties in operation. This is due to the fact that the ordinary form of transmission provides a non-yielding mechanical connection between the engine and the driven or propelling element to which the brake is applied, and operation of the brake arrangement just described is more likely to cause the operator of the vehicle to stall the engine than is the usual braking arrangement wherein the brakes are applied rather than released by positive action on the part of the operator.

In order, therefore, to secure the maximum benefit from the above described arrangement for controlling the brake and throttle, I provide means for maintaining a driving relation between the engine and the driven element, said means including a variable-speed transmission having a speed ratio which permits the engine to continue operation when the driven element is at rest while maintaining said driving relation.

I will now proceed to describe one form of such transmission, which is illustrated in Figs. 6 to 11b. Turning now to these figures, the transmission C comprises a driving shaft 32, which may be the crank shaft of engine B. A hollow fly-wheel 33 is secured to shaft 32. Mounted within the fly-wheel are three planetary pinions 34 supported by means of ball bearings 35 on three parallel axially extending studs 36. Studs 36 are mounted in the fly-wheel so as to move therewith and are spaced equi-distant from the fly-wheel axis. In order to secure rigidity of the fly-wheel assembly, an extension 37 is bolted to the fly-wheel, said extension serving to support one end of studs 36 and in turn being supported from the ball bearing 38 mounted in the frame or casing C of the transmission. A central gear wheel 39 is mounted coaxially with fly-wheel 33 in a manner to be described presently and meshes with the planetary pinions 34.

Inertia weights or masses 40, which I will hereinterm inertia masses, are mounted axially to one side of pinions 34 by means of a plurality of leaf springs 41 providing a certain degree of resiliency in the connection between the pinions and the masses. Inertia masses 40 rotate with pinions 34 about studs 36, and are axially displaced relative to each other so that the masses on different studs can move past each other at the center axis of the transmission, that is, the axis of shaft 32.

Gear wheel 39 is secured to a common clutch sleeve 42 by means of a flanged and threaded member 43 which holds the gear wheel 39 against another threaded sleeve 44, in turn secured to clutch sleeve 42. Gear wheel 39 and the forward end of sleeve 42 are rotatably carried in axial alignment with shaft 32 by means of ball bearing 45 clamped to the fly-wheel 33 by stud 46.

Positioned within sleeve 42 is the driven shaft 47, which has secured to its forward end the rotatable clutch sleeve 48. At its rearward end shaft 47 is rigidly secured ot fly-wheel 49, and this end of the shaft and the fly-wheel are supported by ball bearing 50. A stationary clutch sleeve 51 is positioned between driven shaft 47 and the rear end of sleeve 42, sleeve 51 being in axial alignment with sleeve 48 and being supported in a manner to be described.

Between the common clutch sleeve 42 and the rotatable clutch sleeve 48 is a set of cylindrical roller detents 52, and between the common clutch sleeve 42 and the stationary sleeve 51 is a second set of cylindrical roller detents 53. Each of sleeves 48 and 51 is provided with oppositely inclined gripping or wedging surfaces 54 and 55, as shown in Figs. 11a and 11b, which represent transverse cross-sectional views through either the rotatable clutch sleeve 48 or the stationary clutch sleeve. 51. Roller detents 52 and 53 are placed in cages 56, which are turnable with relation to sleeves 42, 48 and 51. Movement of the roller detents is constrained by leaf springs 57 situated adjacent to intermediate ribs or partitions 58 of the roller cages 56. Inasmuch as centrifugal force tends to displace springs 57 radially, flanges 59 are provided on ribs 58 in order to prevent such radial displacement. Springs 57 are wide at the middle and taper toward each end as indicated by dotted lines in Fig. 6 at the position of one of the right-hand detents 53. The ends of springs 57 are situated in apertures 60 in the annular end portions or walls of the cages, as shown in Figs. 11a and 11b. The apertures are situated and formed so as to restrict the movement of the springs so that they bear against the roller detents, in the middle position of the latter, only with sufficient force to hold the detents in position to facilitate assembly of the mechanism.

For reasons which will hereinafter appear, the springs 57 acting on the rollers 53 may be made somewhat weaker than the corresponding springs 57 acting on rollers 52.

As above stated, the roller cages 56 are turnable with respect to clutch sleeves 48 and 51, and from Figs. 11a and 11b it will be seen that as these cages are turned with respect to said sleeves, the roller detents will be caused to contact with the inner surface of sleeve 42 and either the gripping surfaces 54 or gripping surfaces 55 on sleeves 48 and 51, depending upon the direction in which the cages are rotated.

In order to effect proper operation of the transmission it is necessary for the roller cage 56, holding roller detents 52, to be positioned so that these roller detents contact one series of inclined gripping surfaces (for example, surfaces 54) of sleeve 48, while the cage holding roller detents 53 is positioned so that these latter detents contact oppositely inclined gripping surfaces (in this case, surfaces 55) of sleeve 51. With the sets of roller detents 52 and 53 contacting oppositely inclined wedging surfaces of the clutch sleeves 48 and 51, respectively, drive through the transmission will be effected in one direction in a manner presently to be described. Reversal of direction of drive through the transmission is accomplished by turning the roller clutches so that the sets of roller detents are moved away from contact with the wedging surfaces previously engaged and into contact with the oppositely inclined wedging surfaces on the respective clutch sleeves. This requires turning of the roller cages in opposite directions.

In order to provide the opposite turning of the cages, mechanism is provided comprising axially displaceable adjusting sleeves 61 and 62 situated around shaft 47 and within sleeves 48 and 51, respectively. Each of sleeves 61 and 62 has two diametrically opposed slots 63. Pins 64 are secured to and project inwardly from the roller cages 56 and extend into slots 63, the purpose being to cause pins 64, and consequently the roller cages 56 to be moved rotationally on turning sleeves 61 and 62. Pins 64 pass through suitable circumferentially extending apertures in sleeves 48 and 51.

There are also diametrically opposed slots 65 in each of sleeves 61 and 62, only one of the slots in each sleeve being shown in Fig. 6. Slots 65 are oppositely curved as shown. Pins 66 are secured to the rotatable clutch sleeve 48 and to the stationary clutch sleeve 51 and project into slots 65.

By this means, when sleeves 61 and 62 are moved axially in the same direction, they will be caused to move rotationally in opposite directions with respect to sleeves 48 and 51 respectively and will consequently move the pins 64 and roller cages 56 in opposite rotational directions with respect to the latter sleeves.

Sleeve 61 travels with sleeve 48 and consequently with the driven shaft 47, since the pins 66 fixed in sleeve 48 are located in the slots 65 in sleeve 61. Sleeve 62 does not move rotationally except when axially displaced relative to sleeve 51, since the pins 66 fixed in sleeve 51 extend into slot 65 in sleeve 62.

Although sleeves 61 and 62 are separate and have relative rotational motion, axial movement of these sleeves is effected by a single member. The mechanism for accomplishing this comprises a ring member 67 having two grooves or races for bearing balls. Balls in one race of member 67 also run in a race formed in sleeve 61. The other row of balls runs in a race formed in sleeve 62. By using races in which bearing balls run, axial movement can be transmitted through the ball bearings while permitting relative rotational movement of members 61, 62 and 67.

Diametrically opposed pins 68 are secured in ring member 67 (see Fig. 8). Pins 68 pass through longitudinal apertures in sleeve 42 and are secured at their outer ends to an annular member 69. Member 69 constitutes the inner race ring of another ball bearing, the outer race ring 70 of which is part of a shift sleeve 71, which is mounted in the frame or casing C so as to be axially movable. The ball bearing including parts 69 and 70 is of the form capable of transmitting axial movement from sleeve 71 to member 69. By moving shift sleeve 71 axially in one direction or the other, the inner sleeves 61 and 62 will be moved in the same direction while being simultaneously turned in opposite directions relative to rotatable sleeve 48 and stationary sleeve 51, due to the curved slots 65, the opposite turning movements relative to sleeves 48 and 51 being transmitted to the roller cages 56 by pins 64.

The clutch sleeve 42 should remain stationary during periods when rollers 52 are being shifted, and in order that this sleeve shall be and remain stationary during such periods, it is provided with an annular set of teeth 72, between which corresponding teeth 73 on the inside of shift sleeve 71 must pass in the axial movement of sleeve 71 necessary to shift the position of the roller detents. Thus, the shift sleeve 71 engages the clutch sleeve 42 during a portion of the axial travel of sleeve 71, and the clutch sleeve 42 is disengaged from the shift sleeve 71 only after the shifting movement of the latter is completed.

Shifting of the roller detents should not take place when the driven parts of the transmission including shaft 47 and fly-wheel 49 are turning, and in order to prevent such shifting unless these parts are at rest, shift sleeve 71 is provided at its right end, as shown, with an extension 74 having teeth 75 on the same. Teeth 75 must pass oppositely directed teeth 76 projecting inwardly from the fly-wheel 49 if the axial shifting movement of sleeve 71 is to be effected. These teeth may have oblique edges so that, if brought together during rotational movement, contact of the teeth will cause them to separate.

When the transmission is used on an automobile or other self-propelled vehicle, the driven parts are advantageously brought to rest by the action of the brake which stops the vehicle.

Shift sleeve 71 is moved axially by mechanism including an arm 77. Arm 77 has a ball and socket connection 78 with sleeve 71 and is pivoted at 79 to an arm 80. Arm 77 also has a ball and socket connection with a lever 81. Lever 81 has a ball and socket connection with a fixed casing member 82. In order to shift sleeve 71, the operator moves lever 81. Arm 80 is pivotally connected to a rocking member 83. Member 83 seats in a fixed member 84 and is normally held in fixed position in member 84 due to upward pressure of a wedge-shaped member 85. Members 80, 83, 84 and 85 are parts of mechanism for disconnecting the stationary sleeve 51 from the abutment or fixed parts of the transmission. This mechanism may be called a coupling. The coupling normally holds sleeve 51 rigidly secured to the abutment formed by the transmission casing, but can be released, as will presently be described, to free the sleeve from the abutment. The coupling comprises a heavy split ring spring 86 which surrounds shaft 47, sleeve 51 and a fixed sleeve 87 rigidly secured to the transmission casing. The separated ends of spring 86 are positioned at the top (see Fig. 10) and to each side of wedge-shaped member 85.

The right-hand end of sleeve 51 is slotted and extends between the inner sleeve 87 and the spring 86. Friction or brake blocks 88 are inserted in the slots of sleeve 51. These blocks are arranged in pairs, as shown in Fig. 10, and are normally squeezed by spring 86 against each other and against sleeve 87 so as to prevent sleeve 51 from turning.

A roller 89 is located at each side of the lower end of wedge-shaped member 68. Each roller 89 bears against a member 90 at each end of spring 86. A spring 91 bears upwardly against the rollers 89. Due to the action of spring 86, rollers 89 are forced against the lower inclined sides of wedge-shaped member 85, thus tending to force member 85 upwards against rocking member 83 and in turn seating member 83 in its uppermost position in member 84. If wedge-shaped member 85 is forced downwardly, rollers 89 and the ends of spring 86 are spread apart. This opens spring 86 and relieves the force on friction block 88, so that sleeve 51 is no longer rigidly held, but can rotate.

The operation of the transmission just described is as follows: If driving shaft 32 is rotated and gear wheel 39 is held stationary, the studs 36 move with the fly-wheel and the inertia masses 40 rotate around studs 36, alternately being positioned at the periphery and at the center of the planetary system. The speed of rotation of the inertia masses for a given speed of rotation of the driving shaft 32 depends on the relative diameters of gear wheel 39 and pinions 34. With equal diameters, as shown, and with gear wheel 39 stationary and driving shaft 32 rotating, each inertia mass will be drawn inwardly from its peripheral position, as shown in Fig. 7, to the center of the planetary system in one-half a revolution of the driving shaft 32, and will, during the succeeding half revolution, travel outwardly again to its peripheral position. During this cycle of movement, the centrifugal force developed by the rotation of each inertia mass about its axis of rotation will apply a turning moment to gear wheel 39, during the period when the mass is traveling inwardly, tending to rotate gear wheel 39 in the direction of rotation of the driving shaft. During the latter half of the cycle, when the inertia masses are traveling outwardly toward their peripheral positions, the centrifugal force developed by each mass will exert an opposite turning moment on gear wheel 39 tending to rotate said gear wheel in a direction opposite the direction of rotation of the driving shaft.

It will thus be seen that under the stated conditions, rotation of the driving shaft will result in the transmission to the gear wheel 39 of alternately opposite turning moments.

If gear wheel 39 is permitted to move in the direction of rotation of the driving shaft, it will require more than a half revolution of the latter shaft to draw the inertia masses inwardly from their peripheral to their center positions, until at the condition of equalized speed between the driving shaft and gear wheel 39, the inertia masses travel in circles concentric about the axis of the driving shaft, and exert at all times during such equalized speed a turning moment on gear wheel 39 tending to rotate it in the same direction as the direction of the driving shaft. During the condition of equalized speed each inertia mass assumes a position between the limit positions, which depends on the value of the turning moment required to revolve the driven shaft.

When the centrifugal force of the inertia masses balances the load torque on the driven shaft, the rotary motion of the inertia masses about studs 36 ceases and the planetary system acts to provide synchronous drive between the driving shaft and the gear wheel 39.

When the load torque on the driven shaft is greater than the centrifugal force of the inertia masses, the latter are automatically caused to follow their rotary paths about studs 36 and apply turning moments of alternately opposite sense or direction to gear wheel 39.

In a manner which will presently be described, synchronous drive between the driving shaft and the gear wheel 39 is made to effect synchronous drive between the driving shaft and the driven shaft, while the condition of drive under which the inertia masses transmit oppositely directed turning moments to gear wheel 39 is made to transmit to the driven shaft a lower speed of rotation than the speed of the driving shaft, resulting in a synchronous drive through the transmission between the driving and driven shafts.

Since the character of the forces applied to gear wheel 39 is dependent entirely upon the relative values of the centrifugal force developed by the inertia masses and the resisting torque on the driven shaft, it will be seen that synchronous or a synchronous drive will be automatically provided, depending upon the relation of the load on the driven member to the speed at which the inertia masses are moved by the driving member. This type of drive will be hereinafter referred to as automatic synchronous-asynchronous drive and is to be understood as including all equivalent forms of transmission which automatically vary the speed ratio between the driving and the driven shafts to produce either synchronous or asynchronous drive in order to properly meet varying load and power conditions.

For a more detailed exposition of the exact nature of the forces developed by the planetary system just described, reference may be had to my copending application Serial No. 407,236, filed November 14th, 1929, Patent No. 1,810,282, issued June 16, 1931.

The forces transmitted to gear wheel 39 by the pinions 34 are applied to drive the shaft 47 in the desired direction of rotation by means of the clutch mechanism comprising sleeves 42, 48 and 51 and the roller detents 52 and 53.

In describing the action of this mechanism I will term turning moments acting in the direction of rotation of the driving shaft as positive moments, and turning moments acting in the opposite direction as negative moments. I will further assume that the direction of the positive moments is clockwise, as viewed in Fig. 7.

Let us assume that the roller detents 52 are held by their cages and springs 57 in the position shown in Fig. 11b so that these detents contact with the inner surface of sleeve 42 and the surfaces 55 of sleeve 48, and that the detents 53 are held by their cage and springs in a position opposite that shown in Fig. 11b, that is, so that they contact the inner surface of sleeve 42 and the wedging surfaces 54 of sleeve 51. Let us further assume that the planetary system is operating under synchronous drive conditions so that gear wheel 39 and clutch sleeve 42 are rotating in clockwise direction (as viewed in Figs. 7 and 11b) under the influence of a continuous positive turning moment.

Under these conditions it will be seen that the detents 52 will grip between the inner surface of sleeve 42 and wedging surfaces 55 to transmit the motion of sleeve 42 to sleeve 48 and consequently to the driven shaft 47. When this condition obtains, under the assumed adjustment of the roller detents, the detents 53 tend to move away from the gripping surfaces 54 of the stationary sleeve 51 so that the roller clutch formed by sleeves 42 and 51 and detents 53 overruns or free-wheels continuously. This is the condition of direct or synchronous drive through the transmission, the force applied to gear wheel 39 and sleeve 42 being transmitted through the clutch mechanism comprising detents 52, while the clutch mechanism comprising detents 53 is, due to its overrunning action, in idle condition.

Now, let us assume that the load on the driven member increases to a degree causing the inertia masses to rotate about their individual axes and transmit alternate positive and negative moments to gear wheel 39. During periods when positive moments are applied, the action of the clutch detents will be the same as that occurring during synchronous drive, and the driven shaft will be rotated in the direction of rotation of the driving shaft. Immediately, however, upon the application of a negative turning moment to gear wheel 39 and sleeve 42, the tendency of the latter to rotate in counter-clockwise direction will cause the detents 53 to grip between the inner surface of sleeve 42 and the surfaces 54 of sleeve 51. Since sleeve 51 is fixed to the abutment formed by the transmission frame or casing, this tendency of the negative turning moments to rotate sleeve 42 in counter-clockwise direction is overcome, and movement of the clutch sleeve in this direction is prevented. During the period when a negative turning moment is being applied to sleeve 42, and clockwise rotation thereof ceases, the driven shaft continues rotation in clockwise direction due to the kinetic energy stored in the fly-wheel 49, and this rotation is permitted because of the fact that the roller detents 52 will automatically overrun or free-wheel, in the assumed position of adjustment, whenever the clutch sleeve 48 tends to rotate clockwise with respect to the clutch sleeve 42.

From the above it will be seen that during periods of asynchronous drive the positive and negative turning moments are segregated, the positive turning moments being transmitted to the driven shaft, and the negative turning moments being transmitted to the fixed abutment.

Reversal of the direction of drive of the driven shaft is effected by altering the position of the roller detents 52 and 53 with respect to their respective clutch sleeves 48 and 51, so that detents 52 contact the inner surface of sleeve 42 and the surfaces 54 of sleeve 48, while detents 53 contact the inner surface of sleeve 42 and the surfaces 55 of sleeve 51. With the roller detents adjusted in this manner, it will be apparent from a consideration of Fig. 11b that clockwise movement of the gear wheel 39 and sleeve 42 under the influence of positive turning moments will be arrested by detents 53 engaging to transmit the positive moments to the stationary sleeve 51. Likewise, it will be apparent that counter-clockwise rotation of sleeve 42 under the influence of negative turning moments applied to gear wheel 39 will cause detents 52 to transmit such counter-clockwise movement to the driven shaft 47 by their gripping action between the inner surface of sleeve 42 and the surfaces 54 of sleeve 48.

Alteration of the clutch mechanism from forward to reverse position or vice versa while the driven shaft is still running in the direction imparted by the clutch mechanism before alteration, would result in a great strain on the parts tending to bring the driven shaft to a sudden stop, which might result in a complete breakdown of the transmission. For this reason the meshing teeth 72 and 73 are provided on the clutch sleeve 42 and shift sleeve 71, respectively, and the meshing teeth 75 and 76 are provided on the shift sleeve 71 and the fly-wheel 49, respectively, so that the axial movement of shift sleeve 71 necessary to effect reversal of the position of the sets of detents 52 and 53 canot be effected unless the driven shaft and the clutch sleeve 42 have previously been brought to rest.

Axial movement of shift sleeve 71 to effect reversal of the direction of drive through the transmission is effected by movement of lever 81 to the right or left in Fig. 6. Movement of lever 81 normally causes movement of shift sleeve 71 by turning member 77 around point 79 as a pivot. However, under certain circumstances axial movement of shift sleeve 71 may be resisted due to the gripping action of the clutch roller detents 52 and 53. This condition arises when, for example, an automobile equipped with such transmission is permitted to come to rest on an upgrade with the transmission adjusted for forward drive and with the brakes not applied. Under such circumstances, the clutch mechanism including sleeve 48 and part of sleeve 42, which forms what I will term the action clutch, acts to transmit the tendency of the drive shaft to rotate in reverse direcion from the driven clutch sleeve 48 to the common clutch sleeve 42. Further, the mechanism forming the clutch including sleeve 51 and the remaining part of 42, which I will term the reaction clutch, acts to prevent reverse rotation of the common clutch sleeve 42 by connecting this clutch sleeve to the stationary or reaction clutch sleeve 51.

It will thus be seen that the action and reaction clutches, acting in series between the driven shaft and the stationary clutch sleeve 51 form in effect a brake which automatically prevents reverse rotation of the driven shaft when the transmission is adjusted for forward drive. When these clutches act in this manner it will be seen that the clutch roller detents are held in gripped position by the force tending to rotate the driven shaft in reverse direction, and when this force has a hight value, as for example, when an automobile is stopped on a steep grade without application of the brakes, the roller detents must be relieved from stress before they can be shifted. If, as assumed, the gripping of the clutch rollers in adjusted position causes resistance to movement of the shift sleeve 71, movement of lever 81 will cause member 77 to pivot around the ball and socket connection 78 as a fulcrum and move the arm 80 axially.

Movement of arm 80 axially in either direction will cause member 83 to rock to depress the wedge-shaped member 85 and through rollers 89 to spread the ends of spring 86. This action, by relieving the pressure on the friction blocks 88, frees the reaction clutch sleeve 51 and permits it to move rotationally to release the clutch detents of both clutches from the stress which holds them in gripped position. As soon as such stress is relieved, shift sleeve 71 is rendered free to move, and reversing adjustment of the clutches may then be easily effected by movement of lever 81. Further, as soon as the clutches are relieved from stress, the ball and socket connection 78 ceases to act as a fulcrum about which member 77 can be moved to actuate arm 80, and spring 86 is therefore rendered free to again grip the friction blocks 88 and lock sleeve 51 against rotation, this spring, together with spring 91, acting to return members 80, 83 and 85 to the position shown in Fig. 6.

Referring again for the moment to the control mechanism illustrated in Figs. 1 to 5, it will be observed that the positions of the brake pedal and the throttle or accelerator pedal are so positioned that the power or speed developed by the engine is of necessity limited when the brake is applied. Such an arrangement is highly desirable, if not essential, with the type of transmission just described. In such form of transmission, the forces transmitted through the several parts of the transmission to the driven shaft and to the abutment are due to the centrifugal force generated by the movement of the inertia masses 40. Since the value of the centrifugal force developed by these masses varies as the square of their linear speed varies, it will be seen that the centrifugal force developed by these masses will increase very rapidly as the engine speed increases. Furthermore, rotation of these inertia masses about their individual pivots will result in no useful work if the gear wheel 39 is stationary, as is the case when the brake is applied and the driven shaft held against rotation. If, therefore, with the brake applied, the engine throttle is permitted to remain open, the engine will run at excessive speed due to the fact that it is called upon to do no work and is operating under no-load conditions. This racing of the engine, in addition to being harmful to the engine itself, also throws an undesirably high strain on the transmission mechanism because of the tremendously high forces developed by the inertia masses 40, which rotate at excessive speed with the engine racing.

It is further to be noted that in the form of transmission just described, the driving force from the engine is transmitted to the driven shaft through a non-rigid or yielding mechanism. Furthermore, since the force transmitted to the driven shaft varies as the square of the speed of the inertia masses 40 varies, the value of this force will decrease rapidly with decrease in engine speed and at low or idling speeds the force developed by the inertia masses is insufficient to overcome the resistance to drive of the driven shaft.

It will thus be seen that the driven shaft may remain stationary with the engine operating, although the mechanism establishing the driving relation between the engine and the driven shaft remains undisturbed and the driving relation is maintained under such conditions. Also, it will be seen that sudden deceleration or stoppage of the driven shaft by quick application of the brake will not act to stall the engine, since the yielding nature of the driving connection permits the inertia masses, by changing their path of travel, to automatically take care of such changes in driving conditions.

Under average driving conditions for an automobile, the transmission will operate for longer periods in direct or synchronous drive then in indirect or asynchronous drive. When the transmission is operating in direct drive, the clutch detents 53 of the reaction clutch overrun idly, but are maintained in contact (except for the oil film) with the clutch sleeve surfaces with which they cooperate. In order, therefore, to minimize the wear on these detents, the springs 57 associated therewith may advantageously be made somewhat weaker than the springs acting to move the roller detents 52 into engagement with their cooperating clutch sleeves.

Lubrication of the transmission is effected by introducing a continuous supply of oil through the inlet conduit 193 which delivers oil to the rearward end of the clutch sleeve 42. The latter is provided with an end cap having an inwardly extending flange and under the influence of centrifugal force due to rotation of the parts the lubricant is forced forwardly within sleeve 42 through the parts comprising the reaction clutch. The oil is prevented from escaping through the slots in sleeve 42, through which the pins 68 pass, by means of the collars 42a which form inwardly extending flanges encircling the slots. The oil therefore continues to flow forwardly within sleeve 42 to lubricate the action clutch, and after having lubricated this clutch is thrown outwardly by centrifugal force through the ports 42b at the front end of sleeve 42. These ports are positioned so that the oil passing through them is thrown outwardly to the channels 36a, through which it passes to the interior of the hollow pinions 34. From the interior of these pinions the oil flows through the bearings 35 and also flows through the passage 34a to lubricate the teeth of pinions 34 and gear 39. After lubricating the gear and pinion assembly, the oil is thrown by centrifugal force to the interior of the hollow fly-wheel 37 and escapes therefrom through port 37a near the periphery of the fly-wheel. The movement of the parts of the transmission when in operation furthermore causes an oil mist to form within the transmission which serves to lubricate the various parts thereof not directly reached by a stream of circulated lubricant. The oil, after having lubricated the parts, flows by gravity to the bottom of the casing C at the forward end thereof, where it is picked up by the starter gear teeth 197 on the fly-wheel and carried to the pocket formed by the projection 197a (see Fig. 7). From this pocket the oil is discharged through the port 337a, from which point it is carried through a conduit (not shown) to the source of supply, which may be the engine crank-case, from which it is re-circulated. For a more detailed disclosure of this feature of the transmission, reference may be had to my co-pending application Serial No. 407,236, Patent No. 1,810,282.

In Fig. 12 there is shown in diagrammatic form another control arrangement in which the mechanism for reversing the direction of drive through the transmission is actuated by the same member which controls the braking means and the throttle actuating means. Like reference characters will designate corresponding parts. F again represents the accelerator or throttle pedal, G the floor boards and H the brake pedal which in this instance also serves to effect reversal and control of the throttle. Pedal H is shown in positions I, II, III and IV, the range of movement between positions I and II being that in which control of the throttle mechanism is effected, the range between positions II and III being that in which the brake control is effected, and the range between III and IV being that for effecting reversal.

Pedal H is pivoted at point 4 below the floor boards and at this point there is also pivoted a second lever 92 having an arm 93 connected at point 23 to the linkage comprising links 22. The pivot 21 of this linkage is fixed to any suitable abutment and the linkage acts to compress the brake spring 29 as lever 92 is depressed. The action of this part of the mechanism is similar to that described in connection with Fig. 3. Lever 92 has a second arm 94 extending in opposite direction from arm 93 and the lower arm 16 of pedal H is adapted to engage an abutment 95 on arm 94 when pedal H is depressed beyond the position III. Pivotally connected to arm 92 is a link 96 which in turn is connected to a brake lever 97. Lever 97 is adapted to actuate a brake (not shown), the brake being applied when lever 97 is in position III and released when this lever is moved to position II.

Arm 16 has pivotally mounted thereon the lever 98 which is biased in clockwise direction from the position shown in full lines by the spring 99. The free end of lever arm 94 is notched as at 100 and by reference to the figure it will be seen that as the pedal is moved below position III lever 92 will be depressed by the contact of the arm 16 with abutment 95 and that the upper end of lever 98 will be received in the notch 100 to maintain the pedal lever and lever 92 in connected relation when they are below position III.

The transmission reversing mechanism is actuated, in a manner which will later be described in detail, by the rotation in clockwise direction of a reversing ratchet-wheel 101, reversal of the direction of drive of the driven shaft of the transmission from clockwise to counter-clockwise and vice versa being effected by rotation of ratchet-wheel 101 one-sixth of a revolution in clockwise direction.

As will be evident from the figure, lever 98 acts as a pawl to effect movement of one-sixth of a revolution of wheel 101 when the pedal H is depressed from position IV to position III. Pedal H is normally maintained in position III by the action of brake spring 29, this position being termed the position of rest of the pedal. The pedal is brought to position IV by manual action on the part of the operator and for this purpose the pedal is provided with a stirrup 102 through which the foot of the operator is inserted.

For reasons which will hereinafter appear it is highly desirable that reversal be effected rapidly and rapid actuation of wheel 101 is insured by mechanism comprising a fixed plate 103 through which a bolt 104 loosely passes. A relatively heavy coil spring 105 is held under compression between the head of bolt 104 and the top of plate 103. Secured to bolt 104 below plate 103 is member 106 having an arm adapted to contact the projections between the pawl notches on ratchet-wheel 101. Member 106 is positioned so that these projections cannot pass this member except by displacing it and such displacement of member 106 is effected by causing this member to tilt with respect to the fixed plate 103. In order for member 106 to tilt, spring 105 must be compressed and it will, therefore, be seen that member 106 imposes an initial resistance to movement of the wheel 101 and consequently to initial movement of pedal H from position IV to position III. Initial movement of wheel 101 causes member 106 to pass over the projection with which it is in contact into the succeeding pawl notch, thereby suddenly ceasing to cause resistance to the further rotation of ratchet-wheel 101. Since the force necessary to overcome the resistance of member 106 is generated by muscular tension on the part of the operator, the sudden releasing of the resistance to depression of pedal H will cause an involuntary rapid depression of the pedal on the part of the operator due to such muscular tension.

It will be noted that in effecting reversal the pedal arm 16 is lifted away from the abutment 95 and, due to the fact that the position of lever 98 is altered by contact with wheel 101, this movement is permitted since the upper end of lever 98 is moved out of the recess 100. Lever 92 is prevented from moving above position III under the influence of spring 29 due to the rigid connection between this lever and the brake mechanism which is fully applied in position III and, therefore, incapable of further movement. It will, therefore, be seen that during reversing movement pedal H is entirely free from the influence of the brake spring.

When pedal H is depressed from position III to position II to effect release of the brake it contacts with the free end of pedal F which is normally held in position II by the action of the throttle spring. Further depression of pedal H causes depression of pedal F to position I to open the throttle in much the same manner as that illustrated in Fig. 3a.

It is important to note that the arrangement of the three ranges of movement of pedal H is such that reversal can be effected only after the throttle has been closed and the brake fully applied.

Another control mechanism is shown in Fig. 13 similar in action to the control shown in Fig. 12. In the present embodiment pedal H is pivoted around the pin 4 and is shown in full lines in the position of rest with the brakes applied. The brakes are actuated by means of brake rods 107 pivotally secured to the opposite ends of brake lever 108. Also pivoted around pin 4, independent of pedal H and integral with the brake lever 108, is a curved brake arm 109, the free end of which has secured thereto a pivot pin 110. A second pivot pin 111 is fixedly secured to the transmission casing or other fixed abutment and between these two pivot pins the brake spring 29 is held in compression between the spring retainers 112. The brakes are applied by the tendency of spring 29 to lift the arm 109 and consequently rotate the bake lever to the position shown in full lines, which represents brake-applied position.

Arm 109 is provided with a laterally extending boss 113 adapted to be engaged by the lower arm 16 of the pedal H so that, upon depression of the pedal from the full line position to the broken line position, spring 29 will be compressed and moved to the broken line position and the brakes released by movement of the brake lever 108 to the broken line position.

As in the preceding modification, depression of pedal H to a position releasing the brakes will cause the pedal to abut the throttle or accelerator pedal F and movement of the pedal below this position will effect actuation of the throttle. Reversal is also effected, as in the previous modification, by lifting the pedal through the medium of stirrup 102, causing the pivoted lever 98 to engage the next succeeding notch of ratchet-wheel 101 so that depression of pedal H from its lifted position to the full line position shown in the figure will cause wheel 101 to be rotated in clockwise direction one-sixth of a revolution.

It is desirable to graduate the pressure required to depress pedal H so that during its movement through the brake-operating range the resistance to depression gradually decreases as the pedal is depressed. In the throttle operating range, below the brake actuating range, the pressure tending to return the pedal to the position of rest should be relatively light in order to avoid fatigue on the part of the operator. I therefore provide means by which the pressure necessary to move the pedal through its ranges of movement may be made such as to secure the easiest and most sensitive control.

It will be seen from Fig. 13 that as the pedal is depressed through its braking range, pivot pin 110 approaches the axis K drawn between the centers of pivot pins 111 and 4 thereby decreasing the moment arm through which spring 29 acts to lift pedal H. Thus the resistance offered by spring 29 to depression of the pedal gradually decreases as the pedal is depressed. At or near the end of the range of movement effecting release of the brakes the pivot pin 110 is brought into alignment on axis K between pivot pins 111 and 4 and in this position spring 29 would exert no turning force on pedal H if it were freely pivoted at its ends. Continued depression of pedal H to the position shown in broken lines would cause pivot pin 110 to pass to the other side of the axis K and, if spring 29 were freely pivoted, to exert a force acting to depress arm 109 and move it away from the pedal. The exertion of such downward force is prevented by constraining the movement of spring retainers 112 about the axes of pins 110 and 111 in certain positions of the spring.

As shown in Fig. 14 the retainers 112 are provided with pins 114, these pins being received in recesses the walls of which form abutments 115 and 116 preventing free rotation of the retainers 112 as the pivot pin 110 is moved to a position just above intersection with the axis K. When pivot pin 110 is moved below this position it will be seen that due to the contact of pins 114 against abutments 115 and 116 spring 29 will be subjected to bending stress tending to make it resist further depression of pivot pin 110 and this resistance increases as the depression of pivot pin 110 is continued to a point below the axis K. This resistance due to bending counteracts or slightly overbalances the tendency of the spring in its lower position to move the pivot pin 110 to a still lower position, so that in all positions of the spring the net force exerted thereby is in a direction tending to lift the arm 109 and the pedal H. It will be seen from the above that the force exerted by spring 29 through its entire range of movement may readily be made to vary in accordance with the desired characteristics by proper arrangement and proportion of the parts constraining movement of the spring.

In Fig. 15 I have illustrated by means of curves the forces acting on pedal H in a typical arrangement. The area under curve M represents the work necessary to apply the brake by movement of the pedal from position II to position III. The area under curve N between the corresponding points represents the work required to depress pedal H against the action of the brake spring 29. It therefore follows that the area below curve O, which represents the difference in the area under curves N and M, represents the work which must be manually done to depress the pedal. In other words, curve O is a measure of the resistance to depression of the pedal due to the excess of spring pressure over the force required to set the brakes. At the position of brake release, indicated by II, it will be observed that some pressure on the part of the operator must be exerted to maintain the pedal H in this position, and as the pedal is depressed further from position II to position I the amount of pressure required on the part of the operator must be slightly increased. The operating pressure required during this range of movement may be supplied in some measure by the spring tending to maintain the throttle in closed position but if desired, the resistance to depression of the pedal in this range may be supplied in whole or in part by the action of the brake spring 29. If the latter arrangement is employed, the form of construction shown in Fig. 13 may be advantageously employed to secure the desired force exerting characteristics from the brake spring.

Still another form of control is shown in Figs. 16 and 17. In this form an inwardly extending arm 117 of pedal H is rotatably secured within sleeve 118 which in turn is rotatably mounted in the transmission casing. Depending from the lower arm of pedal H is a second arm 119, to the lower end of which is pivoted the pawl lever 98 adapted to actuate the reversing-wheel 101 in the manner previously described. Sleeve 118 has formed integral therewith the depending arm 120 adjacent the lower end of which a second arm 121 extends forwardly toward arm 119. The outer part of arm 121 is forked as at 122, the arrangement being such that depression of pedal H from the position shown in full lines will cause counter-clockwise movement of arms 120 and 121 due to the abutment of arm 119 against the end of arm 121. Since arm 117 and sleeve 118 are separately movable, pedal H may be lifted from the position shown without moving sleeve 118 and arm 120.

Secured to the lower end of arm 120 is cam block 123 having a recessed cam surface 124 adapted to receive a roller 125 mounted at the end of lever arm 126. Arm 126 is in turn rigidly secured to the end of a spring steel torsion rod 127. Rod 127 is mounted transversely in the lower portion of the transmission casing, projecting through the latter at each end. At the end opposite that to which arm 126 is attached a second arm 128 is rigidly secured, the movement of said arm in clockwise direction from the position shown in Fig. 16 being arrested by the abutment of an adjustable stop 129, secured to the end of the arm 128, against a suitable boss 130 formed on the side of the transmission casing. Brake rod 107 is secured to the arm 121.

As is shown in Fig. 18, movement of cam 123 to the right due to depression of pedal H will cause roller 125 to be moved downwardly out of cam recess 124 to the cam surface 131. This movement is accomplished against the torsional resistance of rod 127 which tends at all times to lift arm 126 and roller 125. This action on the part of the torsion rod 127 is utilized to move arm 121 to the left (Fig. 16) to apply the brakes through movement of rod 107. When the pedal is depressed to the throttle operating range, roller 125 is in contact with the cam surface 131 and the tendency of roller 125 to lift under the influence of torsion rod 127 may be neutralized to whatever degree is desired by varying the contour of the cam surface 131. For example, if cam surface 131 is in the form of an arc struck about the axis of sleeve 118 as a center, the roller 125 would exert no rotational force on arm 120 when in contact with cam surface 131.

In the range of movement in which the roller 125 is in contact with cam surface 131 the pedal H is in contact with the throttle lever F so that in the lower range of movement of pedal H control of the throttle is obtained as in the previously described embodiment.

The amount of force exerted by the torsion rod 127 to effect application of the brakes may obviously be adjusted by adjustment of the stop 129 to move the upper end of arm 128 with respect to the fixed boss 130.

In Figures 19 to 24 a second form of transmission is illustrated, this embodiment being suitable for use in conjunction with any of the forms of control mechanism illustrated in Figs. 6 to 18. Like reference characters will again indicate corresponding parts.

In the present embodiment 32 indicates the engine driving shaft to which is secured fly-wheel 33. Fly-wheel 33 is provided near its periphery with two diametrically opposed driving studs 132 (Fig. 23) carried by plates 133 secured to the face of the fly-wheel.

Each stud 132 is connected by means of link 134 to a pin 135 mounted adjacent to the periphery of an inertia mass 40. Instead of employing three inertia masses as in the form of transmission shown in Fig. 6, only two inertia masses are provided. As may be seen from Fig. 19, one inertia mass is of T-shaped cross-section while the other mass is of U-shaped cross-section. The T-shaped mass is carried on double row ball bearing 136, the inner race of which is mounted on eccentric 137. The other inertia mass is carried by spaced single row ball bearings 138, the inner races of which are mounted on two spaced eccentrics 139, between which is located the eccentric 137. Eccentrics 137 and 139 are formed integrally with a sleeve member 140 rigidly secured to the common clutch sleeve 42 and the center of eccentric 137 is diametrically opposite the center of eccentric 139.

The driven shaft 47 is again carried within sleeve 42 and has secured to its forward end the action clutch sleeve 48. Between sleeves 42 and 48 are positioned the roller detents 52 carried in cage 56.

The reaction clutch sleeve 51 is also mounted within the common clutch sleeve 42 and between these two sleeves are reaction clutch detents 53 held in a second cage 56.

The outer surfaces of sleeves 48 and 51 are formed with oppositely directed gripping surfaces such as are shown in Figs. 11a and 11b and the detents 52 and 53 are retained within the cages by means of springs arranged in the manner of springs 57. Further, the alteration of the clutch mechanism to change the direction of drive to the driven shaft is accomplished in the manner already described, that is, by simultaneous movement of the roller cages 56 in opposite directions.

In the present embodiment each of the roller cages 56 is provided with a plurality of inwardly extending teeth 141, the teeth of the action clutch cage engaging the oblique slots 142 in an adjusting sleeve 143 while the teeth of the reaction clutch cage engage oppositely oblique grooves 144 in adjusting sleeve 145. Sleeves 143 and 145 are provided with axial grooves 146 and 147 respectively. Inwardly directed teeth 148 on sleeve 48 engage grooves 146 and a similar set of teeth 149 on sleeve 51 engage grooves 147.

By reference to Fig. 20 it will be seen that axial movement of the sleeves 143 and 145 in the same direction will cause simultaneous rotational movement of cages 56 in opposite directions with respect to the clutch sleeves 48 and 51 with which they are associated.

Sleeves 143 and 145 correspond to sleeves 61 and 62 in the form of transmission shown in Fig. 6 and are axially shifted by movement of the ring member 67 which is connected to the sleeves by separate ball bearing connections as previously described. Member 67 is in this embodiment pinned directly to a shift sleeve 150 slidably mounted on the clutch sleeve 42 and rotatable therewith.

Sleeve 150 forms the inner race of a ball bearing 151, the outer race of which is formed by shift ring 152 having an external groove 153.

Referring to Figs. 21 and 22, the reversing mechanism for axially shifting sleeve 150 is shown. This mechanism comprises a reversing shaft 154 carried at its ends by ball bearings 155 mounted in a suitable carrier bolted to the transmission casing. Shaft 154 lies in the central horizontal plane of the transmission and at right angles to the axis of sleeve 150. At its inner end shaft 154 is provided with an inwardly projecting pin 156 eccentrically mounted with respect to the axis of the shaft, pin 156 being located in groove 153 of the shift ring 152. The shaft 154 is provided with a spur gear 157 which meshes with gear 158. Gear 158 is provided with three times the number of teeth on gear 157 so that one-sixth of a revolution of gear 158 will cause one-half a revolution of gear 157 and the reversing shaft. Gear 158 is secured to the inner end of a short stub shaft 159 which is rotatably mounted in the transmission casing and projects therethrough. The projecting end of shaft 159 has formed integrally therewith the reversing ratchet-wheel 101.

Turning again to Fig. 19 it will be seen that the reaction clutch sleeve 51 is secured to a sleeve-like member 160, the latter being in turn secured to a relatively heavy fly-wheel or inertia weight 161 which will hereinafter be referred to as a reaction weight or mass. Passing through the reaction mass 161 adjacent to its periphery are a plurality of pins 162 serving as pivots for spring hangers 163 which in turn hold the outer ends of a plurality of radially arranged coil springs 164. The inner ends of these springs are held by hangers 165 which are pivoted about pins 166 secured in an annular ring 167 the outer circumference of which forms an inner race for a set of bearing balls 168. The other race for these bearing balls is formed on the inner periphery of a second annular ring which is centered within the transmission casing and held against rotation by means of the radially positioned studs 169 (see Fig. 24). The annular ring member 167 is provided with a plurality of radially projecting teeth 170.

As shown in Fig. 21 the teeth 170 are adapted to mesh with teeth 171 on one end of a bellcrank lever 172 pivoted about the fixed pin 173 and having mounted on its other end a ball bearing 174, the outer race of which is adapted to be engaged by a cam 175 on the reversing shaft 154. Reversing shaft 154 is further provided with a second cam 176 adapted to engage a cam surface on one end of a second bellcrank 177 which is also pivoted around pin 173.

Means are provided for holding bellcranks 172 and 177 in contact with their respective cams, this means being more clearly shown in Fig. 22. The transverse arms of the bell-cranks 172 and 177 are urged inwardly by rods 178 and 179 respectively, these rods being in turn urged inwardly by the action of coil springs 180 and 181 which are held in compression between the casing and collars formed on the rods.

The contour of cam 175 is such that with the reversing shaft in the position shown in Figs. 21 and 22, or turned 180° from this position, spring 180 is permitted to force the teeth 171 of bell crank 172 into mesh with teeth 170 on member 167. In the position shown in these figures, shift sleeve 150 is at one end of its path of axial movement and when shaft 154 is turned a half revolution from the position shown, sleeve 150 is moved axially to the opposite end of its path of travel by the eccentric pin 156 engaging member 152. It will thus be seen that when sleeve 150 is in either end position of its path of travel, member 167 is locked against rotation by the meshing of teeth 170 and 171. The projecting parts of cam 175, seen in Fig. 22, force ball bearing 174 to the left (Fig. 21) whenever shaft 154 is turned from the position shown in Fig. 22 or from a position 180° from this position, this action causing teeth 170 and 171 to be disengaged to permit member 167 to rotate on ball bearing 168 while shaft 154 is being turned from either position to the other.

The contour of cam 176 is such that the pressure of bell crank 177 thereon (due to the action of spring 181) tends to hold the shaft 154 firmly in the position shown in Fig. 22 or in a diametrically opposite position.

The bell crank 177 and spring 181 perform the same function as do member 106 and spring 105 in Fig. 12, the contour of cam 176 and the engaging cam face of the bell crank 177 being so formed that the latter member resists initial turning movement of cam 176, and then suddenly relieves cam 176 from such resistance.

Referring again to Fig. 19, it will be seen that the driven shaft 47 is supported at its rearward end by ball bearing 182, the outer race of which is held in a spider 183 secured in the transmission casing. Spider 183 has a limited amount of flexibility, to provide a resilient mounting, and may advantageously have fixed thereon a band of non-metallic material 184 adapted to absorb or deaden vibration in the spider.

A sleeve 185 is fixed on an octagonal portion 186 of shaft 47 and rotates with the shaft. Formed integral with sleeve 185 is a dished flange 187 to which is secured the driven shaft fly-wheel 49, the latter being annular in form. The inner surface of fly-wheel 49 forms a support for the outer race of a ball bearing 188, the inner race of which is secured to and supports member 160 fastened to the clutch sleeve 51. The rearward end of the common clutch sleeve 42 is in turn supported from clutch sleeve 51 by ball bearing 189.

Each of the roller cages 56 is centered at one end, and prevented from moving axially, by ball bearings 190, the inner race of one bearing being formed by a groove in sleeve 48 and the inner race of the other by a groove in sleeve 51.

At its forward end sleeve 42 is supported by a bearing member 191 interposed between the sleeve and the cylindrically headed stud 192 which serves to secure the fly-wheel 33 to the driving shaft.

Rigidly secured to the rear end of the driven shaft 47, as by means of the splined and threaded member 198 and retaining nut 199, is the hub 200, which is connected to the propeller shaft indicated generally at D by means of a known form of coupling comprising bolts 201 and flexible ring 202.

In some instances, shaft D may advantageously be of a form providing more than the usual amount of torsional flexibility. One such form is shown in Fig. 19, consisting of a plurality of axially parallel rods 203 spaced equi-distant from a common central axis. Rods 203 are bent radially outward at their ends as at 204 and are anchored in recesses in an annular member 205 having a flanged portion through which alternate coupling bolts 201 pass.

Rods 203 are spread radially by means of ring 206 carried on a pin forming part of the plate member 207 bolted to member 205. An outer protecting tube 208 slidably mounted in member 205 may be advantageously employed. The construction at the opposite end of the propeller shaft D is similar to that just described, providing means whereby the individual rods 203 may be connected to the driving axle through a single coupling.

Lubrication is effected by introducing oil through passage 193, from whence it flows through holes 194 in member 191 and axially through the clutch mechanism between the common clutch sleeve 42 and the inner sleeves 48 and 51. After passing through bearing 189, the oil flows between sleeve 42 and member 160, and is thrown outwardly from sleeve 42 due to centrifugal force caused by rotation of the sleeve. Holes 195 are also provided to catch oil which may leak from between members 192 and 191, and direct this oil within sleeve 42. The entire casing is normally filled with an oil mist which serves to lubricate the parts to which oil is not directly fed. The oil finally finds its way to the lower part 196 of the casing, from which it is removed through a suitable conduit (not shown) opening into the casing at a point somewhat above the bottom thereof, so that a shallow pool of oil may collect in the bottom of the casing, into which the starter gear teeth 197 may dip.

The operation of the form of transmission shown in Figs. 19 to 24 is in general similar to that of the form shown in Figs. 6 to 11, in so far as the production of alternately opposite turning moments by inertia masses and the subsequent segregation of such masses by clutch mechanism, is concerned.

In the present embodiment, the action of the inertia masses 40 with respect to the application of turning moments to the sleeve 42, is substantially the same as is the case when they are mounted on planetating pinions. Thus, if sleeve 42 and the eccentrics thereon are held stationary and the driving shaft is rotated, each inertia mass will travel through a cycle of movement in general similar to that described in connection with Fig. 6; that is, if the mass starts from the extreme outward position shown in Fig. 23, it will be drawn inwardly to its extreme inner position in one-half a revolution of the driving shaft by the eccentric about which it rotates, and during the succeeding half revolution will return from its innermost position to its original outer position. During the first half of this cycle of movement, the centrifugal force generated by the mass will apply a turning moment to sleeve 42 tending to turn it in the direction of rotation of the driving shaft, while during the latter half of the cycle an opposite turning moment will be applied. Under the conditions assumed, the cycle of movement will be completed in one revolution of the driving shaft.

If, now, the eccentrics on sleeve 42 move in the direction of rotation of the driving shaft at half driving shaft speed, the masses will require a full revolution of the driving shaft to move from their outermost to their innermost positions, and with increasing speed of sleeve 42, the number of revolutions of the driving shaft required to complete the cycle increases until finally direct or synchronous drive is obtained. Under the condition of synchronous drive, the inertia masses travel in a circular path of rotation about the axis of the driving shaft as a center rather than about the centers of their respective eccentrics.

Mounting of the inertia masses 40 on eccentrics or cranks forming part of the clutch sleeve assembly, as shown in Fig. 23, is to be preferred to the form of construction in which the masses are mounted on the pinions meshing with a gear forming part of the clutch sleeve assembly. In the form of construction shown in Fig. 23, the masses may be said to be mounted centrifugally on the clutch sleeve 42, so that the forces due to movement of the masses and acting through bearings 136 and 138 on sleeve 42, are always of the same character, i. e., forces acting radially outwardly from the center of rotation of the sleeve and mass assembly. This eliminates any possibility of backlash between the inertia masses and the clutch sleeve, either in direct or indirect drive.

When the transmission is operating in indirect drive, that is, with the masses 40 rotating about their respective eccentric centers, the driving links 134 are subjected to alternate tension and compression stresses which might be expected to produce noisy operation due to backlash between the links and the pins 132 and 135. Such action is, however, avoided by positioning the links 134 so that when the transmission is in operation centrifugal force tends to throw the links outwardly in radial direction, thereby causing them to exert continuous side pressure directed toward the inner semi-circumferences of pins 132 and 135. Therefore, if any looseness exists between the pins and the link bearings the radially acting force developed by centrifugal force acting on the links prevents play of the pins, when the sense of the stress on the links changes from compression to tension or vice vera, by direct movement across the bores in the links which form the pin bearings. Instead, play is prevented because the pins will, in effect, roll on the radially inner portion of the link bearings with which they are maintained in contact by the tendency of the links to fly radially outwardly from the axis of rotation.

It will thus be seen that in the present construction continuous torque derived from the driving member is converted into turning movements of opposite sense by mechanism free from backlash even when such mechanism, due to wear or other cause, has looseness between the parts thereof.

The opposite turning moments applied to sleeve 42 are segregated by the action and reaction clutches comprising, respectively, detents 52 and 53, in the manner previously described, the positive moments being transmitted to the driven shaft and the negative moments being absorbed or neutralized.

In the present form of the transmission the negative turning moments are largely absorbed or neutralized by the reaction mass 161 instead of being transmitted directly from the stationary clutch sleeve 51 to the abutment formed by the transmission casing. From Figs. 19 and 24 it will be seen that negative moments applied to the sleeve 51 will be transmitted through member 160 to the inertia mass, tending to turn the latter in negative direction. Turning movement of mass 161 in either direction is limited by the radial springs 164, the inner ends of which are held stationary by means of the pins 166 on the member 167, the latter member being prevented from rotating by engagement of teeth 170 with the teeth 171 on the rotationally fixed bell crank 172. The first negative turning moment transmitted to sleeve 51 will be largely absorbed in overcoming the inertia of the reaction mass 161, the effect of the application of this turning moment to the mass being to start rotational movement thereof from the position shown in Fig. 24. At the instant this movement starts, springs 164 exert only a very slight resistance, which, however, increases rapidly as the reaction mass moves from its center position and acts not only to quickly stop such movement, but to return the mass toward its center position. Thus, when the succeeding negative reaction is applied to sleeve 51, it must overcome the momentum of the reaction mass moving in a positive direction under the returning influence of springs 164. Springs 164 transmit forces from the reaction mass to the abutment formed by the transmission, but these forces are largely neutralized due to the radial positioning of the springs in diametrically opposed pairs.

The net result of the interposition of the resiliently mounted inertia mass 161 is to cause the negative turning moments to be largely neutralized by such mass rather than by the fixed transmission casing, thus obtaining smoother operation of the transmission. A more detailed exposition of the exact manner in which the reaction mass accomplishes this function is contained in my copending application Serial No. 447,896, filed April 28, 1930, Patent No. 1,810,283, issued to me June 16, 1931, in which the invention including this feature of construction is claimed.

Reversal of the direction of drive through the transmission is effected in substantially the same manner as has been previously described, by axial movement of the shift sleeve 150. Axial movement of this sleeve will cause axial movement in the same direction of the adjusting sleeves 143 and 145, and from Fig. 20 it will be largely obvious that axial movement of these sleeves in the same direction will cause the roller cage holding detents 52 to turn in one direction with respect to sleeve 48, while the roller cage holding detents 53 is simultaneously turned in the opposite direction with respect to the clutch sleeve 51. From the description of the manner of operation of the mechanism shown in Fig. 6, the manner in which simultaneous opposite turning movements of the detents in the two clutches effects reversal of drive through the transmission will be clear.

As will be seen from Fig. 21, axial movement of shift sleeve 150 from one end of its path of travel to the opposite end of its path of travel, in order to effect reversal of the clutches, is caused by turning reversing shaft 154 through one-half a revolution from the position shown in Fig. 21, or from a position opposite that shown in this figure back to the position shown in the figure.

Since the gear 157 on shaft 154 has only a third as many teeth as there are on gear 158, it will be seen that a one-sixth revolution of the latter gear, and consequently a sixth revolution of the reversing wheel 101, will cause a half revolution of reversing shaft 154 to effect reversal.

It will further be seen that reversal of the direction of drive through the transmission, either from forward to backward, or from backward to forward, is effected by rotation of the reversing wheel 101 a sixth of a revolution in the same direction.

Whenever shaft 154 is moved to effect reversal, cam 175 moves, acting on the bell crank lever 172 to cause teeth 171 to be disengaged from teeth 170 thereby releasing member 167, which forms an anchorage for the springs 164. This leaves the entire assembly comprising member 167, springs 164, mass 161, and clutch sleeve 51, free to rotate.

Since sleeve 51 is free to rotate, the clutches are relieved from any stress which may be acting thereon, so that reversal of the clutches under any conditions may be readily effected. It will be seen that the teeth 170 and 171, disengaged in order to insure easy reversal, correspond in function to the friction blocks 88 in the transmission shown in Fig. 6, which are released by spreading spring 86 in order to relieve the clutches from stress. There is, however, a slight difference in the operation of the two devices, since in the construction shown in Fig. 6 the clutch sleeve 51 is freed only if the clutches are under stress at the time reversal is effected, while in the construction shown in Fig. 19 sleeve 51 is always released when reversal is effected.

It will be noted that in the present embodiment no meshing teeth on the shift or clutch sleeves or on the driven shaft fly-wheel are provided to prevent reversal except when these parts are held stationary relative to each other. I have found that these elements need not be positively held against rotation with respect to each other if the driven shaft is first brought to rest before reversal is attempted and reversal is effected with considerable rapidity, since if reversal is rapidly effected, the clutch detents can be shifted before the inertia of the clutch parts which are free to rotate can be overcome by any driving forces transmitted from the engine during the reversing period.

From the foregoing, the manner in which the form of transmission shown in Fig. 19 cooperates in the control systems shown in Figs. 12, 13 and 16 will be seen, the transmission and the control elements interacting in a manner permitting an extremely simple control.

Positive control of deceleration and acceleration of the vehicle in both directions throughout its speed range is effected by movement of the pedal H between the positions I and III. By entire speed range I mean the range between zero speed corresponding to position III of pedal H and the maximum speed at which the engine is capable of propelling the vehicle under any given set of conditions, which speed corresponds to the position I of the pedal. Obviously, the speed range of the vehicle will vary under different conditions.

Reversal of direction of drive is also accomplished by movement of the same pedal H between positions III and IV, and the arrangement is such that before reversal can be attempted, the brakes must be brought to fully applied position, which insures stoppage of the driven shaft of the transmission. It is because of this interrelation of the braking and reversing control means that I am enabled to utilize the form of transmission shown in Fig. 19 in which the meshing teeth associated with the reversing mechanism are eliminated. This results in improved facility in control, since it eliminates any difficulty arising from the necessity of axially meshing one or more sets of gear teeth in order to effect reversal. Further, the combining of the engine throttle control with the reversing control is important in connection with the use of a transmission of the character described since it insures a low or idling engine speed at any time when reversal is effected, and therefore prevents the possibility of forces of high magnitude being transmitted to the clutch mechanism during the period when the coupling between the reaction clutch and the transmission casing is broken.

A still further embodiment of the invention is shown in Figs. 25 to 55, which embodiment represents a highly efficient commercial form of apparatus which has been successively operated in the United States over a distance of several thousand miles.

In describing this form of apparatus, like reference characters will again be used to designate corresponding parts. For the sake of convenience, the transmission mechanism per se will be described first and then the braking and other control mechanism operating therewith.

Turning now to Fig. 25, reference character 32 designates the engine driving shaft and 33 the fly-wheel, which is secured to the flanged end of shaft 32 by screws 210. Fly-wheel 33 is formed with a central annular hub 211 in driving engagement with the splined end of shaft 212, the opposite end of which is also splined as at 213. The splined end 213 of the shaft is rigidly secured in driving engagement with one end of a tubular member 214, which surrounds shaft 212 for the major portion of its length. An annular clearance space is provided between shaft 212 and the surrounding member 214, and the latter member is provided with a number of holes 215 distributed along its length for a purpose to be set forth later. Member 214, at the end adjacent to the fly-wheel 33, is rigidly secured to the annular hub 216 of a secondary fly-wheel 217, which is journalled on a bearing sleeve 218 fitted over the hub 211 of fly-wheel 33. The secondary fly-wheel 217 has mounted thereon the driving pins 132 (see Fig. 26), and it will be seen that shaft 212 and tubular member 214 provide a relatively long and torsional resilient driving connection between the shaft 32 and the fly-wheel carrying the driving pins. Frictional damping means is provided to prevent torsional vibration between fly-wheels 33 and 217. This means comprises a circumferential flange 219 forming part of fly-wheel 33 and encircling fly-wheel 217, the rim of the latter being in the form of a shallow V-groove. A pair of friction rings 220 of triangular section engage the inner face of flange 219 and the sides of the groove, under the influence of a number of small springs interposed between the rings. These rings provide only sufficient resistance to relative rotational movement of the fly-wheels to dampen periodic vibrations, without in any way interfering with the relative displacement of the fly-wheels due to torsional resiliency in the driving members connecting them.

The inertia masses 40 are carried on the common clutch sleeve 42, which is provided with two pairs of eccentrics 137 and 139 diametrically opposite with respect to each other as in the form of transmission shown in Fig. 19. In this embodiment the mases 40 are secured to their respective eccentrics by means of U-shaped straps 221 between which and the eccentrics are located the ball bearings 136 and 138. As in the previously describing modification, one mass 40 is of T section and the other is of forked or U section to provide clearance enabling the two masses to approach each other in telescoping relation when the position of the eccentrics is opposite that shown in Fig. 25.

Masses 40 are rotated at fly-wheel speed by driving links 134 pivotally secured to pins 135 and driving pins 132. In this form of transmission, compactness is secured by arranging the action and reaction clutch mechanisms concentrically, one inside and the other outside of the common clutch sleeve 42. Sleeve 48, which with sleeve 42 and roller detents 52 forms the action clutch, is supported at its forward end by a ball bearing 222 located inside sleeve 42, and at its rearward end is supported by the annular member 223 to which it is secured in driving engagement by splines 224. Member 223 is in turn supported by ball bearing 225, the outer race of which is secured in the transmission frame or casing. The speedometer gear 209 is conveniently driven from threads at the forward end of member 223.

Drive is transmitted from the splined end of sleeve 48 to the hub 226 of the driven shaft fly-wheel 49, and from this member to the propeller shaft indicated at D. A cap 227, screwed on the end of sleeve 48, secures hub 226 against axial movement.

Figure 31B:
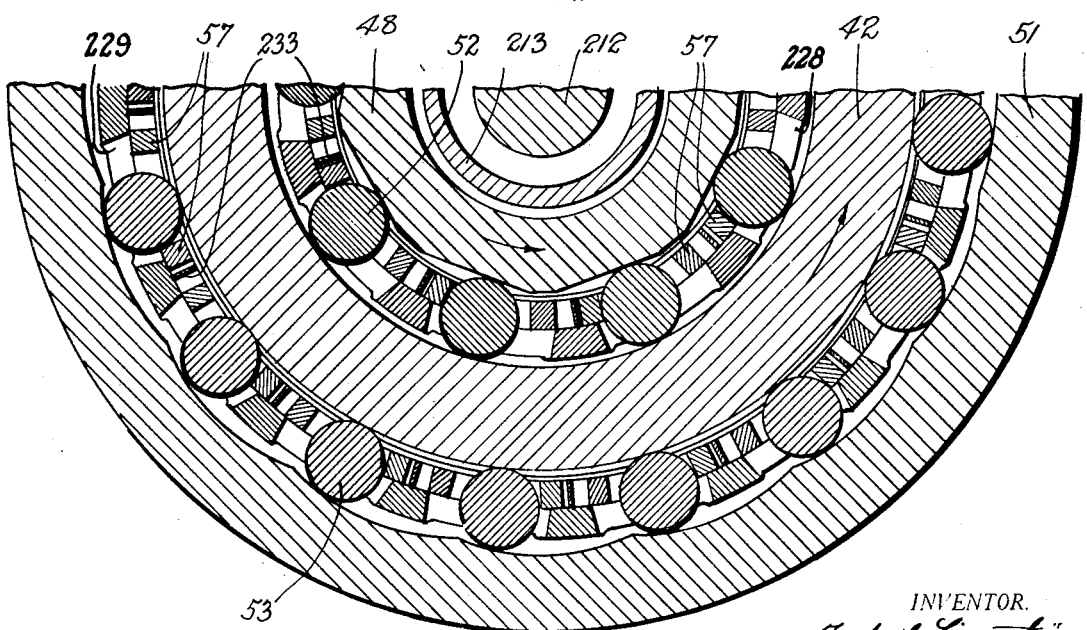
Fig. 31b is a view similar to Fig. 31a showing the roller clutches in the opposite position of adjustment.

Two sets of action clutch roller detents 52 are provided, these rollers being held in an inner roller cage 228 in engagement with the inner cylindrical surface of sleeve 42 and either the inclined wedging surfaces 54 or 55 on sleeve 48, Figs. 31a and 31b, depending on the position of the cage. Two sets of detents are employed in this clutch instead of one, in order to obtain the desired area of gripping contact without having to resort to the use of detents of undue length. The action of each set of detents is identical with that of the other. The stationary or reaction clutch sleeve 51 encircles the portion of the common clutch sleeve 42 within which is located the action clutch, sleeve 51 being provided with internal longitudinal grooves forming oppositely inclined wedging surfaces 54 and 55. A single set of reaction roller detents 53, held in an outer roller cage 229, is arranged to engage the cylindrical outer surface of sleeve 42 and either of the series of wedging surfaces on sleeve 51. As in the form of apparatus shown in Fig. 19, rotational movement of the roller cages with respect to the clutch sleeves with which they respectively co-act determines which series of surfaces are engaged by the roller detents.

Due to the greater diameter of the reaction clutch in this embodiment, a larger number of roller detents can be employed in a single set than in the action clutch, and I have found that a single set of detents of moderate length is sufficient to transmit the reaction forces. In the present embodiment, the ratio of clutch diameters is such that while each set of action detents comprises but nine, giving a total of eighteen in the action clutch, sixteen detents of the same diameter can be placed in a single set in the reaction clutch.

The inner or action clutch cage 228, the left-hand half of which is shown in Fig. 27, comprises a slotted cage member formed with ribs or partitions 58. End rings 230 and an intermediate ring 231 are riveted inside the cage member, and are notched as at 232 to receive the ends of leaf springs 57 adapted to engage rollers 52 midway of their length and, if not otherwise biased, to center the rollers in their slots. In this embodiment the springs 57 receive no backing by a non-yielding member intermediate their end supports, since ribs 58 are radially outside springs 57 and notches 232 and serve merely to form the cage. It is important for the springs to be held against play in the cages, and this is accomplished by interposing between each pair of springs located in the ring notches 232, a very light, normally curved auxiliary spring 233 which acts to take up all play and tends to keep the outer faces of the spring ends in light contact with the faces of the ring notches.

The action of spring 233 is clearly shown in Fig. 30, in which the clearance or play between the ends of springs 57 is shown greatly exaggerated. Spring 233 also serves the important purpose of providing a very light starting pressure on the roller detents.

The construction of the roller cage and spring assembly of the reaction clutch is essentially the same as that just described, except that in the reaction clutch cage the intermediate ring 231 is omitted.

In Fig. 31a the relative positions of the clutch roller detents and cages, with respect to the several clutch sleeves, are shown with the mechanism adjusted for drive in clockwise direction, which has been assumed as positive direction. In this position of adjustment, the action clutch detents 52 are in contact with the inner surface of clutch sleeve 42 and with surfaces 55 of the driven clutch sleeve 48, while the reaction clutch detents 53 are in contact with the outer surface of the common clutch sleeve 42 and surfaces 54 of the stationary or reaction clutch sleeve 51. The manner in which this adjustment of the roller cages causes drive in clockwise or positive direction will be understood from the explanation already given in connection with the description of the preceding embodiments of the invention.

In Fig. 31b the clutch cages are shown adjusted for drive in counter-clockwise or negative direction, each set of roller detents being in contact with surfaces oppositely inclined to the surfaces with which they are shown in contact in Fig. 31a.

From the inspection of this figure it will be seen that adjustment of the roller cages to effect change in the direction of drive from clockwise to counter-clockwise is secured by turning the inner or action clutch cage 228 in counter-clockwise direction with respect to sleeve 48, and by turning the outer or reaction clutch cage 229 in clockwise direction with respect to sleeve 51.

Figs. 31a and 31b illustrate very clearly the action of the roller clutches in preventing the driven shaft from rotating in a direction opposite that for which the clutches are adjusted. For example, if the driven clutch sleeve 48 tends to rotate in counter-clockwise direction with the clutches adjusted in the manner shown in Fig. 31a, it will be clear that such rotation will be prevented due to the gripping of detents 52 between surfaces 55 on sleeve 48 and the inner surface of sleeve 42, and the gripping of detents 53 between surfaces 54 on sleeve 51 and the outer surface of sleeve 42. This action prevents counter-clockwise rotation of sleeve 48 with respect to sleeve 51, and since the latter sleeve is secured to an abutment, sleeve 48 is held against counter-clockwise movement.

It will be noted that the contours of the gripping surfaces 54 and 55 on sleeves 48 and 51 in Figs. 31a and 31b differ in form from the contours of the corresponding surfaces shown in Figs. 11a and 11b. In the latter figures the angle between tangents to the surfaces at the places where they are contacted by the detents does not increase as the detents move toward engaging position. On the other hand, the contour of the surfaces in Figs. 31a and 31b is such that the angle between the two corresponding tangents, which angle may be conveniently termed the angle of approach of the surfaces, does increase as the detents are moved toward engaging position. The latter arrangement of the surfaces is in the nature of an improvement over the former since it results in an automatic tendency on the part of the roller detents to center themselves in the cage slots and prevents their being forced so far from their proper positions in the cages as to strike the ribs or partitions thereof and deform them.

In order to effect reversal of the positions of the cages holding the roller detents, I employ mechanism shown in Figs. 32 to 37. This mechanism comprises axially displaceable adjusting sleeves 234 and 235 corresponding in function to sleeves 143 and 145 shown in Fig. 19. Sleeve 234 surrounds sleeve 48 to the right (Fig. 32) of the action clutch, and the right-hand end of sleeve 234 is provided with a number of internal teeth 236 passing through slots axial 237 in a spacing sleeve 238 and engaging the splines 224 in the driven clutch sleeve 48. The left-hand end of sleeve 234 is formed with a number of oblique internal teeth 239 engaging corresponding oblique external grooves 240 in a rotatable shift sleeve 241. Sleeve 241 is mounted on sleeve 48. It can rotate with and also relatively to sleeve 48, but does not have axial movement. Three fingers 242 (Figs. 32, 33, 34 and partly 37) project from the left end of sleeve 241 to engage suitable slots 243 in the flanged right-hand ring 230 of the inner roller cage 228. Splines 224 on sleeve 48 prevent rotation of sleeve 234 with respect to sleeve 48, but permit axial movement thereof. Axial movement of sleeve 234 causes rotation of sleeve 241 through the action of teeth 239 in grooves 240. Rotation of sleeve 241 is transferred by means of fingers 242 to the cage 228 to shift the latter rotationally with respect to sleeve 48.

Sleeve 48 is formed with arcuate shoulders 244 (Figs. 32 and 34) between which fingers 242 extend and upon which is mounted the inner race ring 245 of ball bearing 246 forming the support of the rearward end of sleeve 42. Ring 245 has an annular cup-shaped extension 247 enclosing the end of sleeve 42 for a purpose which will be explained later. Bearing rings 248 and 249 act as spacers to prevent axial movement of shift sleeve 241 due to end thrust caused by axial movement of sleeve 234.

Near its center, sleeve 234 is exteriorly threaded to receive the inner race ring of ball bearing 250, the outer race of which is formed by the ring 251. Bearing 250 permits sleeve 234, which rotates with sleeve 48, to be shifted axially by thrust from the rotationally stationary ring 251.

A second ring 252 is mounted in sliding engagement within ring 251, the left end of ring 252 projecting to form the inner race of ball bearing 253, the outer race ring of which is secured, as by threads, to the right-hand end of shift sleeve 235. Bearing 253 acts to transmit axial thrust from ring 252 to sleeve 235, while permitting relative rotation of these parts.

Shift sleeve 235 acts by axial movement to rotate the outer or reaction clutch cage 229 with respect to sleeve 51, and to this end is provided with a plurality of longitudinal slots 254 (Fig. 35) in which are situated square pins 255 extending inwardly from an extension member 256 rigidly secured to the end of sleeve 51. This slotted sleeve and pin arrangement permits axial movement, and prevents rotational movement, of sleeve 235 with respect to sleeve 51.

The right-hand end ring of cage 229 is extended as at 257 and carries a plurality of external pins 258 (see Fig. 35). Pins 258 are in sliding engagement with oblique slots 259 in sleeve 235. Slots 254 and 259 are preferably arranged alternately around the circumference of sleeve 235, and it will be seen from a consideration of Fig. 35 that axial movement of sleeve 235 will cause the roller cage 229 to move rotationally with respect to the sleeve 51.

Grooves 240 in the sleeve 241, and the slots 259 in sleeve 235, are oppositely oblique so that axial movement in the same direction of rings 251 and 252, causing axial movement in the same direction of sleeves 234, 235 and 241, will cause opposite rotational movements of roller cages 228 and 229 with respect to their respective clutch sleeves 48 and 51. This opposite rotational movement of the clutch roller cages effects reversal in the direction of drive in the same manner as has been previously described.

Referring again to Fig. 25, it will be seen that the reaction clutch sleeve 51 is mounted at its forward or left-hand end by a ball bearing 260 comprising balls between it and the common clutch sleeve 42. At its right-hand end, sleeve 51 carries a bearing 261, which engages the extension 257 forming part of the roller cage 229.

The left-hand end of sleeve 51 is flanged and has riveted thereto the reaction mass 262 which is in the form of a cup-shaped wheel encompassing the inertia masses 40. The rim of this wheel is grooved at 263 to receive a split guide ring 264 extending into a groove 265 in the transmission casing. Ring 264 normally contracts into groove 263 to permit assembly, and after assembly of mass 262 within the casing, is expanded into groove 265 by means of the threaded wedge 266 (Fig. 26), which is moved by screwing stud 267 thereinto from the exterior of the casing. The split guide ring 264 acts to take up end thrust imposed on sleeve 51, and together with bearing 260 serves to keep sleeve 51 concentrically centered with respect to clutch sleeve 42.

Adjacent to its left-hand end, sleeve 51 is provided with a plurality of pairs of ears 268 (see also Fig. 38), the pairs of ears 268 serving to secure pins 166 upon which are pivotally mounted the spring hangers 165 anchoring the inner ends of the radial coil springs 164. The outer ends of springs 164 are secured through anchor members 163 to a dished retaining member 269, which is in turn releasably secured to the frame or casing of the transmission in a manner to be described. It will be seen that the inertia mass and spring arrangement is similar to that shown in Fig. 24, and while the number of springs employed may vary, I have found that six is a suitable number.

The transmission casing is recessed at 270 to receive an annular member 271, which is rigidly secured to the casing by bolts 272. The inner surface of the outer web of member 271 is grooved to provide angularly disposed surfaces 273 adapted to be engaged by a series of balls 274 passing through suitably spaced holes in the flange 275 of the retaining member 269. Balls 274 are held in position by a split ring 276 lying within the annular recess formed by member 271. Ring 276 is provided with a series of arcuate slots 277 (Fig. 38), through which pins 278 pass, these pins being riveted to member 271 and slidably engaging the slots to center the ring while permitting a limited rotational movement thereof.

It will be seen that if ring 276 is expanded or spread sufficiently, the force exerted thereby on balls 274 will act to frictionally lock them between the ring 276 and the surfaces 273, thereby holding the retaining member 269 against rotation. When the ring 276 is contracted sufficiently to relieve the stress on balls 274, the assembly comprising member 271, balls 274 and ring 276 will become in effect a ball bearing permitting the retaining member 269 to rotate freely under the influence of any rotational forces which may be transmitted to it through the springs 164.

From the above it is evident that this assembly is functionally a counterpart of the frictional locking device comprising spring 86 and friction blocks 88 shown in Fig. 10, and the locking device comprising teeth 170 and 171 shown in Fig. 21. The form just described is, however, an improvement over the other forms, since it gives a form of friction coupling in which the friction coefficient remains substantially constant under all conditions and in which the disadvantages incident to the use of a coupling depending upon the meshing of teeth are avoided.

The mechanism for contracting and expanding ring 276 is shown in Figs. 39 and 41. This mechanism closely resembles a pair of scissors and will hereinafter be referred to as scissor mechanism or scissors. It comprises a pair of floating levers 279 and 280 lying in a plane at right angles to the plane of ring 276. The forward ends of these levers engage holes 281 and 282 passing through ring 276 adjacent to the point 283 where the ring is parted. The opposite ends of the levers are forked and have mounted thereon rollers 284, between which is situated the reversing shaft 154. About midway of their ends the levers are pierced to permit the passage therethrough of the rod 285, the upper end of the rod being formed with a head 286 having a knife edge bearing on the upper face of lever 279. The lower end of rod 285 extends below lever 280 and is surrounded by the coil spring 287, which is compressed between the lower face of lever 280 and the retaining nut 288 screwed on the lower end of the rod. Between the holes through which rod 285 passes and the ends of the levers engaging ring 276, the levers are provided with threaded holes 289 into which are screwed adjusting nuts 290, the latter engaging the ends of a distance pin 291. Pin 291 passes loosely through an annular boss 292 forming part of the transmission casing, and is held in position by the retaining pin 293 (Fig. 41). With the scissors as shown in Fig. 39 it will be seen that the spring 287 tends to move the right-hand ends of the levers 279 and 280 together about the distance pin 291 as a fulcrum, thus spreading the left ends of the levers and expanding ring 276 to lock the balls 274 in position. It is to be noted that the adjusting nuts 290 are set so that with ring 276 fully expanded, a clearance is left between rollers 284 and the parallel cam faces 294 formed on shaft 154, where it passes between the rollers.

Levers 279 and 280 are provided with inwardly extending bosses 295 adapted to be engaged by flat cam faces 296 upon rotation of an auxiliary release shaft 297. The function of this release shaft will be explained later.

Turning now to Figs. 40 to 42, it will be seen that the reversing shaft 154 is rotatably mounted on ball bearings 155 within a removable cylindrical housing 298 supported by webs 299 and 300 forming part of the transmission casing and passing through said webs. The outer end of housing 298 is flanged at 301 and is secured to web 300 by studs 302. The outer end of shaft 154 is provided with the spur gear 157 meshing with gear 158 forming part of the reversing member 159 rotatably mounted on a stud 303 extending outwardly from flange 301 at a point below the reversing shaft 154. The reversing member 159 carries at its outer end the reversing ratchet wheel 101 which, as in the modifications previously described, is provided with six ratchet teeth. Also, the ratio of the numbers of teeth on gears 158 and 157 is three to one, so that one-sixth of a revolution of the wheel 101 effects a half revolution of the reversing shaft 154.

The inner end of shaft 154 is provided with a pair of spaced axially extending ears 304 through which a transverse pin 305, offset with respect to the axis of shaft 154, passes. Pin 305 serves as a pivot for the bell crank 306, one arm of which extends inwardly from the end of shaft 154 in generally axial direction. The end of arm 306 is in the form of a ball 307.

As will be seen most clearly in Fig. 42, the outer reversing ring 251 is apertured (see also Fig. 35) at 308, and the inside of the ring adjacent to the aperture is milled to a plane surface. The outer surface of ring 252 is also milled to a plane surface spaced from the inner surface of ring 251 to form a recess 309 in which is located an equalizing lever 310. One end of lever 310 is pivoted to ring 251 by means of stud 311, and the other end is pivoted to ring 252 by stud 312.

Lever 310 is moved by ball 307, which engages the periphery of a hole 313 passing through the lever at a point somewhat nearer stud 311 than stud 312.

Hole 313 is offset from the center of lever 310 in order to transmit equal unit engaging forces to the roller detents 52 and 53 through the mechanism which adjusts the position of these detents. Since the number of detents is different in the two clutches and since the diameters of the parts forming the two clutch assemblies are different, a different total adjusting force is required on the two clutch assemblies if the same unit pressures are to be obtained on the detents, and this difference in the total forces is secured by the above described lever arrangement connecting ball 307 with the rings 251 and 252.

The amount of axial displacement of rings 251 and 252 from their center position is determined by the amount of eccentricity of ball 307 with respect to the axis of shaft 154, and this eccentricity may be varied by mechanism which I will now describe. A rod 314 (Fig. 41) passes loosely through a hole drilled obliquely through shaft 154 so that the inner end of this rod engages the arm 315 of the bell crank lever 306. The outer end of rod 314 projects beyond the end of shaft 154 and it will be seen from Fig. 41 that if this end of the rod is pressed inwardly it will, from the action of the bell crank lever 306 and ball 307, tend to increase the movement of rings 251 and 252 from their center position. Inwardly directed pressure is applied to rod 314 by means of the lever 316, pivoted intermediate its ends about pin 317, the latter pin being mounted in the forked stud 318 screwed into the flange 301 of the reversing shaft housing. One end of lever 316 engages rod 314 while the opposite end is forced outwardly by a coil spring 319. Spring 319 bears at one end against a retainer 320 which in turn seats against lever 316 around an aperture 321 in the latter, through which the shouldered pin 322 loosely passes. The opposite end of spring 319 bears against a flange adjacent to one end of pin 322. Pin 322 bears against the head of a piston 323, which in turn abuts against the bottom of a cylindrical recess 324 formed in the web 300. Piston 323 has a cylindrical skirt 325 with an outwardly extending bottom flange 326. Skirt 325 is provided with two series of holes 327 and 328. An annular piston 329 surrounds piston 323, the head of the latter piston extending through an aperture in the head of the former. An inwardly extending flange 330 is screwed to the bottom of the skirt of piston 329 and is adapted to abut against the flange 326 on piston 323. A heavy coil spring 331 is disposed in the annular space between pistons 323 and 329, bearing at one end against the under side of the head of piston 329 and at the other end against the flange 326 on piston 325. Piston 329 is loosely mounted in a cylindrical sleeve 332 screwed into the recess 324, there being an appreciable clearance space 333 between the piston and the sleeve. The function of the mechanism just described will be explained later.

Turning now to Fig. 47, the lubricating system which in this embodiment has an important function in addition to that of lubrication, is diagrammatically illustrated. Oil is supplied under pressure through an inlet conduit 193 formed in the driving shaft 32, as in the embodiment shown in Fig. 19. From the interior of shaft 32, it passes between the splines at the forward end of shaft 212 to a pocket 334 formed within hub 211. From this pocket it flows through the long annular space between shaft 212 and member 214 to the holes 215, and flows through the latter to the space between member 214 and the driven clutch sleeve 48. From the forward end of this latter sleeve the oil flows through bearing 222 and between clutch sleeves 48 and 42 to lubricate the action roller detents 52. When it reaches the end of sleeve 42 the oil flows through bearing 246 (see Fig. 32) and is then forced to flow to the inside of the member 257 by the extension 247 forming part of the bearing race 245. A number of thread-like flanges 335 on the inner surface of member 257 tend to cause the oil to flow forwardly between sleeves 42 and 51 to lubricate the reaction clutch detents 53. The oil finally flows through bearing 260 and is thrown outwardly by centrifugal force to lubricate the ball bearings upon which the inertia masses are mounted. The remaining parts of the transmission are lubricated by the mist of oil which fills the transmission casing during periods of operation.

Oil fed to the transmission finally collects in the bottom of the casing at 196 (Fig. 25) and is picked up by the starter teeth 197 in a trough formed by ribs 336. It is lifted in this trough to the port 337 (Fig. 26) in the side of the transmission casing through which and the outlet 338 it passes to the supply reservoir, which may conveniently be the crank case of the engine.

A by-pass is provided permitting oil to flow directly from the pocket 334 to the bearing 222 under certain operating conditions. This by-pass is formed by a channel 339 cut in the inner face of the sleeve 42, the inlet of this channel being adapted to register with a port 340 cut through the fly-wheel hub 216 and the bearing sleeve surrounding the same.

A branch conduit 341 leads from the inlet pipe 193 to the chamber formed by the recess 324 (see also Fig. 41), this conduit having therein a ball check valve 342 opening away from the pipe 193.

As seen most clearly from Figs. 41, 45 and 46, the reversing shaft is held in its proper position of rotation by means of cam 176 of generally diamond shape having two opposite cam points 343 and 344. When the reversing shaft is at rest, one of these cam points is held in contact against a lug or boss 345 on a lever 346. This lever is pivoted on a fixed pin 347 and is resiliently held in contact with the cam 176 by the action of spring 348. Spring 348 is held in compression around stud 349 between the free end of lever 346 and an adjustable collar 350 on the stud. Stud 349 is fixed to pin 351 secured in flange 301 and is formed with a head 352 forming a stop for the end of lever 346. Shaft 154 can be turned in counter-clockwise direction to effect reversal of the direction of drive through the transmission only by applying sufficient turning force to the shaft to cause the cam point (344, as shown in Fig. 46) to force lever 346 downwardly against the action of spring 348 so that the cam point can pass the boss 345. It will be plain from the figure that a considerable turning force will be required to effect movement of the lever 346, and that when such movement is effected, the resistance to turning of shaft 154 suddenly ceases. The end of one arm of a bell crank lever 353, which is pivoted about pin 347, is held in contact with the trailing face of the cam point in contact with boss 345 by the action of the spring 354. This prevents reverse rotation of shaft 154 and serves to hold it firmly in its proper rotational position. From Fig. 46 it will be clear that when shaft 154 is turned a half revolution to effect reversal, the cam point coming into position against the boss 345 will depress the free end of the bell crank lever 353, which will snap into place as soon as the cam point passes the end of the lever. This mechanism insures quick actuation of the reversing mechanism, the necessity for which has already been pointed out in connection with the description of Fig. 19.

The control mechanism for this form of apparatus is most clearly shown in Figs. 40 to 42 and Fig. 48. Referring first to Fig. 48, it will be seen that the control pedal H, provided with a stirrup 102 adjacent to its upper end, is pivoted at 4 to the transmission casing. Pedal H is pivotally connected by means of a link 355 to lever 356, which is in turn rigidly secured to a sleeve member 357 rotatably mounted in the transmission casing by means of ball bearings 358. Member 357 is internally bushed at 359 to provide journals for the support of a brake shaft 360, the outer end of which is journalled in the casing cover plate 361 and projects therethrough. The projecting end of shaft 360 is squared as at 362 to receive the brake-operating lever 363 (Fig. 48).

Shaft 360 has rigidly secured thereto a cam plate 364, said plate having a cam surface comprising an arcuate recess 365 and a convex surface 366 to the left of recess 365 as viewed in Fig. 40. A lever 367 is pivoted at one end about the fixed pin 368, and the free end of this lever is provided with a roller 369 adapted to contact with the cam face of plate 364. Lever 367 is further provided with an offset boss 370, and the brake spring 29 is held in compression between this boss and the bottom of a retaining cap 371 screwed into the bottom of the transmission casing.

The sleeve member 357, to which lever 356 is secured, has formed integrally therewith the depending arm 372 and at the lower end of this lever the pawl lever 98, pivoted thereto, is held in contact with the ratchet wheel 101 by spring 99. A pin 373 projects inwardly from cam plate 364 and is adapted to be contacted by the lower portion of the arm 372. A throttle-actuating rod 374 is pivotally secured at one end to the pin 375 secured in arm 372, the free end of this rod passing loosely through a hole 376 in the lower end of a lever 377. Lever 377 is pinned to a shaft 378 passing through the cover plate 361, and having secured to its projecting end the lever 379 (Fig. 48). Lever 379 is in turn connected by means of the link 380 and bell crank 381 to the throttle-actuating rod 1.

The free end of rod 374 is threaded to receive a cylindrical adjusting nut 382 adapted to seat in a recess in lever 377 when rod 374 is moved to the right from the position shown in Fig. 40. Rod 374 is also provided with a collar 383 adapted to strike the end of lever 377 when rod 374 is moved to the left from the position shown in Fig. 40.

Shaft 297, as will be seen most clearly from Fig. 41, is rotatably mounted in the casing web 300 and the cover plate 361, projecting through the latter, the projecting end preferably being squared.

As shown in Fig. 40, shaft 297 is provided with a cam 384 adapted to engage a boss 385 formed on the lever 367.

The operation of the present form of the transmission is as follows: Drive is transmitted from shaft 32 through shaft 212 and member 214 to the secondary fly-wheel 217. Members 212 and 214 provide a relatively long and torsionally resilient drive between the engine and the driving pins actuating the inertia masses. This I have found gives improved quietness of operation by absorbing reaction impulses of an intermittent nature which tend to travel from the transmission back to the driving shaft of the engine. Such impulses, if not damped, tend to cause variation in the angular velocity of the engine drive shaft, and in the case of the ordinary internal combustion engine, such change in angular velocity of the main shaft of the engine causes noise due to backlash in the several drives operating the engine auxiliaries, such as the fan, water pump, etc. The torsionally resilient drive which I provide effectively eliminates noise in the engine due to reaction forces transmitted thereto from the transmission.

In the case of both synchronous and asynchronous drive, the production of turning moments by the inertia masses and their transmission to the driven shaft on the one hand, and to the abutment formed by the casing through the reaction mass on the other hand, is the same as has been described in connection with the transmission shown in Fig. 19.

The application of the forces necessary to keep the clutch roller detents 52 and 53 in contact with their respective engaging surfaces, is accomplished in an improved manner resulting in better action in the clutches and minimizing wear on the clutch parts. Instead of applying a fixed engaging force to the clutch rollers by means of springs in the roller cages, the engaging force in this form of the transmission is varied with variations in operating conditions. I have discovered that the necessary forces can be transmitted through the clutches without breaking the oil film between the roller detents and the sleeves, thus avoiding destructive metal-to-metal contact, provided the engaging force exerted on the detents is not too great or applied for too long a period of time. On the other hand, an insufficient engaging force will allow an oil film of sufficient thickness to remain between the sleeves and detents to cause slippage therebetween. Moreover, the value of the force required to effect reduction of the oil film to the proper thickness without breaking it, varies widely under different operating conditions. For example, at one time the oil may be heavy and viscous, as when starting in cold weather, while at other times it may be very light and fluid. Under the first condition a greater engaging force is required to bring the detents into proper engaging position than in the latter case. Again, if the transmission is operating at high speed in indirect drive, the alternate grip and release of the roller detents is very rapid, so that the oil accumulating between them and the sleeves during release periods must be squeezed out to the proper film thickness in an extremely small time interval. In order to do this a relatively heavy engaging force is necessary, but it will also be seen that as the time intervals of engagement increase, the engaging force must be decreased or there is likelihood of breaking the oil film. This is particularly true in the case of direct drive, when the reaction clutch detents are in unrelieved engagement for long periods of time, and during this condition of drive the engaging force acting on the rollers should be the least which will insure proper gripping of the rollers.

In order to meet these varying conditions and to provide at all times as nearly as possible just the required amount of engaging force and no more, the roller detents are held against their cooperating surfaces by the action of springs 57 in the roller cages and the force transmitted through these springs to the rollers is varied by varying the force tending to rotate the roller cages with respect to their co-operating clutch sleeves. From a consideration of Figs. 31a and 31b, it will be apparent that the engaging force applied to the roller detents will be varied by varying the forces tending to rotate the roller cages. It will further be evident from Figs. 32 and 35 that the forces tending to rotate the roller cages will be varied by variations in the force tending to move the shift rings 251 and 252 away from their center positions. The force tending to move these shift rings away from their center positions is determined by the force tending to increase the eccentricity of the actuating ball 307 on the bell crank 306 (Fig. 41). As shown in this figure, the force tending to increase the eccentricity of ball 307 and maintaining the engaging force on the roller detents, is derived from spring 319, acting through lever 316 and rod 314. In the position of the parts shown in this figure, spring 319 exerts the minimum force required to secure proper operation of the clutches. If the force due to spring 319 is increased, it will be evident that the force supplied to the roller detents will be increased, and this increase is obtained by causing piston 323 to move outwardly from the position shown in Fig. 41 to compress spring 319 and increase the force derived therefrom acting on lever 316.

Piston 323 is moved to compress spring 319 by variation in the pressure of the oil supplied through conduit 341. When the oil supplied through conduit 341 is heavy and viscous, the pressure on piston 323 will be relatively high since the only outlet for such oil is by way of the restricted annular clearance space 333. This will cause piston 323 to move outwardly and increase the pressure exerted by spring 319. This results in the increase in engaging pressure on the roller detents necessary to secure the most efficient operation thereof with heavy oil. If and when the viscosity of the oil decreases so that it flows more freely, the oil will flow more freely through the clearance space 333, thereby tending to decrease the pressure acting on piston 323 and consequently decreasing the pressure applied to the roller detents.

The pressure in conduit 341 and consequently on piston 323 is also varied by varying the pressure at which oil is supplied to this conduit. This variation in pressure is controlled, as will be seen from Fig. 47, by the by-pass comprising passage 339 and port 340. If the transmission is operating asynchronously, port 340 is in registry only a small fraction of the time with passage 339, due to the differential speed existing between the member through which the port passes and the clutch sleeve 42 in which is located the passage 339. Consequently, oil must flow through the relatively long and restricted path formed by the annular space between shaft 212 and member 214, ports 215 and the annular space between member 214 and the clutch sleeve 48. This restricted path causes a resistance to flow which is reflected in maximum pressure being built up in the inlet pipe 193. In turn, this increases the inlet pressure to conduit 341 and causes the piston 323 to be moved outwardly. Under such conditions an increased force is applied to the roller detents.

When the transmission is operating synchronously, the pressure at which oil is supplied to conduit 341 is decreased, since when the transmission operates synchronously, port 340 registers with passage 339 to open the by-pass formed thereby. Opening of this by-pass eliminates the restricted annular passages between members 212, 214 and 48 from the path of oil flow, and by thus reducing the resistance to the flow of the oil, causes the pressure in the supply pipe 193 and conduit 341 to be reduced. This in turn causes a reduction in the pressure applied to the roller detents by relieving the pressure acting on piston 323.

Under certain operating conditions, the intermittent registry of port 340 with passage 339 may cause fluctuations in the pressure in conduit 341, and in order to maintain a relatively steady pressure on piston 323, the ball check valve 342 is provided. Because of this valve, intermittent decreases of pressure in conduit 341 will not affect piston 323, but if the pressure in conduit 341 drops for an appreciable period of time, the pressure on piston 323 will be reduced because of the leakage through the clearance space 333.

In order to prevent the application to the roller detents of an excessive force due to an abnormal pressure in conduit 341, piston 329 is provided, which piston under normal conditions acts in conjunction with piston 323 to compress spring 319.

Under abnormal pressure conditions, the shoulder on pin 322 will abut against the retainer 320 to form a stop resisting movement of piston 323, and under these conditions piston 329 will continue to move under the influence of oil pressure, compressing spring 331. A relatively slight movement of piston 329 with respect to piston 323 will uncover the ports 327 to relieve the pressure in conduit 341. Ports 328 are provided to prevent the possibility of oil being trapped in the annular space between the two pistons.

From the foregoing it will be seen that the pressure exerted on the clutch detents will be varied automatically to secure the most efficient operation of the clutches under varying driving conditions.

Reversal of direction of drive through the transmission is accomplished, as in the transmission shown in Fig. 19, by turning the reversing ratchet wheel 101 one-sixth of a revolution to turn the reversing shaft 154 a half revolution. Movement of shaft 154 is in counter-clockwise direction as viewed from the left or outer end of the shaft in Fig. 42. It is to be noted that when shaft 154 is in the position of rest (shown in Figs. 41 and 42) the pivot pin 305 is not quite normal to the plane passing through the axes of shafts 154 and 212, but is instead inclined about 15 degrees in a direction such that the first fifteen degrees of rotation of shaft 154 in effecting reversal is required to move pin 305 to a position normal to said plane. During this initial movement of shaft 154, the movement of ball 307 is extremely slight, but such movement as does occur is to the right (Fig. 32), which tends to tighten rather than to free the clutch detents from engagement with the clutch sleeves. The next fifteen degrees of rotation of shaft 154 serves to move ball 307 to the left just sufficiently to return it to the same position it occupied before the reversing shaft was moved. This permits shaft 154 to be rotated 30 degrees before any reversing action on the shift rings 251 and 252 takes place. During this 30 degrees of rotation of shaft 154, before actual reversal is commenced, the clearance between the rollers 284 (Fig. 39) and cam faces 294 in the scissor mechanism is taken up. The next 120 degrees of rotation of shaft 154 operates to shift rings 251 and 252 to their left-hand position (Fig. 32) to effect reversal of the roller cages. At the beginning of this 120 degree rotation, cam faces 294 spread rollers 284 and the right-hand ends (Fig. 39) of levers 279 and 280. These levers move about the ends of the distance pin 291 as fulcrum points to contract ring 276 and release the coupling comprising balls 274. A very slight movement of ring 276 is sufficient to free the coupling, and this action serves to release the reaction mass 262. While rings 251 and 252 are moved in the direction for reversal during this freeing operation, this movement is very slight and has no effect, the net result being that release of the clutch mechanism is effected before reversal takes place. The scissor mechanism maintains the coupling in freed position during the actual reversing period. During the last thirty degrees of the half revolution of reversing shaft 154, the cam faces 294 move to permit the scissor mechanism to expand ring 276 to reengage the coupling just as reversal of the clutches is being completed. It will be seen that this scissor mechanism corresponds to the releasing mechanism comprising teeth 170 and 171 in the form of transmission illustrated in Fig. 21.

A second half revolution of reversing shaft 154 will evidently act to again reverse the clutches and return the entire shifting mechanism to the position shown in the figures, in the same manner and sequence as above described.

Quick reversal is insured by means of the mechanism illustrated in Figs. 45 and 46, the cam 176 being held against rotation until a predetermined turning force is applied thereto by the operator through the pedal H. This pedal is so arranged that muscular tension on the part of the operator is required before the requisite amount of force can be developed, and the sudden release of the resisting force due to movement of the cam point past lever 346 results in an involuntary, quick movement on the part of the operator due to such muscular tension. This quick movement results in rapid actuation of the reversing mechanism.

As a part of the present embodiment of the invention, I have provided an improved form of braking system, illustrated in Figs. 48 to 55, which system is particularly adapted to be employed with a free-wheeling or overrunning transmission since it is capable of continuous braking under heavy load without overheating or undue wear, and further provides an extremely powerful braking action.

Referring more particularly to Figs. 48 and 49, it will be seen that the brake lever 363 is pivotally connected to the adjustable link 386, which is in turn pivotally connected to lever 387. Lever 387 is pivoted intermediate its ends to a stud 388 secured in the transmission casing, and the end of this lever opposite the one connected to lever 363 is joined by a ball-and-socket connection 389 to a third lever 390. Lever 390 is mounted intermediate its ends in a socket 391 formed in an annular plate-like member 392 secured to the end of the transmission casing by means of studs 393 (Fig. 25). The end of lever 390 opposite that which is connected to lever 387 is connected by means of a second ball and socket 394 to a brake-actuating ring 395 surrounding the hub of fly-wheel 49, and pivoted to the pin 396 riveted to member 392.

The periphery of member 392 is grooved to form the inner race for a plurality of bearing balls 397 the outer race for which is formed in a ring 398 closing the annular space between the circumference of member 392 and the rim of the driven shaft fly-wheel 49, which is in the form of a brake drum.

Mounted within the fly-wheel or drum 49 is a pair of internal expanding brake shoes 399, these shoes being pivoted at their upper ends by pins 400 to links 401, which are in turn secured to pins 402 journalled in ring 398. As will be seen from Fig. 51, the ends of pins 402, remote from plate 398, are held in spaced relation by the plate 403, which in turn is carried by pins 404 riveted to ring 398.

Ring 398 has riveted thereto a pin 405, through which an adjusting screw 406 passes. The ends of pins 402, which are journalled in ring 398, project through this ring, and the projecting ends have pinned thereto the levers 407 (Fig. 51a), these levers being adapted to be simultaneously turned in opposite directions by movement of an adjusting block 408 threaded on the lower end of the adjusting screw 406.

The upper ends of the brake shoes 399 are drawn toward each other by the coil springs 409, and the lower ends of these shoes are drawn toward each other by the coil springs 410.

Adjacent to their lower ends, each of the brake shoes 399 is connected by means of pivoted forked links 411 to a pin 412, upon which is mounted the roller 413. Roller 413 is flanged as shown in Fig. 52 and is engaged by the circumference of the ring 395. Pin 412, upon which roller 413 is mounted, is connected by means of forked link 414 to pin 415 riveted to the ring 398.

Intermediate their ends the brake shoes 399 are connected by pivoted links 416 to the ends of a pair of U-shaped spacing members 417. The ends of members 416 and 417 are pivoted about the inner ends of a pair of brake draw rods 418, which pass through diametrically opposite holes in ring 398 and through holes 419 in the brake shoes. As will be seen from Figs. 49 and 50, holes 419 provide considerable clearance space around the inner ends of the draw rods 418.

Holes are also formed through the members 417 and through the right-hand brake shoe 399, through which pin 415 passes, these holes being considerably larger than the diameter of the pin to provide a clearance around the pin.

The outer circumference of ring 395 is irregular in outline, the contour of the lower half of its circumference being such that as roller 413 moves to either side of the position shown in Fig. 50, it will also, in following the circumference of the ring, move radially toward the central axis of the brake drum. The actual contour of the ring 395 is very nearly circular, so that the inward movement of roller 413 is relatively slight. In order, however, to make the action of this part of the apparatus clear, the curvature of the circumference of ring 395 away from a true circle has been exaggerated, and near the portions of the ring at 90 degrees from the bottom thereof, as shown in Fig. 50, depressions 420 and 421 of an exaggerated depth are shown.

The flange of the drum formed by fly-wheel 49 is provided on its exterior surface with a plurality of axially oblique radiating fins or ribs 422, which as shown in Fig. 48 are arranged so that the leading edges thereof, with respect to rotation of the drum, are also leading edges with respect to the direction of motion of the vehicle.

Referring now to Figs. 48 and 55, the connection from the brake shoes 399 to the front wheel brakes of the vehicle, are shown. On each side of the vehicle frame, approximately opposite the drum 49, is mounted a hanger 423 providing two fixed vertical pivots 424 and 425. A lever arm 426 is pivoted intermediate its ends about the pivot 424, and one end of this lever is connected by means of a spherically mounted link 427 and coil spring 428 to the end of one of the draw rods 418.

The opposite end of lever 426 is connected by the pivoted link 429, passing through a suitable aperture in the frame, to one corner of a triangular plate 430. Plate 430 is pivoted adjacent to its center about the pivot 425. A coil spring 431 is connected between pivot 432, located at another corner of plate 430, and bolt 433, passing through a suitable hanger 434 fixed to the frame. A nut 435 on the threaded end of bolt 433 provides means for adjusting the tension on spring 431. One end of a brake rod 436 is pivoted about a pin 437 at the third corner of plate 430. A resilient spring abutment 438 is secured to the inner face of the frame opposite the link 427. Brake rod 436 is pivotally connected to an intermediate supporting arm 439 and a link 440. The forward end of link 440 is connected to an operating lever 441 (Fig. 54) pivoted about pin 442 and passing through the fixed plate 443 serving as a closure for the front wheel brake drum 444. The end of lever 441 within the drum is provided with a cam 445 adapted to engage the upper end of the brake shoe 446 forming part of a two-shoe internal expanding brake located within the drum 444. The lower end of shoe 446 is connected by means of the floating pivot 447 to the second shoe 448. Shoe 448 is secured at its upper end by means of a yielding connection comprising a plunger 449 (Fig. 54) pivotally mounted on the pin 450 fixed to the plate 443. Plunger 449 slides in a recess 451 formed in the end of shoe 448, and a spring 452 located in said recess serves to urge the upper end of shoe 448 away from a pivot 450. A coil spring 453 acts to draw the upper ends of brake shoes 446 and 448 together.

The lower ends of shoes 446 and 448 may be prevented from dragging in the released position of the brake by means of a spring 454.

The front wheel brake has been illustrated in somewhat diagrammatic form, since this brake may be any known form of Servo brake in which contact of one shoe with the brake drum tends to force a second or third shoe into braking contact with the drum. The difference between the brake shown and the ordinary form lies in the yielding support of the upper end of shoe 448.

Only one front wheel brake and the mechanism for actuating it has been shown, but it will be understood that the front wheel braking mechanism on the opposite side of the vehicle is identical with that which has been shown.

The operation of the braking mechanism is as follows: If the brake lever 363 is depressed, this motion will be transferred through link 386 and lever 387 to depress the end 394 of lever 390, thereby lowering ring 395 about its pivot 396. This action depresses roller 413, which swings in an arc about pin 415, to spread the lower ends of brake shoes 399 to bring them into contact with the rotating drum 49.

Since the shoes are mounted on pins 402 fixed to the rotatable plate 398, the entire brake assembly tends to rotate with the drum to a position such as is shown in Fig. 53. The motion of shoes 399 is transferred to the draw rods 418 through links 416, so that rotation of the brake assembly is resisted by springs 428 secured to the levers 426 mounted on each side of the car. In Fig. 55 the position of the mechanism shown corresponds to the position of the brake assembly shown in Fig. 53, that is, with the brakes applied. When the brakes are in released position, as shown in Fig. 50, springs 431 (Fig. 55) are held under a predetermined tension and serve to hold the ends of links 427 against the spring abutments 438 with a predetermined force, which must be overcome before movement of the draw rods 418 upon application of the drive shaft brake can move levers 426 to actuate the front wheel brakes.

It will be seen from Figs. 50 and 53 that the braking action of the drive shaft brake is resisted by a force couple acting through draw rods 418, the action being such that no unbalanced forces are produced acting on the drive shaft or its bearings.

Furthermore, due to the resistance imposed by springs 431, an initial braking action, sufficient to develop a predetermined force, must be applied to the drive shaft brake before actuation of the front wheel brakes can take place. During this initial brake application, movement of the brake assembly from the position shown in Fig. 50 toward the position shown in Fig. 53 is permitted by the resiliency of springs 428.

As the brake assembly moves toward the position shown in Fig. 53, roller 413 travels about the ring 395 toward the depression 420 therein, and since the outer face of ring 395 is not concentric with the axis of rotation, but permits roller 413 to move radially inward, the pressure exerted by the roller on shoes 399 will decrease as the latter move until a point of braking equilibrium is established. Additional braking effort can then be secured only by further actuation of the brake rods serving to further depress the ring 395. It will thus be seen that a definite braking force will be applied for each position of ring 395, which force will not be exceeded, regardless of variations in friction coefficients.

When sufficient force is transmitted through the draw rods 418 to overcome the tension of springs 431, the front wheel brake rods 436 and 440 are actuated, and the primary front wheel brake shoes 446 are applied. These shoes in turn apply shoes 448. As in the case of the drive shaft brake, a given position of levers 441 will result in a given braking force being applied through the shoes 446 and 448, which force will not be exceeded. This is due to the fact that if the braking force corresponding to a given position of levers 441 is exceeded, the reaction therefrom will cause spring 452 to yield, permitting shoes 448 and 446 to move rotationally, thereby reducing the brake-applying force. Both in the case of the drive shaft brake and the front wheel brakes, the construction is such that increase in braking force can be secured only by following up the movement of the brake shoes with movement of the brake-actuating mechanism.

Due to the rear axle gearing, the driven shaft drum 49 rotates at a much higher speed than would a wheel brake drum, and the spiral ribs or fins 422 thereon serve to dissipate at an extremely rapid rate the heat generated in the brake. Because of this high rate of heat dissipation, this brake may be applied continuously without overheating, a requirement which is necessary in a brake used in conjunction with a free-wheeling transmission.

It is further to be noted that the drive shaft brake, applying brake force to the rear wheels, is applied before actuation of the front wheel brakes is begun. This initial braking application on the rear wheels tends to shift the center of gravity of the vehicle toward the front wheels, due to deceleration of the vehicle and the reaction forces set up by the braking. This change in the center of gravity increases the adhesion of the front wheels and therefore permits a very heavy braking effort to be applied to these wheels without causing them to lose adhesion.

In practice, I adjust the mechanism so that a braking force equal to 7 to 8 percent of the vehicle weight is applied to the rear wheels before actuation of the front wheel brakes is commenced. Braking force on the front wheels is then built up very rapidly, so that when the maximum braking force is applied to the brakes, the drive shaft brake exerts a retarding force equal to about 25 percent of the vehicle weight, and the front wheel brakes exert a retarding force equal to about 50 percent of the vehicle weight, so that a total retarding force of 75 percent of the vehicle weight is secured. This force is secured with the brake-actuating mechanism in its furthest applied position, and since the braking force in any given position of the brake-actuating mechanism cannot be exceeded, this represents the maximum braking force which can be obtained. A force of this magnitude is sufficient to stop the vehicle with extreme suddenness, but due to the manner of its application avoids locking the vehicle wheels.

Operation of the control system in this form of the apparatus is essentially the same as has been previously described. In Fig. 48, the operating pedal is shown in its position of rest with the brakes applied. This position corresponds to the full line position shown in Fig. 40, and it will be seen that depression of the pedal will cause the cam plate 364 to be rotated in counterclockwise direction due to the abutment of arm 372 gainst pin 373. This rotation of the plate 364 causes similar rotation of the brake arm 363, thereby releasing the brakes against the action of spring 29, which is compressed by the action of the cam plate on roller 369.

During this range of movement, the rod 374 is moved to the right, but actuation of the throttle does not take place because of the lost motion between the member 382 and the lever arm 377. When rod 374 has been moved so far to the right (as shown in Fig. 40) that member 382 is in contact with arm 377, further movement of rod 374 to the right due to depression of the operating pedal causes actuation of the throttle to increase the supply of gasoline or other motive fluid to the engine. It will further be seen from Fig. 40 that depression of the pedal causes the arm 372 to move the pawl 98 away from the reversing ratchet 101.

Upon release of pressure from pedal H, roller 369, under the influence of spring 29, acts to move the cam plate 364 in clockwise direction (as viewed in Fig. 40) to depress arm 363 and apply the brakes. This movement is continued until roller 369 moves into the recess 365 in the cam plate, in which position the brakes are fully applied.

When the operating pedal is lifted by means of stirrup 102, arm 372 is moved in clockwise direction away from pin 373, so that the braking mechanism is undisturbed. This movement causes the pawl 98 to engage the next succeeding depression in ratchet wheel 101, the position of these parts with the pedal fully lifted being shown in Fig. 44. Depression of the pedal from its fully lifted position to its position of rest moves the ratchet wheel through a sixth of a revolution, and causes reversal in the manner already described.

In order to prevent reversal being attempted with the throttle held open by means other than the throttle-actuating means shown (such, for example, as a second throttle control mounted on the vehicle steering wheel), the collar 383 is adapted to strike lever 377 to close the throttle, when the operating pedal is lifted, in order to prepare the mechanism for the actual reversing movement.

Means for releasing the brake so that the vehicle can be moved without actuation of the operating pedal is provided by the shaft 297 extending through the transmission housing. From Figs. 39 and 40 it will be seen that rotation of this shaft will act to release the brake through the abutment of cam 384 against the boss 385 on lever 367, and will likewise free the transmission by the action of the cam faces 296 against the lugs 295 to spread the scissor mechanism and contract the coupling ring 276. Shaft 297 may be actuated from the exterior of the vehicle by any suitable form of mechanism (not shown) or by a removable crank similar to the ordinary engine starting crank. This arrangement is desirable in order to enable vehicles such as closed automobiles to be moved in garages and like places when they are locked so that the operating pedal is inaccessible.

From the foregoing description of the several embodiments of the invention it will be seen that I have provided a control system of the utmost operating simplicity, in which all of the driving factors affecting propulsion of the automobile may be controlled by the manipulation of a single operating member. It will be further evident that this control system, in addition to being of the utmost simplicity, is substantially fool-proof, since reversal cannot be effected until after the brakes are fully applied, and the brake and throttle controls are so arranged that in case of release of control on the part of the operator, the vehicle will be brought to an immediate stop. Under all driving conditions, the movement on the part of the operator necessary to secure a given result is the same, this being true with the mechanism adjusted for either forward or reverse drive. It is also true regardless of whether the vehicle may be standing on an upgrade or a downgrade.

It will be understood that the invention is not limited to any particular construction, but may be embodied in a variety of forms of apparatus. It will also be understood that a great variety of changes may be made in the construction and arrangement of parts and in the carrying out of the method of the invention without departing from the spirit or scope thereof.

The present application includes claims directed to the several features of the vehicle control system, features relating to the transmission mechanism and to the braking mechanism and clutch mechanisms per se, disclosed but not claimed in this application, being claimed in my copending applications Serial No. 218,293, Patent No. 1,861,418; Serial No. 374,830, Patent No. 1,897,506; Serial No. 375,506; Serial No. 407,236, Patent No. 1,810,282; Serial No. 417,622; Serial No. 447,896, Patent No. 1,810,283, and Serial No. 542,542.

What I claim is:

1. A self-propelled vehicle comprising a prime mover, means for varying the power developed by the prime mover, a driven element, means for providing a driving relation between the prime mover and the driven element including a variable-speed transmission having a speed ratio permitting the prime mover to operate when the driven element is at rest while maintaining said driving relation, means for altering the effect of the prime mover on the driven element, and a manually operable member for actuating said altering means, said manually operable member and said power-varying means having related positions to limit the power developed by the prime mover when the altering means is operated.

2. A self-propelled vehicle comprising a prime mover, means for varying the power developed by the prime mover, a driven element, means for providing a driving relation between the prime mover and the driven element including a variable-speed transmission having a speed ratio permitting the prime mover to operate when the driven element is at rest, means comprising brake mechanism adjustable to vary the effect of the prime mover on the driven element, and a manually operable member for adjusting the brake mechanism, said manually operable member and said power-varying means having related positions to limit the power developed by the prime mover when the braking mechanism is adjusted.

3. A self-propelled vehicle comprising a prime mover, means for varying the power developed by the prime mover, a driven element, means for providing a driving relation between the prime mover and the driven element including a variable-speed transmission having an overrunning clutch through which force is transmitted to the driven element and having a speed ratio permitting the prime mover to operate when the driven element is at rest while maintaining said driving relation, means for altering the effect of the prime mover on the driven element, and a manually operable member for actuating said altering means, said manually operable member and said power-varying means having related positions to limit the power developed by the prime mover when the altering means is operated.

4. A self-propelled vehicle comprising a prime mover, means for varying the power developed by the prime mover, a driven element, means for providing a driving relation between the prime mover and the driven element including a variable-speed transmission having an overrunning clutch through which force is transmitted to the driven element and having a speed ratio permitting the prime mover to operate when the driven element is at rest, means comprising brake mechanism adjustable to vary the effect of the prime mover on the driven element, and a manually operable member for adjusting the brake mechanism, said manually operable member and said power-varying means having related positions to limit the power developed by the prime mover when the braking mechanism is adjusted.

5. A self-propelled vehicle comprising a prime mover, means for varying the power developed by the prime mover, a driven element, means for providing a driving relation between the prime mover and the driven element including a variable-speed transmission having a speed ratio permitting the prime mover to operate when the driven element is at rest, means comprising reversing mechanism for varying the effect of the prime mover on the driven element, and a manually operable member for causing actuation of said mechanism, said manually operable member and said power-varying means having related positions to limit the power developed by the prime mover when the reversing mechanism is actuated.

6. A self-propelled vehicle comprising a prime mover, a driven element, means for varying the power developed by the prime mover, means for providing a driving relation between the prime mover and the driven element including a variable-speed transmission having a speed ratio permitting the prime mover to operate when the driven element is at rest, means comprising brake mechanism and reversing mechanism for varying the effect of the prime mover on the driven element, and a manually operable member for actuating the reversing mechanism, said member, said power-varying means and said brake mechanism having related positions to limit the power developed by the prime mover and to arrest movement of the driven element when the reversing mechanism is actuated.

7. In a self-propelled vehicle, a propelling element, an internal combustion driven power plant including a transmission automatically providing synchronous-asynchronous drive through the transmission to the propelling element, a movable control member, and mechanism actuated by movement of said member for controlling both acceleration and deceleration of the vehicle through its entire speed range.

8. In a self-propelled vehicle, a propelling element, an internal combustion driven power plant including a transmission automatically providing synchronous-asynchronous drive through the transmission to the propelling element, a control member movable between a first position and a second position, and mechanism actuated by movement of said member in one direction from said first position to said second position to cause acceleration of the vehicle through its entire speed range to be effected and by movement of said member in the opposite direction from said second position to said first position to cause deceleration of the vehicle through its entire speed range to be effected.

9. In a self-propelled vehicle, a propelling element, an internal combustion driven power plant including a transmission automatically providing synchronous-asynchronous drive through the transmission to the propelling element, and mechanism including a single manually operable pedal for controlling acceleration and deceleration of the vehicle through its entire speed range.

10. In a self-propelled vehicle, a propelling element, an internal combustion driven power plant including a transmission automatically providing synchronous-asynchronous drive through the transmission to the propelling element, means tending at all times to apply a force to arrest movement of the propelling element to stop the vehicle, and mechanism including a manually operable pedal for controlling acceleration and deceleration of the vehicle through its entire speed range against the tendency of said means to stop the vehicle.

11. In a self-propelled vehicle, a propelling element, an internal combustion engine, a reversible transmission for automatically providing synchronous-asynchronous drive through the transmission to the propelling element, and mechanism including a single manually operable pedal for controlling both the direction of drive to the propelling element and the acceleration and deceleration thereof.

12. In a self-propelled vehicle, in combination, an internal combustion engine, a driven element, means for providing a driving relation between the engine and the driven element including a variable-speed transmission having a speed ratio permitting the engine to operate when the driven element is at rest while maintaining said driving relation, braking means for arresting movement of said element, means for releasing said braking means, means for varying the power developed by the engine, and a member for operating said releasing means and said power-varying means in sequence.

13. In a self-propelled vehicle, in combination, an internal combustion engine, a driven element, means for providing a driving relation between the engine and the driven element including a variable-speed transmission having a speed ratio permitting the prime mover to operate when the driven element is at rest while maintaining said driving relation, braking means for arresting movement of said element, means for releasing said braking means, means for varying the power developed by the engine, means for operating said releasing means and said power-varying means, said operating means being arranged so that said power-varying means can be actuated only after the releasing means has been actuated to release the braking means.

14. In a self-propelled vehicle, in combination, an internal combustion engine having a throttle, a driven element, means for providing a driving relation between the engine and the driven element including a variable-speed transmission having a speed ratio permitting the prime mover to operate when the propelling element is at rest while maintaining said driving relation, braking means for arresting movement of said element, means acting to apply said braking means, and a manually operable control member arranged to sequentially release said braking means against the action of the applying means and operate said throttle-actuating means to open the throttle.

15. In a self-propelled vehicle, in combination, an internal combustion engine having a throttle, a driven element, means for providing a driving relation between the engine and the driven element including a variable-speed transmission having a speed ratio permitting the prime mover to operate when the propelling element is at rest while maintaining said driving relation, braking means for arresting movement of said element, a spring acting to apply said braking means, means for actuating said throttle, means for releasing the brake against the action of said spring, and a manually operable pedal, said pedal being arranged to sequentially operate the brake-releasing means and the throttle-actuating means to open the throttle by a uni-directional operating movement of the pedal.

16. In a self-propelled vehicle in combination, an internal combustion engine having a throttle, a driven element, means for providing a driving relation between the engine and the driven element including a variable-speed transmission having a speed ratio permitting the prime mover to operate when the driven element is at rest while maintaining said driving relation, a brake for arresting movement of said driven element, means acting to apply said brake, a manually operable member for releasing the brake against the action of said brake-applying means, means operable upon movement of said manually operable member for diminishing the effect of said brake-applying means as the brake is released, and means for actuating said throttle upon movement of said manually operable member beyond the position effecting release of the brake.

17. In a self-propelled vehicle, an internal combustion engine, means for varying the power developed by the engine, means for reversing the direction of drive of the vehicle, means for braking the vehicle, and a common member for operating all of said means, said member acting in the same direction irrespective of the direction of drive to cause release of said braking means and to cause the power developed by the engine to be increased.

18. In a self-propelled vehicle, an internal combustion engine, means for varying the power developed by the engine, means for reversing the direction of drive of the vehicle, means for braking the vehicle and a common member for operating all of said means, said member acting in the same direction to effect reversal of the direction of drive, to effect release of the braking means and to effect increase of the power developed by the engine.

19. In a self-propelled vehicle, an internal combustion engine, means for varying the power developed by the engine, means for reversing the direction of drive of the vehicle, means for braking the vehicle and a common pedal for operating all of said means, depression of said pedal acting to effect reversal of the direction of drive, to effect release of the braking means, and to effect increase of the power developed by the engine.

20. In a self-propelled vehicle, an internal combustion engine, a driven element, means for providing a driving relation between the engine and the driven element including a reversible variable-speed transmission having a speed ratio permitting the engine to operate when the driven element is at rest while maintaining said driving relation, means for varying the power developed by the engine, a single operating member, and mechanism actuated by said member for controlling said power varying means and for effecting reversal of the transmission.

21. In a self-propelled vehicle, an internal combustion engine, a driven element, means for providing a driving relation between the engine and the driven element including a reversible variable-speed transmission having a speed ratio permitting the engine to operate when the driven element is at rest while maintaining said driving relation, means for varying the power developed by the engine, an operating member, and mechanism actuated by said member for controlling said power varying means and for effecting reversal of the transmission, said mechanism being arranged to permit reversal of the transmission only after actuation of the power varying means to limit the power developed by the engine.

22. In a self-propelled vehicle, an internal combustion engine, a driven element, means for providing a driving relation between the engine and the driven element including a reversible variable-speed transmission having a speed ratio permitting the engine to operate when the driven element is at rest while maintaining said driving relation, means for varying the power developed by the engine, braking means for arresting movement of the driven element, an operating member, and mechanism actuated by said member for controlling both said braking means and said power varying means and for effecting reversal of the transmission.

23. In a self-propelled vehicle, an internal combustion engine, a driven element, means for providing a driving relation between the engine and the driven element including a reversible variable-speed transmission having a speed ratio permitting the engine to operate when the driven element is at rest while maintaining said driving relation, means for varying the power developed by the engine, braking means for arresting movement of the driven element, an operating member, and mechanism actuated by said member for controlling both said braking means and said power-varying means and for effecting reversal of the transmission, said mechanism being arranged to permit reversal of the transmission only after actuation of both the braking means to arrest movement of the driven element and of the power varying means to limit the power developed by the engine.

24. In a self-propelled vehicle, an internal combustion engine, a driven element, means for providing a driving relation between the engine and the driven element including a reversible variable-speed transmission having a speed ratio permitting the engine to operate when the driven element is at rest while maintaining said driving relation, means for varying the power developed by the engine, an operating member having a normal position of rest, mechanism actuated by movement of said member on one side of said position of rest for controlling said power varying means, and mechanism actuated by movement of said member on the opposite side of said position of rest for effecting reversal of the transmission.

25. In a self-propelled vehicle, an internal combustion engine, a driven element, means for providing a driving relation between the engine and the driven element including a reversible variable-speed transmission having a speed ratio permitting the engine to operate when the driven element is at rest while maintaining said driving relation, braking means for arresting movement of the driven element, means for varying the power developed by the engine, an operating member having a normal position of rest, mechanism actuated by movement of said member on one side of said position of rest for controlling both the braking means and the power varying means, and mechanism actuated by movement of said member on the opposite side of said position of rest for effecting reversal of the transmission.

26. In a self-propelled vehicle, an internal combustion engine, a driven element, means for providing a driving relation between the engine and the driven element including a reversible variable-speed transmission having a speed ratio permitting the engine to operate when the driven element is at rest while maintaining said driving relation, braking means for arresting movement of the driven element, means for varying the power developed by the engine, an operating member having a normal position of rest, mechanism actuated by movement of said member in a first range of movement on one side of said position of rest for controlling the braking means, mechanism actuated by movement of said member in a second and more remote range of movement on the same side of said position of rest for controlling the power varying means, and mechanism actuated by movement of said member on the opposite side of said position of rest for effecting reversal of the transmission.

27. In a self-propelled vehicle, an internal combustion engine, a driven element, means for providing a driving relation between the engine and the driven element including a reversible variable-speed transmission having a speed ratio permitting the engine to operate when the driven element is at rest while maintaining said driving relation, braking means for arresting movement of the driven element, an operating pedal, mechanism tending to apply said braking means and to maintain said pedal in a given position, means actuated by depression of the pedal from the given position for causing release of said braking means, and means actuated by movement of the pedal above the given position for effecting reversal of the transmission.

28. In a self-propelled vehicle, an internal combustion engine, a driven element, means for providing a driving relation between the engine and the driven element including a reversible variable-speed transmission having a speed ratio permitting the engine to operate when the driven element is at rest while maintaining said driving relation, braking means for arresting movement of the driven element, an operating pedal, mechanism tending to apply said braking means and to maintain said pedal in a given position, means actuated by depression of the pedal from the given position for causing release of said braking means, means for lifting the pedal to a second position above said given position, and mechanism actuated by depression of the pedal from said second position to said given position to effect reversal of the transmission.

29. A self-propelled vehicle comprising in combination, an internal combustion engine, a propelling element, reversible means for providing a driving relation between the engine and the propelling element, said relation being interrupted in normal operation only during reversal of said means, mechanism for effecting reversal of said means, and means for insuring rapid actuation of said mechanism, said means comprising a member resisting actuation of said mechanism until a force sufficient to effect rapid reversal is applied to the mechanism.

30. A self-propelled vehicle comprising, in combination, an internal combustion engine, a propelling element, reversible means for providing a driving relation between the engine and the propelling element, said relation being interrupted in normal operation only during reversal of said means, mechanism including a manually operable pedal for effecting reversal of said means, and means for causing an initial resistance to actuation of said pedal, said last named means being arranged to suddenly relieve said mechanism from such resistance upon the application to the pedal of a predetermined force.

31. A self-propelled vehicle comprising, in combination, an internal combustion engine, a propelling element, reversible means for providing a driving relation between the engine and the propelling element, said relation being interrupted in normal operation only during reversal of said means, mechanism including a manually operable pedal arranged to effect reversal of said means upon depression of the pedal, and a spring arranged to resist initial depression of the pedal until a predetermined force is applied to the pedal and to suddenly cease its resistance upon application to the pedal of the predetermined force.

32. A self-propelled vehicle comprising, in combination, an internal combustion engine, a propelling element, reversible means for providing a driving relation between the engine and the propelling element, said relation being interrupted in normal operation only during reversal of said means, mechanism including a manually operable member arranged to effect reversal of said means upon movement of the member in one direction, said member being arranged to be moved in said one direction by a force due to muscular tension on the part of the operator, and means arranged to resist movement of the member until a predetermined force is applied by the operator to the member and to suddenly cease its resistance upon application to the member of said predetermined force, whereby rapid movement of the member is involuntarily effected by the operator due to the muscular tension required to produce said predetermined force.

33. A self-propelled vehicle comprising, in combination, an internal combustion engine, a propelling element, reversible means for providing a driving relation between the engine and the propelling element, said relation being interrupted in normal operation only during reversal of said means, mechanism including a manually operable pedal arranged to effect reversal of said means upon depression of the pedal, said pedal being arranged to be depressed by a force due to muscular tension on the part of the operator, and spring means arranged to resist initial depression of the pedal until a predetermined force is applied by the operator to the pedal and to suddenly cease its resistance upon application to the pedal of said predetermined force, whereby rapid depression of the pedal is involuntarily effected by the operator due to the muscular tension required to produce said predetermined force.

34. A self-propelled vehicle comprising, in combination, a power plant capable of effecting drive in either forward or reverse direction, an operating member movable to effect change in the direction of drive and mechanism actuated by movement of said member in the same direction for changing the direction of drive from forward to reverse and from reverse to forward.

35. A self-propelled vehicle comprising, in combination, a power plant capable of effecting drive in either forward or reverse direction, an operating pedal and mechanism actuated by depression of said pedal for changing the direction of drive from forward to reverse and from reverse to forward.

36. A self-propelled vehicle comprising, in combination, a power plant for effecting drive of the vehicle in either forward or backward direction, said power plant comprising an internal combustion engine and a reversible mechanical transmission, an operating member movable to effect change in the direction of drive of the vehicle, and mechanism actuated by movement of said member in the same direction for changing the direction of drive of the vehicle from either forward or backward direction to the opposite direction.

37. A self-propelled vehicle comprising, in combination, a power plant for effecting drive of the vehicle in either forward or backward direction, said power plant comprising an internal combustion engine and a reversible mechanical transmission, an operating pedal and mechanism actuated by the depression of said pedal for changing the direction of drive of the vehicle from either forward or backward direction to the opposite direction.

38. Apparatus for controlling the operation of a self-propelled vehicle having a brake and a power plant including a throttle-controlled engine and a reversible transmission, comprising means for effecting reversal of the transmission, means for actuating the brake and means for actuating the engine throttle, and a single manually operable member having operative connection with each of said means for controlling the same.

39. Apparatus for controlling the operation of a self-propelled vehicle having a brake and a power plant including a throttle-controlled engine and a reversible transmission, comprising means for effecting reversal of the transmission and for actuating the brake and the engine throttle, and a single operating member for controlling said means, said member having one range of movement for causing reversal to be effected, a second range of movement for controlling the brake, and a third range of movement for controlling the throttle.

40. Apparatus for controlling the operation of a self-propelled vehicle having a brake and a power plant including a throttle-controlled engine and a reversible transmission, comprising means for effecting reversal of the transmission and for actuating the brake and the engine throttle, and a single operating member for controlling said means, said member having one range of movement for causing reversal to be effected, a second range of movement for controlling the brake, and a third range of movement for controlling the throttle, the second range of movement being located between the first range of movement and the third range of movement.

41. Apparatus for controlling the operation of a self-propelled vehicle having a brake and a power plant including a throttle-controlled engine and a reversible transmission, comprising means for effecting reversal of the transmission and for actuating the brake and the engine throttle, and a single manually operable pedal movable to different ranges of movement for selectively actuating said means to alternatively effect reversal of the transmission and control of the brake and of the engine throttle.

42. Apparatus for controlling the operation of a self-propelled vehicle having a brake and a power plant including a throttle-controlled engine and a reversible transmission, comprising means for effecting reversal of the transmission and for actuating the brake and the engine throttle, and a manually operable pedal for controlling said means, said pedal having one range of movement for causing reversal to be effected, a second range of movement for controlling the brake, and a third range of movement for controlling the throttle, said pedal being arranged to cause reversal of the transmission, release of the brake and opening of the throttle to be effected by depression of the pedal.

43. Apparatus for controlling the operation of a self-propelled vehicle having a brake and a power plant including a throttle-controlled engine and a reversible transmission comprising means for effecting reversal of the transmission and for actuating the brake and the engine throttle, and a manually operable pedal for controlling said means, said pedal having one range of movement for causing reversal to be effected, a second range of movement for controlling the brake, and a third range of movement for controlling the throttle, said pedal being arranged to cause reversal of the transmission, release of the brake and opening of the throttle to be effected in sequence upon depression of the pedal through its full range of movement.

44. In apparatus of the character described, the combination with a power plant having an engine and a reversible transmission for transmitting power to the driven element, of mechanism for varying the power developed by the engine, mechanism for effecting reversal of the transmission, mechanism for arresting movement of the driven element, and a single operating member movable to different positions for alternatively controlling said mechanisms.

45. In apparatus of the character described, the combination with a power plant having an engine and a reversible transmission for transmitting power to a driven element, of mechanism for varying the power developed by the engine, mechanism for effecting reversal of the transmission, mechanism for arresting movement of the driven element, and a single operating member for controlling said mechanisms, said member having one range of movement for actuating said reversing mechanism, a second range of movement for controlling said arresting mechanism, and a third range of movement for controlling said power-varying mechanism.

46. In apparatus of the character described, the combination with a power plant having an engine and a reversible transmission for transmitting power to the driven element, of mechanism for varying the power developed by the engine, mechanism for effecting reversal of the transmission, mechanism for arresting movement of the driven element, and a single operating member for controlling said mechanisms, said member having one range of movement for actuating said reversing mechanism, a second range of movement for controlling said arresting mechanism, and a third range of movement for controlling said power-varying mechanism, the second range of movement being located between the first range of movement and the third range of movement.

47. In apparatus of the character described, the combination with a power plant having an engine and a reversible transmission for transmitting power to the driven element, of mechanism for varying the power developed by the engine, mechanism for effecting reversal of the transmission, mechanism for arresting movement of the driven element, and a single manually operable pedal operatively connected with each of said mechanisms for controlling the same.

48. In apparatus of the character described, the combination with a power plant having an engine and a reversible transmission for transmitting power to the driven element, of throttle mechanism for controlling the power developed by the engine, mechanism for effecting reversal of the transmission, brake mechanism for arresting movement of the driven element, and a single manually operable pedal for controlling said mechanisms, said pedal having one range of movement for causing actuation of the reversing mechanism, a second range of movement for controlling the brake mechanism, and a third range of movement for controlling the throttle mechanism, said pedal being arranged to cause reversal of the transmission, release of the brake, and opening of the throttle to be effected by depression of the pedal.

49. In apparatus of the character described, the combination with a power plant having an engine and a reversible transmission for transmitting power to the driven element, of throttle mechanism for controlling the power developed by the engine, mechanism for effecting reversal of the transmission, brake mechanism for arresting movement of the driven element, and a single manually operable pedal for controlling said mechanisms; said pedal having one range of movement for causing actuation of the reversing mechanism, a second range of movement for controlling the brake mechanism, and a third range of movement for controlling the throttle mechanism, said pedal being arranged to cause reversal of the transmission, release of the brake, and opening of the throttle to be effected in sequence upon depression of the pedal through its full range of movement.

50. In a self-propelled vehicle, an engine, means for varying the power developed by the engine, a driven element, means for providing a driving relation between the engine and the driven element including mechanism automatically permitting overrunning or free-wheeling of the driven element, braking means for arresting movement of the driven element, and a common operating member for controlling the braking means and the power varying means.

51. In a self-propelled vehicle, an engine, means for varying the power developed by the engine, a driven element, means for providing a driving relation between the engine and the driven element including mechanism automatically permitting overrunning or free-wheeling of the driven element, braking means for arresting movement of the driven element, and mechanism including an operating member movable from a first position to a second position to sequentially release said braking means and actuate said first-mentioned means to increase the power developed by the engine.

52. In a self-propelled vehicle, an engine, means for varying the power developed by the engine, a driven element, means for providing a driving relation between the engine and the driven element including mechanism automatically permitting overrunning or free-wheeling of the driven element, braking means for arresting movement of the driven element, means acting to apply said braking means, and a common operating member for releasing the braking means against the action of said brake-applying means and for controlling the power varying means after the braking means has been released.

53. In a self-propelled vehicle, an engine, means for varying the power developed by the engine, a driven element, means for providing a driving relation between the engine and the driven element including mechanism automatically permitting overrunning or free-wheeling of the driven element, braking means for arresting movement of the driven element, means acting to apply said braking means, a manually operable pedal, and mechanism arranged to cause initial depression of the pedal to effect release of the braking means against the action of said brake-applying means and further depression of the pedal to actuate said power varying means to cause an increase in the power developed by the engine.

54. In apparatus of the character described, in combination, throttle actuating mechanism, brake actuating mechanism including a torsion spring acting to apply the brake, and a manually operable member movable to release the brake against the action of said torsion spring and to operate said throttle actuating mechanism to open the throttle in sequence, said mechanism including means arranged to cause the effective resistance of the torsion spring with respect to movement of said manually operable member to diminish as the brake is released.

55. In apparatus of the character described, in combination, throttle actuating mechanism, brake actuating mechanism including a torsion spring and a lever actuated thereby for applying the brake, and a pedal operable upon depression to release the brake against the action of said spring and to open the throttle in sequence, said mechanism including a cam member acting on said lever for causing the resistance of the spring to depression of the pedal to decrease as the brake is released and to increase as the throttle is opened.

56. In apparatus of the character described, in combination, throttle actuating mechanism, brake actuating mechanism, a pedal for operating said mechanisms and acting upon depression to release the brake and open the throttle in sequence, and a spring rod resisting depression of said pedal, said rod being arranged so as to be twisted in torsion as the pedal is depressed and said brake actuating mechanism including cam means for determining the resistance by said rod to depression of the pedal in different positions of the pedal.

57. In apparatus of the character described, in combination, throttle actuating mechanism, brake actuating mechanism, a pedal for operating said mechanisms and acting upon depression to release the brake and open the throttle in sequence, a spring rod resisting depression of said pedal, said rod being arranged so as to be twisted in torsion as the pedal is depressed, and said brake actuating mechanism including cam means for determining the resistance by said rod to depression of the pedal in different positions of the pedal, and means for altering the amount of torsional twist of the rod for a given position of the pedal, said brake actuating mechanism including cam means for determining the resistance by said rod to depression of the pedal in different positions of the pedal.

58. In a self-propelled vehicle, in combination, an internal combustion engine, mechanism operated by the engine for driving the vehicle, means for varying the power developed by the engine, reversing means for changing the direction of drive of the vehicle and a common member for operating both of said means, said member being arranged with respect to said reversing means so as to operate in the same direction irrespective of the position of the reversing means to cause the power developed by the engine to be increased.

59. In a self-propelled vehicle, in combination, an internal combustion engine, mechanism operated by the engine for driving the vehicle, reversing means for changing the direction of drive of the vehicle, means for braking the vehicle and a common member for controlling both of said means, said member being arranged with respect to the reversing means so as to act in the same direction irrespective of the position of the reversing means to release said braking means.

60. A self-propelled vehicle comprising, in combination, an internal combustion engine, a propelling element, means for providing a driving relation between the engine and the propelling element including a reversible variable-speed transmission having a speed ratio permitting the engine to operate when the propelling element is at rest while maintaining said driving relation, separately acting braking means operable without affecting force transmission through the transmission for braking the vehicle, an operating member and mechanism actuated by said member for controlling the braking means and for effecting reversal of the transmission.

61. A self-propelled vehicle comprising, in combination, an internal combustion engine, a propelling element, means for providing a driving relation between the engine and the propelling element including a reversible variable-speed transmission having a speed ratio permitting the engine to operate when the propelling element is at rest while maintaining said driving relation, separately acting braking means operable without affecting force transmission through the transmission for braking the vehicle, an operating member and mechanism actuated by said member for controlling the braking means and for effecting reversal of the transmission, said mechanism being arranged to permit reversal of the transmission only after actuation of the braking means to arrest movement of the vehicle.

62. A self-propelled vehicle comprising, in combination, an internal combustion engine, a propelling element, means for providing a driving relation between the engine and the propelling element including a reversible variable-speed transmission having a speed ratio permitting the engine to operate when the propelling element is at rest while maintaining said driving relation, separately acting braking means operable without affecting force transmission through the transmission for braking the vehicle and having a normal position of rest, mechanism actuated by movement of said member only on one and the same side of said position of rest for controlling said braking means and mechanism actuated by movement of said member only on the opposite side of said position of rest for effecting reversal of the transmission.

63. A self-propelled vehicle comprising, in combination, means for driving the vehicle, reversing means for changing the direction of drive of the vehicle, means for braking the vehicle and mechanism including a common movable member for actuating said reversing means and for controlling said braking means, said mechanism being arranged to free said member from operating connection with the vehicle braking means whenever said member is moved to actuate the reversing means.

64. A self-propelled vehicle comprising, in combination, mechanism for driving the vehicle including reversing means for changing the direction of drive of the vehicle, means for braking the vehicle and mechanism including a common movable member for actuating said reversing means and for controlling said braking means, said mechanism being arranged to free said member from operating connection with either one of said means whenever said member is moved to operate the other of said means.

65. A self-propelled vehicle comprising, in combination, means for driving the vehicle, reversing means for changing the direction of drive of the vehicle, means for braking the vehicle and mechanism including a common operating pedal for actuating both of said means, said pedal being movable through one range of movement to effect actuation of the braking means and through a second range of movement to effect actuation of said reversing means, said last named mechanism being arranged so that said pedal is freed from the braking means when in the range of movement effecting actuation of the reversing means.

66. A self-propelled vehicle comprising, in combination, an engine, means for varying the power developed by the engine, mechanism actuated by the engine for driving the vehicle including reversing means for changing the direction of drive of the vehicle, means for braking the vehicle, and mechanism including a common operating pedal for actuating all of said means, said pedal being movable through one range of movement to effect actuation of the braking means, through a second range of movement to effect actuation of the power varying means and through a third range of movement to effect actuation of the reversing means, said last named mechanism being arranged so that said pedal is freed from both the braking means and the power varying means when in the range of movement effecting actuation of the reversing means.

67. A self-propelled vehicle comprising, in combination, an engine, a throttle for the engine, a brake for the vehicle, means for causing the engine to propel the vehicle including mechanism automatically permitting free wheeling of the vehicle with respect to the engine, means for applying the brake, means for closing the throttle, a common operating member for releasing the brake and for opening the throttle after release of the brake, the brake releasing and throttle closing means being arranged to resist movement of said member with diminishing force as the brake is released and to resist movement of said member with increasing force as the throttle is opened, whereby minimum operating pressure is required to maintain said member in the position simultaneously providing for release of the brake and closure of the throttle.

68. A self-propelled vehicle comprising, in combination, an engine, a throttle for the engine, a brake for the vehicle, means for causing the engine to propel the vehicle including mechanism automaticlly permitting free wheeling of the vehicle with respect to the engine, means for applying the brake, means for closing the throttle, a manually operable pedal for releasing the brake and for opening the throttle after release of the brake upon depression of the pedal, the brake releasing and throttle closing means being arranged to resist depression of said pedal with diminishing force as the brake is released, and to resist depression of said pedal with increasing force as the throttle is opened, whereby minimum operating pressure is required to maintain said pedal in the position simultaneously providing for release of the brake and closing of the throttle.

69. A self-propelled vehicle comprising, in combination, an engine, a reversible variable-speed transmission including an element rotatably movable to effect change in the direction of drive of the vehicle from either forward or backward direction to the opposite direction, a pivoted operating member operable in one direction to move said element, and means actuated by said member for varying the power developed by the engine, said means being operated by movement of said member in said one direction to cause the power developed by the engine to be increased.

70. A self-propelled vehicle comprising, in combination, an engine, a reversible variable-speed transmission including an element rotatably movable to effect change in the direction of drive of the vehicle from either forward or backward direction to the opposite direction, means for braking the vehicle, a pivoted operating member operable in one direction only to move said element, and means for causing movement of said member in said one direction to release said braking means.

71. In apparatus of the character described, in combination, throttle-actuating mechanism, brake-actuating mechanism including means acting to apply the brake, and a manually operable member movable to release the brake against the action of said means and to operate said throttle-actuating mechanism to open the throttle in sequence, said means being arranged so that its resistance to movement of said member diminishes as the brake is released and increases as the throttle is opened.

72. In apparatus of the character described, in combination, throttle-actuating mechanism, brake-actuating mechanism including a spring acting to apply the brake, and a pedal arranged to release the brake against the action of said spring and to operate said throttle-actuating means to open the throttle in sequence upon depression of the pedal, said spring being arranged so that its resistance to depression of the pedal decreases as the brake is released and increases upon further depression of the pedal to open the throttle.

73. In apparatus of the character described, in combination, throttle-actuating mechanism, brake-actuating mechanism, a manually operable member acting on said mechanisms and movable in one direction to first release the brake and then to open the throttle, a coil spring resisting movement of said member, said spring being mounted so that its resistance to movement of said member is decreased by diminishing the effective moment arm through which it acts as brake-releasing movement of said member is effected and is increased by subjecting it to lateral bending as throttle-opening movement of said member is effected.

74. In apparatus of the character described, in combination, throttle-actuating mechanism, brake-actuating mechanism, a pedal acting on said mechanisms to first release the brake and then to open the throttle as the pedal is depressed, a coil spring resisting depression of said pedal, spring pivots forming abutments limiting the pivotal movement of said spring, said pivots being arranged so that said spring is subjected to lateral bending as the pedal is depressed to operate the throttle-actuating mechanism, whereby resistance of the spring increases as the throttle is opened.

75. A self-propelled vehicle comprising, in combination, an engine, a throttle for the engine, a propeller shaft, power transmitting mechanism adapted to cause the engine to drive the propeller shaft and including means automatically permitting free wheeling of the propeller shaft with respect to the engine, a brake including a brake drum positively connected to the propeller shaft so as to rotate at propeller shaft speed, a spring normally tending to apply said brake, a brake pedal and operating mechanism between the pedal and the spring arranged to release the brake against the action of the spring upon depression of the pedal and to open the throttle upon further depression of the pedal after the brake is released.

76. A self-propelled vehicle comprising, in combination, an engine, a throttle for the engine, a propeller shaft, power transmitting mechanism adapted to cause the engine to drive the propeller shaft and including means automatically permitting free wheeling of the propeller shaft with respect to the engine, a brake including a brake drum positively connected to the propeller shaft so as to rotate at propeller shaft speed, a spring normally tending to apply said brake, a pedal and operating mechanism between the pedal and the spring arranged to release the brake against the action of the spring upon depression of the pedal and to open the throttle upon further depression of the pedal after the brake is released.

77. A self-propelled vehicle comprising, in combination, an internal combustion engine having a throttle, a driven element, means for providing a driving relation between the engine and the driven element including a variable-speed transmission having a speed ratio permitting the engine to operate when the driven element is at rest while maintaining said driving relation, a brake for arresting movement of said driven element, an operating member movable to apply and release the brake, mechanism comprising a spring and linkage acting on said member to apply the brake, said linkage operating to diminish the pressure of the spring on said member as the latter is moved to release the brake, and operating means movable only after release of the brake for actuation of said throttle.

78. A self-propelled vehicle comprising, in combination, an internal combustion engine having a throttle, a driven element, means for providing a driving relation between the engine and the driven element including a variable-speed transmission having a speed ratio permitting the engine to operate when the driven element is at rest while maintaining said driving relation, a brake for arresting movement of said driven element, an operating pedal arranged to release the brake upon depression of the pedal, mechanism comprising a spring and linkage acting to raise the pedal to apply the brake, said linkage operating to diminish the pressure of the spring on the pedal as the pedal is depressed, and a second pedal for actuating the throttle, said last named pedal being arranged to be actuated only after depression of said first named pedal to release the brake.

79. A self-propelled vehicle comprising, in combination, an internal combustion engine, a propelling element, reversible means providing a path of force transmission for establishing a driving relation between the engine and the propelling element, said driving relation being interrupted in normal operation only during reversal of said means by breaking said path of force transmission, mechanism for effecting reversal of said means, and means for insuring rapid actuation of said mechanism.

80. A self-propelled vehicle comprising a prime mover, means for varying the power developed by the prime mover, a driven element, means for providing a driving relation between the prime mover and the driven element including variable speed power transmitting mechanism having a speed ratio permitting the prime mover to operate when the driven element is at rest while maintaining said driving relation and an overrunning clutch through which force is transmitted to the driven member, whereby to permit the vehicle to be stopped without stopping the prime mover and without interrupting the driving relation and to permit the vehicle to freewheel, brakes for stopping the vehicle, means tending to apply the brakes, a pedal arranged to release the brakes against the action of said last named means upon depression of the pedal, said pedal and said power varying means having related positions to limit the power developed by the prime mover when the pedal is in its brake controlling range of movement and said pedal being arranged for actuation of the power varying means to increase the power developed by the prime mover only when the pedal is depressed beyond the range of movement for controlling the brakes.

81. A self-propelled vehicle comprising an internal combustion engine having a throttle, a driven element, means for providing a driving relation between the engine and the driven element including variable speed power transmitting mechanism having a speed ratio permitting the engine to operate when the driven element is at rest while maintaining said driving relation and an overrunning clutch through which force is transmitted to the driven member, whereby to permit the vehicle to be stopped without stopping the prime mover and without interrupting the driving relation and to permit the vehicle to freewheel with respect to the prime mover, brakes for stopping the vehicle, actuating mechanism for said throttle including means for biasing the throttle toward closed position, actuating mechanism for said brakes including means tending to apply the brakes, a single control pedal operatively associated with said actuating mechanisms, said pedal being arranged to cause sequential release of the brakes and opening of the throttle upon depression of the pedal and to permit sequential closing of the throttle and application of the brakes upon upward movement of the pedal, whereby to permit substantially instantaneous transition from control of the throttle to control of the brakes by a single uninterrupted upward movement of the foot of the operator.

82. A self-propelled vehicle comprising a prime mover, means for varying the power developed by the prime mover, a driven element, means for providing a driving relation between the prime mover and the driven element including reversible variable speed power transmitting mechanism having a speed ratio permitting the prime mover to operate when the driven element is at rest, brakes for stopping the vehicle, a manually operable pedal for reversing the transmission, and means providing an operative connection between said pedal and the transmission for causing depression of the pedal to reverse the transmission, the last mentioned means being ineffective to provide an operative connection unless the vehicle is stopped.

83. A self-propelled vehicle comprising driving wheels, an engine having a throttle, means providing a driving relation between the engine and the driving wheels including a variable-speed transmission having a speed ratio permitting the engine to operate when the driving wheels are at rest while maintaining said driving relation, brakes for the vehicle, means tending to apply the brakes, a single manually operable pedal, mechanism for causing depression of the pedal to counteract the brake applying means and to release the brakes and mechanism for causing further depression of the pedal to open the throttle, said mechanism including parts arranged to provide decreasing resistance to depression of the pedal as the brakes are released and increasing resistance to depression of the pedal as the throttle is opened.

84. A self-propelled vehicle comprising driving wheels, an engine having a throttle, means for providing a driving relation between the engine and the driving wheels including a variable-speed transmission having a speed ratio permitting the engine to operate when the driving wheels are at rest while maintaining said driving relation and including a clutch permitting the vehicle to free wheel with respect to the engine, brakes for the vehicle, mechanism for causing initial depression of the pedal to counteract the brake applying means and to release the brakes and mechanism for causing further depression of the pedal to open the throttle, said mechanism including parts arranged to provide decreasing resistance to depression of the pedal as the brakes are released and increasing resistance to depression of the pedal as the throttle is opened, whereby to require the minimum force to be applied to the pedal to maintain it in intermediate position for free wheeling with the brakes released and the throttle substantially closed.

85. In automobile and the like, a brake, a throttle, foot pedals operatively connected to said brake and said throttle, said brake pedal being positioned to prevent actuation of said throttle pedal when in braking position, and to permit actuation of said throttle pedal when in released position.

86. In automobile and the like, a brake, a throttle, spring means normally maintaining said brake in braking position, a pedal controlling said spring means and operable to release the brakes, a second pedal operatively connected to said throttle, said first pedal being positioned in advance of said second pedal to bar operation of said second pedal prior to operation of said first pedal.

87. In apparatus of the character described, the combination, with a variable-speed power transmission having a driven member, of a fly-wheel positively connected to the driven member and rotating therewith at the same speed, a brake adapted to act on the fly-wheel, a spring for applying the brake, a brake pedal, and operating mechanism between the pedal and the spring for causing release of the brake upon depression of the pedal.

88. In apparatus of the character described, the combination, with a variable-speed power transmission having a driving member and a driven member capable of free wheeling with respect to the driving member, of a fly-wheel positively connected to the driven member and rotating therewith at the same speed, a brake adapted to act on the fly-wheel, a spring normally acting to apply said brake, a brake pedal and operating mechanism between the pedal and the spring arranged to release the brake against the action of the spring upon depression of the pedal and to cause the reaction of the spring against the pedal to decrease as the brake is released.

89. In apparatus of the character described, the combination, with a variable-speed power transmission having a driven member, of a fly-wheel positively connected to the driven member and rotating therewith at the same speed, a brake adapted to act on the fly-wheel, a spring for applying the brake, a brake pedal and linkage mechanism between the pedal and the spring for causing release of the brake upon depression of the pedal, said mechanism being arranged to cause the reaction of the spring against the pedal to decrease as the brake is released.

90. In apparatus of the character described, the combination, with a variable-speed power transmission having a driven member, of a fly-wheel positively connected to the driven member and rotating therewith at the same speed, a brake adapted to act on the fly-wheel, a spring for applying the brake, a brake pedal, and a pantograph linkage between the pedal and the spring arranged to release the brake against the action of the spring upon depression of the pedal and to progressively absorb a greater part of the reaction of the spring as the pedal is depressed whereby the resistance of the pedal to depression decreases as the brake is released.

FREDRIK LJUNGSTROM.